(12) United States Patent
Hasegawa et al.

(10) Patent No.: US 8,556,240 B2
(45) Date of Patent: Oct. 15, 2013

(54) FLUID-FILLED VIBRATION DAMPING DEVICE AND CONTROL METHOD OF THE DEVICE USED AS ENGINE MOUNT

(75) Inventors: Koichi Hasegawa, Kasugai (JP); Seiichiro Yamamoto, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 946 days.

(21) Appl. No.: 12/452,588

(22) PCT Filed: May 21, 2009

(86) PCT No.: PCT/JP2009/002247
§ 371 (c)(1), (2), (4) Date: Jan. 11, 2010

(87) PCT Pub. No.: WO2010/001523
PCT Pub. Date: Jan. 7, 2010

(65) Prior Publication Data
US 2011/0042872 A1     Feb. 24, 2011

(30) Foreign Application Priority Data

Jun. 30, 2008 (JP) ................................ 2008-171080
Jun. 30, 2008 (JP) ................................ 2008-171081
Sep. 24, 2008 (JP) ................................ 2008-243981
Sep. 24, 2008 (JP) ................................ 2008-243982
Jan. 29, 2009 (JP) ................................ 2009-018680

(51) Int. Cl.
*B60K 5/00* (2006.01)
(52) U.S. Cl.
USPC .............................. 267/140.14; 267/140.15
(58) Field of Classification Search
USPC ............. 248/562, 566, 636, 638; 267/140.11, 267/140.14, 140.15
See application file for complete search history.

(56) References Cited

U.S. PATENT DOCUMENTS 7,066,454 B2 *   6/2006   Kon et al. ................. 267/140.14
2005/0017420 A1 * 1/2005   Nemoto et al. ........... 267/140.14
(Continued)

FOREIGN PATENT DOCUMENTS

JP     A-61-66243     4/1986
JP     A-62-127539    6/1987
(Continued)

OTHER PUBLICATIONS

Jul. 7, 2009 International Search Report issued in corresponding International Application No. PCT/JP2009/002247 (with translation).

(Continued)

*Primary Examiner* — Christopher Schwartz
(74) *Attorney, Agent, or Firm* — Oliff & Berridge, PLC

(57) ABSTRACT

A fluid-filled vibration damping device wherein a partition member is formed by fitting an inner orifice member inside an outer orifice member with the members relatively displaceable. An orifice-defining window is provided on either one of an inside peripheral face of the outer orifice member and an outside peripheral face of the inner orifice member. An orifice passage is defined utilizing a zone being produced through partial covering of the orifice-defining window by the other of the outer orifice member and the inner orifice member. The covered zone of the orifice-defining window changes through relative displacement of the inner orifice member and the outer orifice member, so that a passage length along the orifice passage changes in association with change of the covered zone of the orifice-defining window.

24 Claims, 44 Drawing Sheets

(56) References Cited

U.S. PATENT DOCUMENTS

| | | | |
|---|---|---|---|
| 2005/0275145 A1* | 12/2005 | Muraoka et al. | 267/140.14 |
| 2006/0001204 A1* | 1/2006 | Kato et al. | 267/140.14 |
| 2007/0182077 A1* | 8/2007 | Kon | 267/140.14 |
| 2008/0136074 A1* | 6/2008 | Nemoto | 267/140.14 |
| 2012/0242019 A1* | 9/2012 | Koyama et al. | 267/140.14 |
| 2012/0242021 A1* | 9/2012 | Koyama et al. | 267/140.14 |

FOREIGN PATENT DOCUMENTS

| | | |
|---|---|---|
| JP | A-4-160246 | 6/1992 |
| JP | A-5-248480 | 9/1993 |
| JP | A-6-137363 | 5/1994 |
| JP | U-7-18046 | 3/1995 |
| JP | A-2002-5226 | 1/2002 |

OTHER PUBLICATIONS

Written Opinion of the International Search Authority issued in International Application No. PCT/JP2009/002247, mailed on Feb. 17, 2011.

International Preliminary Report on Patentability issued in International Application No. PCT/JP2009/002247, mailed on Feb. 17, 2011.

Mar. 1, 2013 Office Action issued in Japanese Patent Application No. 2009-547475 (with partial translation).

* cited by examiner

FLUID-FILLED VIBRATION DAMPING DEVICE AND CONTROL METHOD OF THE DEVICE USED AS ENGINE MOUNT

TECHNICAL FIELD

The present invention relates to a vibration damping device used as an automotive engine mount or the like. More particularly, the present invention relates to a fluid-filled vibration damping device that utilizes vibration damping based on flow action of a fluid filling the interior, and to an appropriate control method of the device used as an engine mount.

BACKGROUND ART

A number of vibration damping devices, which are designed for installation between components making up a vibration transmission system in order to provide vibration damped linkage and/or vibration damped support to these components, are known in the prior art. Such vibration damping devices have a construction in which a first mounting fitting adapted to mount onto one of the components making up a vibration transmission system and a second mounting fitting adapted to mount onto the other component are linked by a main rubber elastic body. With the goal of further enhancing vibration damping capabilities, there have also been proposed vibration damping devices of fluid-filled design adapted to utilize flow action of a fluid filling the interior, and implementation of such devices in applications such as automotive engine mounts for example is a current topic of research. A fluid-filled vibration damping device has a pressure-receiving chamber whose wall is partially constituted by the main rubber elastic body, and an equilibrium chamber whose wall is partially constituted by a flexible film, these pressure-receiving and equilibrium chambers being filled with a non-compressible fluid, and the pressure-receiving and equilibrium chambers communicating with one another through an orifice passage.

It must be noted that where a fluid-filled vibration damping device is implemented in an engine mount of an automobile or the like, the frequency and amplitude of vibrations input to the device will vary according to factors such as vehicle driving conditions and engine speed. A problem with fluid-filled vibration damping devices, however, is that while vibration damping is excellent with respect to vibration of a frequency range to which the orifice passage has been tuned beforehand, it is more difficult to achieve effective vibration damping of input vibration of a frequency range which falls outside of the tuning frequency range. Particularly when the input vibration has a higher frequency than the tuning frequency, the orifice passage will become substantially obstructed due to antiresonance action, posing a risk that vibration damping capabilities will be diminished owing to a sharp rise in dynamic spring action constant.

To address this issue, there have been proposed, for example in Patent Documents 1 to 4 (JP-U-7-18046, JP-A-5-248480, JP-A-4-160246, and JP-A-61-66243), fluid-filled vibration damping devices having variable orifice passage tuning frequency so as to provide effective vibration damping of several types of vibration having different frequencies. In these Patent Documents, two orifice-defining components assembled in a relatively rotatable manner have formed therein an orifice passage that extends in the direction of relative rotation of the two orifice-defining components, such that the passage length of the orifice passage is varied through relative rotation of the two orifice-defining components. This makes it possible to vary the tuning frequency of the orifice passage, which is established by the ratio of passage length to passage cross sectional area.

However, in the fluid-filled mounts disclosed in Patent Documents 1 to 4, it is necessary to provide on the outside of the mount body an electric motor for actuating rotation of the orifice-defining components; and for the actuator shaft, which transmits rotational actuating force of the electric motor to the orifice-defining components which are situated in the interior of the mount body, to pass through the wall of the fluid chamber whose interior is filled with non-compressible fluid. Such a placement structure for the actuator shaft will entail problems such as difficulty in ensuring sealing of the wall of the fluid chamber in the section thereof penetrated by the rotary actuator shaft; complicated construction; and less reliable seals or lower durability of the mount itself. Moreover, the procedure for sealing non-compressible fluid in the fluid chamber tends to be difficult, leaving numerous issues that must be resolved before such a design could be practical.

PRIOR ART DOCUMENTS

Patent Documents

Patent Document 1: JP-U-7-18046
Patent Document 2: JP-A-5-248480
Patent Document 3: JP-A-4-160246
Patent Document 4: JP-A-61-66243

DISCLOSURE OF THE INVENTION

Problem the Invention Attempts to Solve

With the foregoing in view, it is an object of the present invention to provide a fluid-filled vibration damping device of novel structure adapted to provide effective vibration damping of input vibration of a wide frequency range, and to attain this object with excellent reliability and durability.

It is a further object of the present invention to provide a control method adapted to efficiently produce vibration damping in cases where the fluid-filled vibration damping device is employed as an automotive engine mount.

Means for Solving the Problem

The above objects of this invention may be attained according to the following modes of the invention, wherein elements described hereinbelow may be adopted in any possible optional combination.

(First Mode of the Invention)

A first mode of the present invention provides a fluid-filled vibration damping device including a first mounting member and a second mounting member linked by a main rubber elastic body; a partition member disposed supported by the second mounting member and defining to one side of the partition member a pressure-receiving chamber whose wall is partially constituted by the main rubber elastic body, while defining to the other side of the partition member an equilibrium chamber whose wall is partially constituted by a flexible film, the pressure-receiving chamber and the equilibrium chamber being filled with a non-compressible fluid; and an orifice passage through which the pressure-receiving chamber and the equilibrium chamber communicate with one another; the device being characterized in that the partition member comprises an inner orifice member fitting inside an outer orifice member having a tubular portion with the members relatively displaceable in the axial direction; an orifice-defining window is provided on either one of two mating faces of an inside peripheral face of the tubular portion of the outer orifice member and an outside peripheral face of the inner orifice member; the orifice passage is defined utilizing a covered zone of the orifice-defining window, the zone being produced through partial covering of the orifice-defining window by the other of the outer orifice member and the inner orifice member; the covered zone of the orifice-defining window changes through relative displacement of the inner orifice member in the axial direction with respect to the outer orifice member; and fluid path length along the orifice passage between the opening thereof at the pressure-receiving chamber end and the opening thereof at the equilibrium chamber end changes in association with change of the covered zone of the orifice-defining window.

In the fluid-filled vibration damping device in accordance with the present mode, the length of the orifice passage is adjustable, so that tuning of the orifice passage may change according to the frequency of input vibration. For this reason, vibration damping based on resonance action etc. of fluid caused to flow through the orifice passage can be exhibited against several types of vibration having different frequencies.

Furthermore, passage length of the orifice passage is designed to change through relative displacement of the outer orifice member and the inner orifice member in the axial direction. For this reason, even where actuating force for bringing about this relative displacement of the outer orifice member and the inner orifice member is transmitted from outside the fluid chamber, it will be easier to effect sealing along the actuating force transmission path as compared to a construction in which passage length of the orifice passage is reset through relative rotation of the outer orifice member and the inner orifice member. Consequently, fluidtightness of the fluid chamber can be assured through a simple construction, and diminished vibration damping capability due to leakage of the sealed fluid can be avoided. Thus, the fluid-filled vibration damping device may be attained with excellent durability and reliability.

(Second Mode of the Invention)

A second mode of the invention provides a fluid-filled vibration damping device in accordance with the first mode wherein the orifice-defining window is helical in form extending in the circumferential direction while sloping in the axial direction.

In the fluid-filled vibration damping device in accordance with the present mode, sufficient passage length of the orifice passage can be efficiently ensured without the need to increase the size of the inner orifice member. For this reason, the tuning frequency of the orifice passage can be reset over a wider frequency range.

(Third Mode of the Invention)

A third mode of the invention provides a fluid-filled vibration damping device in accordance with the first or second mode wherein an orifice connection window extending in the circumferential direction is formed on either one of two mating faces selected from the inside peripheral face of the tubular portion of the outer orifice member and the outside peripheral face of the inner orifice member; the orifice connection window is sloped relative to the orifice-defining window; and the orifice passage communicates with either the pressure-receiving chamber or the equilibrium chamber through the intersection point of the orifice connection window and the orifice-defining window.

By forming the orifice connection window so as to extend in the circumferential direction on a slope relative in the axial direction to the orifice-defining window with their intersection point defining one opening of the orifice passage in this way, passage length of the orifice passage will be modifiable through linear relative displacement in the axial direction by the inner orifice member with respect to the outer orifice member. Further, because an opening of the orifice passage is defined by the intersection of the orifice-defining window and the orifice connection window, the cross sectional area of the opening on the side defined by the intersection can be set with a higher degree of accuracy according to intended tuning frequency, and vibration damping can be more efficiently attained.

(Fourth Mode of the Invention)

A fourth mode of the invention provides a fluid-filled vibration damping device in accordance with the third mode wherein either the orifice-defining window or the orifice connection window is helical in form extending in the circumferential direction while sloping in the axial direction; while the other of the orifice-defining window or the orifice connection window is annular in form extending in the circumferential direction without sloping.

By employing such a construction, the orifice-defining window and the orifice connection window can be sloped relatively in the axial direction, and change of the intersection of the orifice-defining window and the orifice connection window can be accomplished through relative displacement of the outer orifice member and the inner orifice member in the axial direction. Additionally, by giving either the orifice-defining window or the orifice connection window helical form, the other can be given simple annular form. Further, by giving either the orifice-defining window or the orifice connection window helical form while giving the other non-sloping annular form, the location of intersection of the orifice-defining window and the orifice connection window will be established through relative positioning of the outer orifice member and the inner orifice member in the axial direction, without the need for relative positioning of the outer orifice member and the inner orifice member in the circumferential direction. For this reason, the inner orifice member can easily fit inside the outer orifice member.

(Fifth Mode of the Invention)

A fifth mode of the invention provides a fluid-filled vibration damping device in accordance with the third mode wherein both the orifice-defining window and the orifice connection window are helical in form extending in the circumferential direction while sloping in the axial direction, with the orifice-defining window and the orifice connection window being sloped in mutually opposite directions.

By employing such a construction, the orifice-defining window and the orifice connection window are sloped relatively in the axial direction, and the intersection point location of the orifice-defining window and the orifice connection window can change through relative displacement of the outer orifice member and the inner orifice member in the axial direction. Additionally, because both the orifice-defining window and the orifice connection window slope in the axial direction with their direction of slope set to opposite directions, the orifice-defining window and the orifice connection window can be given large relative slope. As a result, the extent of movement of the intersection point location in the circumferential direction with respect to the extent of relative displacement of the outer orifice member and the inner orifice member in the axial direction will be fairly small, making it possible to tune the orifice passage with a higher degree of accuracy.

(Sixth Mode of the Invention)

A sixth mode of the invention provides a fluid-filled vibration damping device according to any of the third to fifth modes wherein the inner orifice member includes an inner tubular portion adapted to fit inside the tubular portion of the outer orifice member; and the orifice connection window is formed passing through a peripheral wall of the inner tubular portion.

In the fluid-filled vibration damping device in accordance with the present mode, by providing the inner orifice member with an inner tubular portion and forming the orifice connection window in the inner tubular portion, there can be devised an orifice connection window that extends in the circumferential direction.

(Seventh Mode of the Invention)

A seventh mode of the invention provides a fluid-filled vibration damping device according to any of the third to sixth modes wherein linking crosspieces that for reinforcement purposes link together the edges at the axial direction sides of the orifice connection window are provided at prescribed intervals in the circumferential direction of the orifice connection window.

In the fluid-filled vibration damping device in accordance with the present mode, it is possible to avoid lower strength of the inner orifice member in association with forming of the orifice connection window, and to attain ample durability. Additionally, where the orifice connection window has been formed so as to extend continuously about the entire circumference, this linking together of both sides of the orifice connection window by the linking crosspieces will allow the inner orifice member to be formed as a single member undivided by the orifice connection window, thus avoiding an increased number of parts and more complicated construction.

(Eighth Mode of the Invention)

An eighth mode of the invention provides a fluid-filled vibration damping device according to any of the first to seventh modes wherein the orifice-defining window is formed so as to open onto the outside peripheral face of the inner orifice member.

In the fluid-filled vibration damping device in accordance with the present mode, by forming the orifice-defining window in the inner orifice member which fits inside the outer orifice member, an orifice passage of relatively short path length can be formed with good space efficiency. Additionally, by forming in the large-diameter outer orifice member a path that is separate from the orifice passage, it is possible to appositionally provide a fluid passage tuned to lower frequencies and the orifice passage with good space efficiency.

(Ninth Mode of the Invention)

A ninth mode of the invention provides a fluid-filled vibration damping device according to any of the first to seventh modes wherein the orifice-defining window is formed so as to open onto the inside peripheral face of the outer orifice member.

In the fluid-filled vibration damping device in accordance with the present mode, by forming the orifice-defining window in the large-diameter outer orifice member, an orifice passage of extended path length can be formed with good space efficiency, and the orifice passage can be tuned to a lower frequency.

(Tenth Mode of the Invention)

A tenth mode of the invention provides a fluid-filled vibration damping device in accordance with the ninth mode wherein the outer orifice member is designed with bottomed tubular shape opening either towards the pressure-receiving chamber end or towards the equilibrium chamber end, with the orifice-defining window opening onto the inside peripheral face thereof; and the inner orifice member fits inside the outer orifice member and is positioned so as to partition a peripheral interior of the outer orifice member into a basal end and an open end.

In the fluid-filled vibration damping device in accordance with the present mode, the basal end of the peripheral interior of the outer orifice member defines to one side of the inner orifice member a dead-end liquid chamber which is substantially sealed off, thereby restricting the inflow and outflow of fluid. Thus, a path having prescribed cross sectional area is defined not only in the orifice-defining window in a zone thereof covered by the inner orifice member, but is defined also in a zone situated closer towards the basal end than the section that is covered by the inner orifice member. For this reason, it will be possible to ensure an orifice passage of sufficient length while maintaining a small axial dimension for the inner orifice member, so that lighter weight and smaller size in the axial direction can be achieved. Also, by employing a bottomed tubular shape for the outer orifice member, strength can be ensured more advantageously than where an annular form is employed. The open end of the peripheral interior of the outer orifice member to the other side of the inner orifice member opens into the pressure-receiving chamber or the equilibrium chamber, so that the orifice passage communicates with the pressure-receiving chamber or the equilibrium chamber by a zone situated towards the open end in the orifice-defining window.

(Eleventh Mode of the Invention)

An eleventh mode of the invention provides a fluid-filled vibration damping device in accordance with the tenth mode wherein the orifice-defining window is sloped in the axial direction and extends in the circumferential direction; and the inner orifice member is of flat plate shape, with the outside peripheral face of the inner orifice member being superposed against the inside peripheral face of the outer orifice member.

In the fluid-filled vibration damping device in accordance with the present mode, the inner orifice member is given flat plate shape extending approximately in the axis-perpendicular direction so that the inner orifice member can be reduced in weight while ensuring sufficient passage length of the orifice passage; and the axial dimension of the inner orifice member can be made smaller so that the fluid-filled vibration damping device as a whole is more compact in the axial direction.

(Twelfth Mode of the Invention)

A twelfth mode of the invention provides a fluid-filled vibration damping device according to any of the first to eleventh modes wherein an actuator shaft attached at one end thereof to the inner orifice member passes through the flexible film and extends to the outside of the equilibrium chamber, while the other end of the actuator shaft is attached to an actuator that is situated outside the equilibrium chamber; and an actuating force of the actuator is exerted on the inner orifice member through an agency of the actuator shaft to bring about relative displacement of the inner orifice member in the axial direction with respect to the outer orifice member.

In the fluid-filled vibration damping device in accordance with the present mode, a mechanism for adjusting the length of the orifice passage can be realized through displacement of the inner orifice member in the axial direction. For this reason, in a construction where the actuator for actuating the inner orifice member is situated outside the equilibrium chamber, there can be employed a structure whereby the actuator shaft for transmitting actuating force of the actuator to the inner orifice member is made to describe reciprocating motion in the axial direction. As a result, sealing of the actuator shaft passage zone in the flexible film can be effected by a simple construction.

(Thirteenth Mode of the Invention)

A thirteenth mode of the invention provides a fluid-filled vibration damping device according to any of the first to twelfth modes wherein axial direction guiding means is provided between the outer orifice member and the inner orifice member, for controlling relative displacement thereof in the axis-perpendicular direction and for guiding relative displacement in the axial direction.

In the fluid-filled vibration damping device in accordance with the present mode, the inside peripheral face of the outer orifice member and the outside peripheral face of the inner orifice member can be prevented from being forcibly pushed against one another due to relative displacement of the outer orifice member and the inner orifice member in the axis-perpendicular direction, thus preventing a situation where relative displacement of the inner orifice member with respect to the outer orifice member in the axial direction is hampered by frictional force. Further, because relative displacement of the inner orifice member with respect to the outer orifice member in the axial direction is guided by axial direction guiding means, relative displacement in the axial direction can take place more smoothly.

(Fourteenth Mode of the Invention)

A fourteenth mode of the invention provides a fluid-filled vibration damping device in accordance with the thirteenth mode wherein the actuator for bringing about relative displacement of the inner orifice member with respect to the outer orifice member is situated at a first axial end of the inner orifice member, and the axial direction guiding means is provided at the other axial end thereof.

In the fluid-filled vibration damping device in accordance with the present mode, as compared to the case where axial direction guiding means is provided by utilizing the inside peripheral face of the outer orifice member and the outside peripheral face of the inner orifice member, situations such as sticking by the orifice-defining window can be prevented. Thus, relative displacement of the inner orifice member with respect to the outer orifice member can take place more smoothly. Such axial direction guiding means may be achieved, for example, by employing an inverted, approximately bottomed round tubular shape for the outer orifice member and providing a guide tube on the upper base wall thereof, while providing the inner orifice member with a guide projection that projects out to one end in the axial direction, and inserting the guide projection into the guide tube so as to be slidable therein in the axial direction.

(Fifteenth Mode of the Invention)

A fifteenth mode of the invention provides a fluid-filled vibration damping device according to any of the first to fourteenth modes wherein liquid pressure absorbing means is disposed in the partition member in the wall thereof that partitions the pressure-receiving chamber from the equilibrium chamber.

In the fluid-filled vibration damping device in accordance with the present mode, vibration damping is realized by utilizing liquid pressure absorbing action produced by the liquid pressure absorbing means based on tiny displacement and tiny deformation, so that further enhanced vibration damping capabilities may be achieved. Moreover, as the liquid pressure absorbing means is situated at a location away from the fluid path through the orifice passage, the liquid pressure absorbing means will provide effective vibration damping of vibration of frequencies outside the particular tuning frequency of the orifice passage.

(Sixteenth Mode of the Invention)

A sixteenth mode of the invention provides a fluid-filled vibration damping device according to any of the first to fifteenth modes wherein relative displacement of the outer orifice member and the inner orifice member in the axial direction is brought about by an actuator furnished with a pulse motor and a motion conversion mechanism adapted to convert rotational actuating force of a rotating shaft of the pulse motor to reciprocating actuating force in an axial direction.

By employing, as the actuator for relative displacement of the outer orifice member and the inner orifice member, a pulse motor (stepping motor) whose actuator shaft is controlled so as to rotate at prescribed rotation increments, the relative axial position of the outer orifice member and the inner orifice member can be set correctly through control of pulse count.

(Seventeenth Mode of the Invention)

A seventeenth mode of the invention provides a fluid-filled vibration damping device in accordance with the sixteenth mode wherein the device is implemented in an engine mount; and the required step number: $\Delta y_i$, of the actuator shaft of the pulse motor corresponding to a particular engine speed is calculated using an equation below, with the actuator being controlled on the basis of a calculation result:

$$\Delta y_i = y_{i+1} - y_i$$

$$y_i = a \times (x_i/60) \times n + b$$

$x_i$ denotes engine rpm $y_i$ denotes actuator shaft step number depending on an engine speed: $x_i$ n is a multiplying factor determined according to engine model a and b are constants determined according to vehicle characteristics.

By controlling the number of actuation steps of the pulse motor through computation of a differential of the number of actuation steps of the pulse motor, it is possible to continuously reset the axial position of the inner orifice member without the need to detect the axial position of the inner orifice member with a position sensor or the like.

(Eighteenth Mode of the Invention)

An eighteenth mode of the invention provides a fluid-filled vibration damping device according to any of the first to seventeenth modes wherein a fluid passage that connects the pressure-receiving chamber with the equilibrium chamber is formed in the partition member; and a tuning frequency of the fluid passage is set to a lower frequency than the orifice passage.

In the fluid-filled vibration damping device in accordance with the present mode, by providing a fluid passage tuned to a lower frequency than the tuning range settable for the orifice passage, the intended vibration damping can be produced against vibration over a wider frequency range.

(Nineteenth Mode of the Invention)

A nineteenth mode of the invention provides a fluid-filled vibration damping device in accordance with the eighteenth mode wherein the fluid passage assumes a continuous communicating state.

Specifically, because the tuning frequency of the fluid passage has been set to a lower frequency than the tuning frequency of the orifice passage, despite a design wherein the fluid passage is maintained in a continuous communicating state, at times of input of vibration of frequency corresponding to the tuning frequency of the orifice passage the fluid passage will assume a substantially clogged state due to anti-resonance action of the fluid. For this reason, at times of input of vibration having the frequency mentioned above, fluid flow through the fluid passage will be limited, so fluid flow through the orifice passage will be effectively produced so that the intended vibration damping is effectively achieved. Moreover, by dispensing with a structure for switching the fluid passage between communicating and blocked states, fewer parts are required, and the fluid-filled vibration damping device can be made more compact in size and lighter in weight.

(Twentieth Mode of the Invention)

A twentieth mode of the invention provides a fluid-filled vibration damping device in accordance with the eighteenth or nineteenth mode wherein the fluid passage is formed in the outer orifice member.

In the fluid-filled vibration damping device in accordance with the present mode, by forming the fluid passage, which is tuned to a lower frequency, in the large-diameter outer orifice member, it is possible to efficiently establish a longer passage length for the fluid passage. The fluid passage can thus be formed with a high degree of freedom in tuning, without a corresponding increase in size of the partition member.

Also, by forming the fluid passage in the outer orifice member while forming the orifice passage in the inner orifice member, there can be efficiently ensured space for forming the fluid passage and the orifice passage. It is accordingly possible to achieve a fluid-filled vibration damping device that while compact in size exhibits outstanding vibration damping performance owing to concomitant provision of a fluid passage and an orifice passage.

(Twenty-First Mode of the Invention)

A twenty-first mode of the invention provides a fluid-filled vibration damping device according to any of the eighteenth through twentieth modes wherein flow regulating means for restricting fluid flow through the orifice passage is situated on the fluid path through the orifice passage.

By so doing, at times of input of vibration of the frequency range to which the fluid passage has been tuned, the flow rate restricting means will restrict fluid flow through the orifice passage, and vibration damping will be produced efficiently on the basis of flow action of fluid in the fluid passage. On the other hand, at times of input of vibration in the frequency range to which the orifice passage has been tuned, the flow rate restricting means, on the basis of deformation and/or displacement thereof, will permit fluid flow through the orifice passage, and vibration damping will be produced on the basis of flow action of fluid in the orifice passage. For this reason, both vibration damping on the part of the fluid passage and vibration damping on the part of the orifice passage will be effectively obtained so as to attain further improvement in vibration damping capabilities.

(Twenty-Second Mode of the Invention)

A twenty-second mode of the invention provides a fluid-filled vibration damping device according to any of the eighteenth through twenty-first modes wherein the orifice passage is blocked by bringing the inner orifice member to a specific position in the axial direction with respect to the outer orifice member.

In the fluid-filled vibration damping device in accordance with the present mode, it is possible to block the orifice passage by bringing about relative displacement of the inner orifice member to a specific position with respect to the outer orifice member. For this reason, at times of input of low-frequency vibration, the orifice passage will become blocked so as to efficiently give rise to fluid flow through the fluid passage and more effectively produce the intended vibration damping.

(Twenty-Third Mode of the Invention)

A twenty-third mode of the invention provides a fluid-filled vibration damping device in accordance with the twenty-second mode wherein a cover part is provided to the other of the outer orifice member and the inner orifice member; and in the orifice passage the opening that leads either to the pressure-receiving chamber end or to the equilibrium chamber end is covered by the cover part through relative displacement of the outer orifice member and the inner orifice member in the axial direction.

In the fluid-filled vibration damping device in accordance with the present mode, it is possible to bring about blocking of the orifice passage through relative displacement of the inner orifice member in the axial direction with respect to the outer orifice member. For this reason, fluid flow through the fluid passage can be produced efficiently through blocking of the orifice passage, and vibration damping based on fluid flow action arising in the fluid passage can be obtained more advantageously.

The opening of the orifice passage may be designed to be blocked through positioning of the cover part in intimate contact against the rim of the opening of the orifice passage, or designed to be substantially blocked through flow friction of fluid produced by positioning the cover part in opposition to the opening of the orifice passage with a tiny gap between them.

(Twenty-Fourth Mode of the Invention)

A twenty-fourth mode of the invention provides a control method for the fluid-filled vibration damping device in accordance with the twenty-second mode or twenty-third mode where employed as an automotive engine mount, the method being designed to control the vibration damping characteristics of the automotive engine mount through actuation control of the actuator adapted to bring about relative displacement of the inner orifice member in the axial direction with respect to the outer orifice member; wherein using driving/idling determining means adapted to determine if an automobile is moving or idling and speed measuring means for measuring engine speed of the automobile, in the event of a decision by the driving/idling determining means that the automobile is moving, the orifice passage will be blocked to allow fluid flow through the fluid passage, whereas in the event of a decision by the driving/idling determining means that the automobile is idling, the orifice passage will be opened, and a relative position of the inner orifice member with respect to the outer orifice member in the axial direction will undergo controlled modification depending on the engine speed that was measured by the speed measuring means, so as to shorten a passage length of the orifice passage in response to higher engine speed.

According to the automotive engine mount control method in accordance with the present embodiment, it is possible for vibration damping to be produced efficiently against input vibration over a wider frequency range, making it possible to achieve advanced vibration damping capabilities.

Specifically, first, by switching the orifice passage to the communicating or blocked state based on the decision by the driving/idling determining means, effective vibration damping is produced both against the low-frequency vibration that tends to be a problem when the automobile moving, and against the midrange- to high-frequency vibration that tends to be a problem when the automobile is idling. That is, with the automobile at a stop, the orifice passage will open to give rise to fluid flow through the orifice passage, whereby the intended vibration damping (low dynamic spring action) can be produced against the midrange- to high-frequency vibration such as idling vibration that tends to be a problem when the automobile is at a stop. When the automobile is moving on the other hand, the orifice passage will be blocked to give rise to fluid flow through the fluid passage which has been tuned to a lower frequency than the orifice passage, whereby the intended vibration damping (high attenuating action) can be produced against the low-frequency vibration such as engine shake that tends to be a problem when moving.

Further, in the event of a decision by the driving/idling determining means that the automobile is idling, the passage length of the orifice passage which has assumed the communicating state will be adjusted on the basis of the engine speed measurement by the speed measuring means. Specifically, for example with the automobile at a stop, if engine speed should increase in association with startup of the engine or with use of the air conditioning, the frequency of the vibration input from the power unit will shift towards the high-frequency band. In response, the passage length of the orifice passage will be reset to shorter length so that the tuning frequency of the orifice passage can be adjusted to the high-frequency band in response to this change in frequency of the input vibration, so that vibration damping can be obtained efficiently based on fluid flow through the orifice passage.

(Twenty-Fifth Mode of the Invention)

A twenty-fifth mode of the invention provides an automotive engine mount control method in accordance with the twenty-fourth mode wherein a pulse motor is employed as the power source of the actuator, and the relative position of the inner orifice member with respect to the outer orifice member in the axial direction is controlled through control of the pulse motor.

In the automotive engine mount control method in accordance with the present embodiment, by controlling the number of pulses applied to the motor, the relative position of the inner orifice member with respect to the outer orifice member in the axial direction can be controlled with high accuracy, without the need for a feedback circuit or other complicated control circuitry. Consequently, it is possible to provide an automotive engine mount by which advanced vibration damping is attained at low cost and with simple construction.

(Twenty-Sixth Mode of the Invention)

A twenty-sixth mode of the invention provides a fluid-filled vibration damping device including a first mounting member and a second mounting member linked by a main rubber elastic body; a partition member disposed supported by the second mounting member and defusing to one side of the partition member a pressure-receiving chamber whose wall is partially constituted by the main rubber elastic body, while defining to the other side of the partition member an equilibrium chamber whose wall is partially constituted by a flexible film, the pressure-receiving chamber and the equilibrium chamber being filled with a non-compressible fluid; and a first orifice passage through which the pressure-receiving chamber and the equilibrium chamber communicate with one another; wherein the partition member is formed by an inner orifice member fitting inside an outer orifice member having a tubular portion with the members relatively displaceable in the axial direction; a middle chamber whose wall is partially constituted by a moveable member is formed in the partition member, the middle chamber being filled with a non-compressible fluid; a second orifice passage tuned to a higher frequency than the first orifice passage and interconnecting the pressure-receiving chamber with the middle chamber is formed by an orifice-defining window formed either in the outer orifice member or in the inner orifice member, and extending in the circumferential direction; on either of two mating faces selected from the inside peripheral face of the tubular portion of the outer orifice member and the outside peripheral face of the inner orifice member, there is formed a connection opening of the orifice-defining window extending in the circumferential direction, while on the other of the mating faces of the outer orifice member and the inner orifice member there is formed an orifice connection window extending in the circumferential direction at a relative slope in the axial direction with respect to the connection opening; the second orifice passage connects to either the pressure-receiving chamber or the middle chamber through the intersection point of the connection opening and the orifice connection window; and the length of the second orifice passage is adjustable by changing of the intersection point of the connection opening and the orifice connection window in the lengthwise direction of the orifice-defining window, by relative displacement of the outer orifice member and the inner orifice member in the axial direction.

A problem encountered with constructions such as those taught in Patent Documents 1 to 4 having a single orifice passage wherein passage length of the orifice passage is modifiable is that if multiple vibrations having different frequencies are input at the same time, it is difficult to achieve the intended vibration damping. Specifically, in the case of an automotive engine mount for example, with the vehicle at a stop, in some instances both normal idling vibration and rough idling vibration, which has a lower frequency range than the former, are input at the same time, and in such cases it was difficult to simultaneously produce vibration damping of both types of vibration. Thus, in the fluid-filled vibration damping device in accordance with the present mode, effective vibration damping of several types of vibration of different frequencies is afforded by a first orifice passage and an additional second orifice passage which is tuned to higher frequency than the first orifice passage. Additionally, because the second orifice passage communicates with a middle chamber whose wall spring rigidity has been set to a higher value than the equilibrium chamber, during input of vibration of the frequency to which the first orifice passage has been tuned, the second orifice passage will become substantially blocked. For this reason, despite a construction having a second orifice passage that is continuously open to the pressure-receiving chamber and the middle chamber, vibration damping by the first orifice passage and vibration damping by the second orifice passage may be effectively produced respectively, according to the input vibration frequency.

In the present mode, by adjusting the length of the second orifice passage it is possible to modify tuning of the second orifice passage depending on input vibration frequency. Thus, during input of vibration having higher frequency than the first orifice passage, a wider range of frequencies may be damped based on resonance action of fluid flowing through the second orifice passage.

Further, adjustment of the tuning frequency of the second orifice passage is accomplished through relative displacement of the inner orifice member and the outer orifice member in the axial direction. For this reason, it is easier to effect sealing on the transmission path for transmission of actuating force from outside the pressure-receiving chamber and the equilibrium chamber to the orifice member(s), as compared to the case where the outer orifice member and the inner orifice member undergo relative rotation; and excellent durability and reliability can be achieved through simple sealing structures of the pressure-receiving chamber and the equilibrium chamber.

(Twenty-Seventh Mode of the Invention)

A twenty-seventh mode of the invention provides a fluid-filled vibration damping device in accordance with the twenty-sixth mode wherein the inner orifice member includes an inner tubular portion; the orifice connection window is formed passing through the peripheral wall of the inner tubular portion; and the orifice connection window opens into the pressure-receiving chamber or the middle chamber, with the second orifice passage connecting to the pressure-receiving chamber or the middle chamber through the orifice connection window.

By providing the inner orifice member with an inner tubular portion and forming the orifice connection window in the inner tubular portion, there can be employed a construction for implementing an orifice connection window that extends in the circumferential direction.

(Twenty-Eighth Mode of the Invention)

A twenty-eighth mode of the invention provides a fluid-filled vibration damping device in accordance with the twenty-sixth or twenty-seventh mode wherein an actuator shaft adapted to transmit actuating force to the inner orifice member is disposed passing through the flexible film; the actuator shaft is attached to an actuator that is situated outside the equilibrium chamber; and the actuating force of the actuator is exerted on the inner orifice member by the actuator shaft to bring about relative displacement of the inner orifice member in the axial direction.

In the fluid-filled vibration damping device in accordance with the present mode, a mechanism for adjusting the length of the second orifice passage can be realized through displacement of the inner orifice member in the axial direction. For this reason, in a construction where the actuator for actuating the inner orifice member is situated outside the equilibrium chamber, there can be employed a structure whereby the actuator shaft for transmitting actuating force of the actuator to the inner orifice member is made to describe reciprocating motion in the axial direction. As a result, sealing of the actuator shaft passage zone in the flexible film can be effected by a simple construction.

Further, by anchoring the flexible film to the outside peripheral face of the actuator shaft about the entire circumference, sealing of the actuator shaft passage zone section in the flexible film can be effected easily and reliably, while permitting the actuator shaft to undergo reciprocating motion in the axial direction through deformation of the flexible film.

(Twenty-Ninth Mode of the Invention)

A twenty-ninth mode of the invention provides a fluid-filled vibration damping device in accordance with any of the twenty-sixth to twenty-eighth modes wherein either the connection opening or the orifice connection window is helical in form extending along the circumferential direction while sloping in the axial direction, and the other is annular in form extending in the circumferential direction without sloping in the axial direction.

By employing such a construction, the connection opening of the orifice-defining window and the orifice connection window will be relatively sloped in the axial direction, enabling the intersection point of the orifice-defining window and the orifice connection window to change through relative displacement of the outer orifice member and the inner orifice member in the axial direction. Also, by giving either the orifice-defining window or the orifice connection window helical form, the other can be given simple annular form.

(Thirtieth Mode of the Invention)

A thirtieth mode of the invention provides a fluid-filled vibration damping device in accordance with any of the twenty-sixth to twenty-eighth modes wherein both the connection opening and the orifice connection window are helical in form sloping in the axial direction and extending in the circumferential direction, with the connection opening and the orifice connection window being sloped in mutually opposite directions.

By employing such a construction, the connection opening of the orifice-defining window and the orifice connection window are sloped relatively in the axial direction, allowing the intersection point of the orifice-defining window and the orifice connection window to change through relative displacement of the outer orifice member and the inner orifice member in the axial direction. Additionally, because both the orifice-defining window and the orifice connection window are sloped in the axial direction with their direction of slope set to opposite directions, the orifice-defining window and the orifice connection window can be given large relative slope. As a result, the extent of change of the intersection point in the circumferential direction with respect to the extent of relative displacement of the outer orifice member and the inner orifice member in the axial direction will be fairly small, making it possible to change the tuning of the second orifice passage with a higher degree of accuracy.

(Thirty-First Mode of the Invention)

A thirty-first mode of the invention provides a fluid-filled vibration damping device in accordance with any of the twenty-sixth to thirtieth modes wherein the inner orifice member is provided with linking crosspieces that for reinforcement purposes link together the edges at the axial direction sides of the orifice connection window are provided at prescribed intervals in the circumferential direction of the orifice connection window.

In the fluid-filled vibration damping device in accordance with the present mode, it is possible to avoid lower strength of the inner orifice member in association with forming of the orifice connection window, and to attain ample durability. Additionally, where the orifice connection window has been formed so as to extend continuously about the entire circumference, this linking together of both sides of the orifice connection window by the linking crosspieces will allow the inner orifice member to be formed as a single member undivided by the orifice connection window, thus avoiding an increased number of parts and more complicated construction.

(Thirty-Second Mode of the Invention)

A thirty-second mode of the invention provides a fluid-filled vibration damping device in accordance with any of the twenty-sixth to thirty-first modes wherein liquid pressure absorbing means for high-frequency purposes is disposed in the inner orifice passage in the wall partitioning the pressure-receiving chamber and the middle chamber.

In the fluid-filled vibration damping device in accordance with the present mode, during input of vibration of higher frequency than the settable tuning range of the second orifice passage, effective vibration damping is realized utilizing liquid pressure absorbing action produced by the liquid pressure absorbing means on the basis of tiny displacement and tiny deformation, so that effective vibration damping is produced against vibration over a wider range of frequencies.

(Thirty-Third Mode of the Invention)

A thirty-third mode of the invention provides a fluid-filled vibration damping device in accordance with any of the twenty-sixth to thirty-second modes wherein the moveable member is disposed so as to constitute the wall partitioning the equilibrium chamber and the middle chamber, with pressure in the equilibrium chamber and in the middle chamber being respectively exerted on the two faces of the moveable member.

In the fluid-filled vibration damping device in accordance with the present mode, by situating the moveable member so that it separates the equilibrium chamber and the middle chamber, internal pressure fluctuations of the middle chamber caused by vibration input will be exerted on the equilibrium chamber through deformation and/or displacement of the moveable member, and will be absorbed through change in volume of the equilibrium chamber. Consequently, it will be possible to effectively give rise to fluid flow through the second orifice passage which communicates with the middle chamber. Moreover, the middle chamber filled with non-compressible fluid can be defined easily, by partitioning part of the equilibrium chamber with the moveable member.

Effect of the Invention

The present invention affords the advantages of effective vibration damping of vibration over a wider frequency range by varying the tuning frequency of the orifice passages, as well as of avoiding loss of fluidtightness of the fluid chamber resulting from provision of a mechanism for resetting the tuning frequency of the orifice passages.

EMBODIMENTS FOR CARRYING OUT THE INVENTION

A fuller understanding of the present invention is provided by the following detailed description of the embodiments, making reference to the accompanying drawings.

Figure 1:
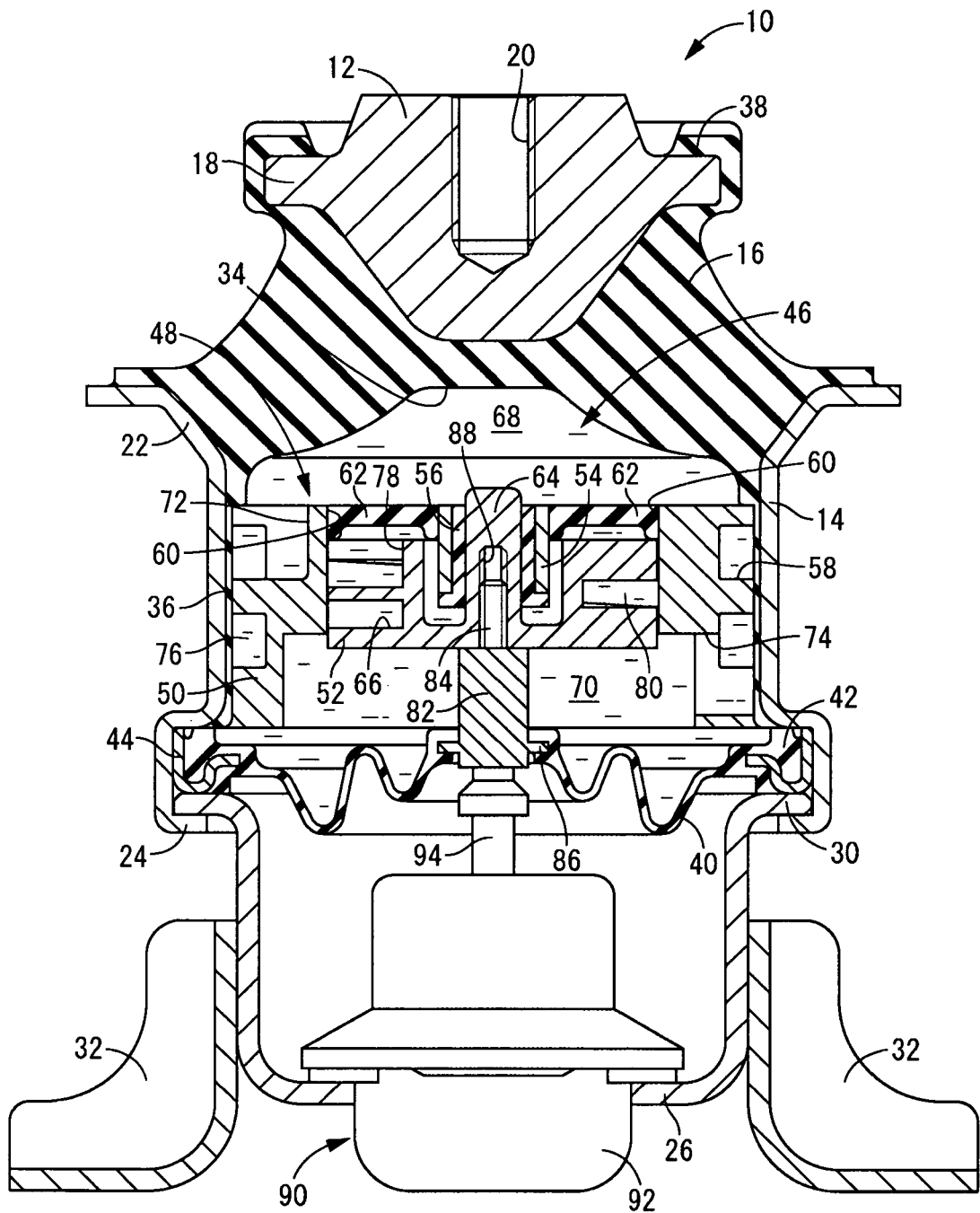
FIG. 1 is a vertical cross sectional view of an automobile engine mount according to a first embodiment of the present invention of a fluid filled vibration damping device where a second orifice passage is blocked.
Figure 2:
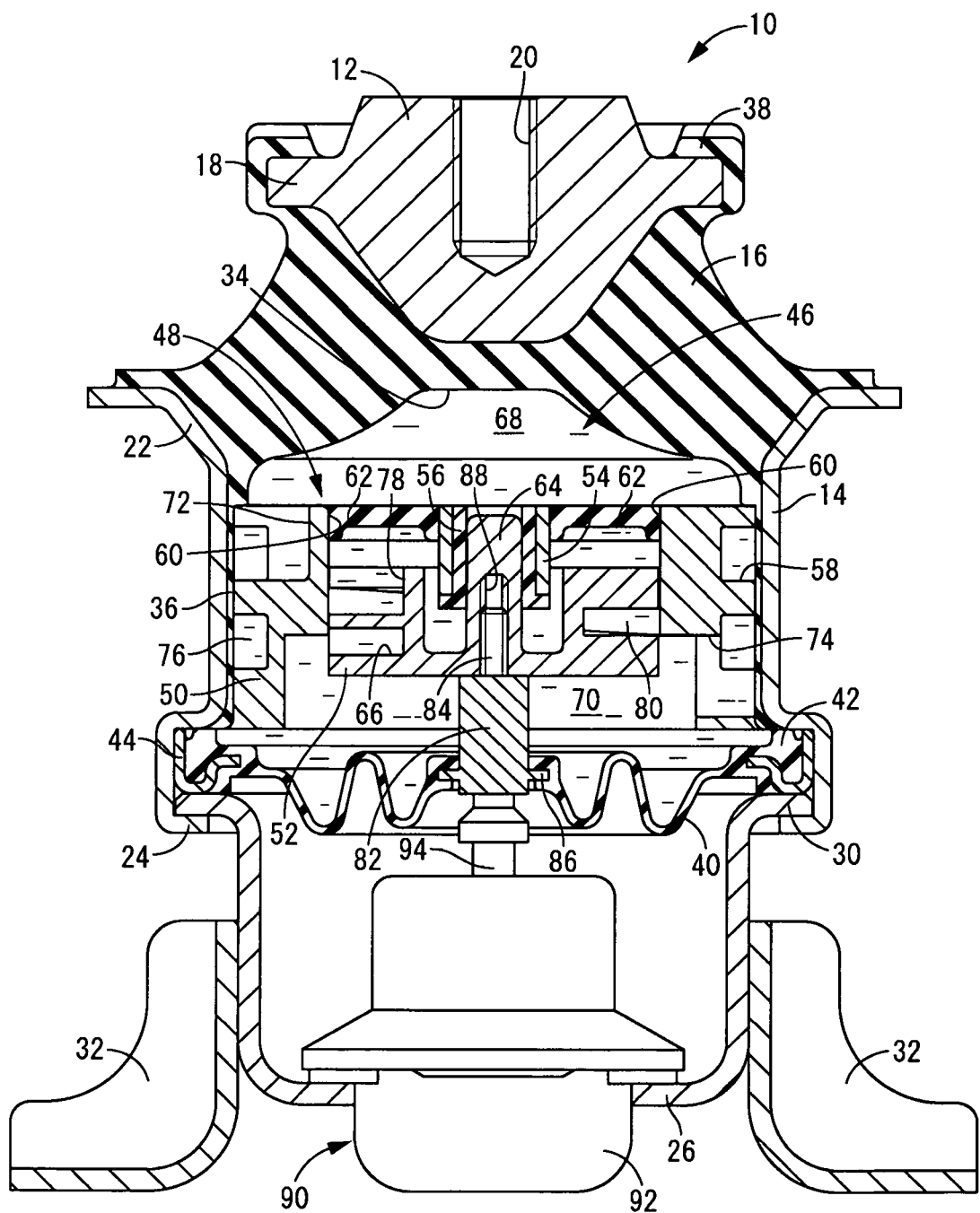
FIG. 2 is a vertical cross sectional view of the engine mount where the second orifice passage establishes longer passage length.
Figure 3:
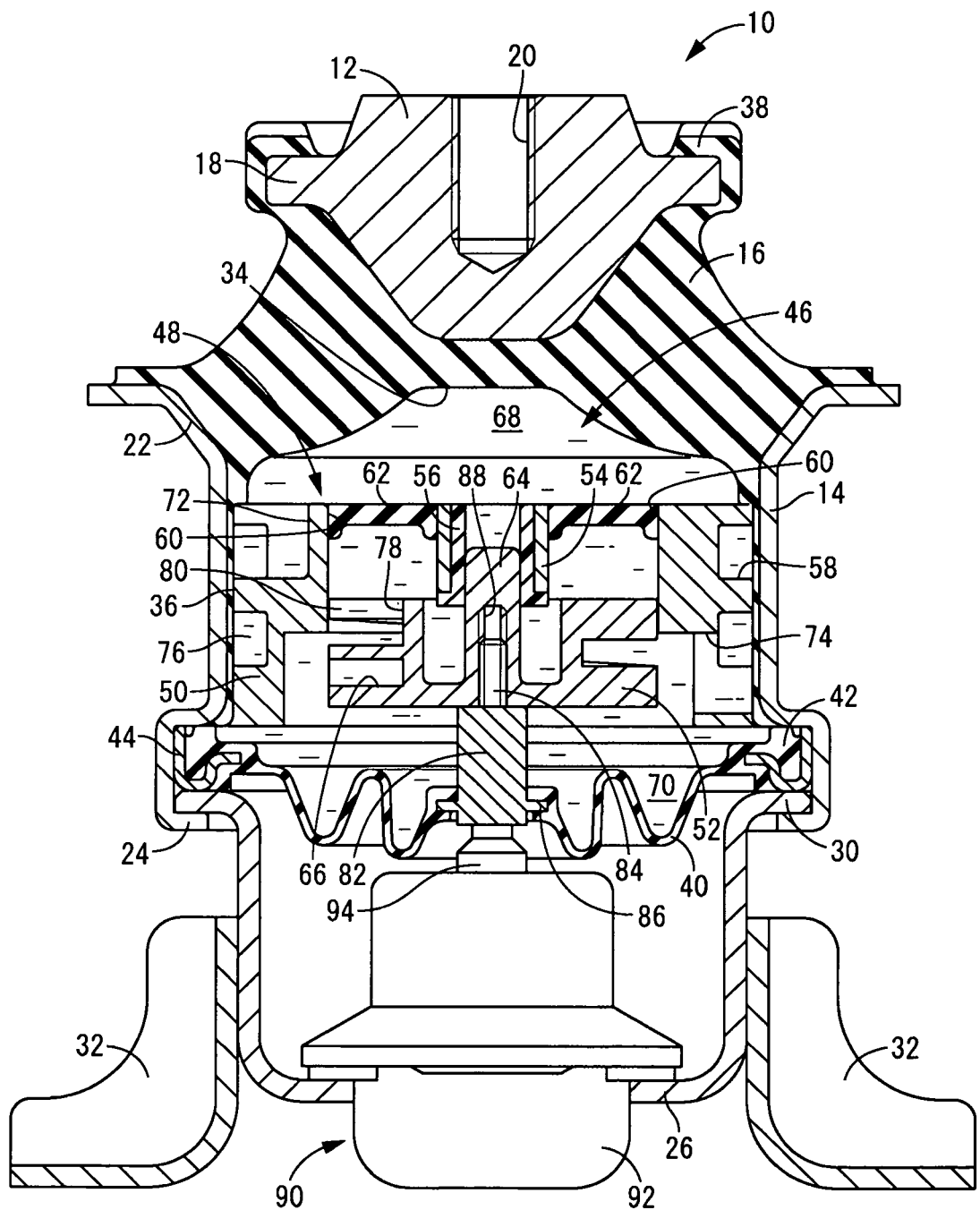
FIG. 3 is a vertical cross sectional view of the engine mount where the second orifice passage establishes shorter passage length.

First, FIGS. 1 to 3 depict an automotive engine mount 10 as a first embodiment of a fluid-filled vibration damping device constructed in accordance with the present invention. The engine mount 10 has a construction in which a first mounting fitting 12 provided as a first mounting member and a second mounting fitting 14 provided as a second mounting member are linked to one another by a main rubber elastic body 16. The first mounting fitting 12 is mounted onto the power unit (not shown) side, while the second mounting fitting 14 is mounted onto the vehicle body (not shown) side, so that the engine mount 10 provides vibration damping linkage between the power unit and the vehicle body.

To describe in greater detail, the first mounting fitting 12 has a small-diameter, approximately circular block shape, the upper part of which has tapered contours of gradually decreasing diameter towards the top in the axial direction, and the lower part of which has tapered contours of gradually decreasing diameter towards the bottom in the axial direction. In the axially medial section of the first mounting fitting 12 there is integrally formed a flange portion 18 that projects peripherally outward about the entire circumference. In the diametrical center part of the first mounting fitting 12 there is formed a bolt hole 20 that extends along the center axis and opens onto the upper end face, with the first mounting fitting 12 adapted to be secured to the power unit side by a mounting bolt (not shown) threaded into the bolt hole 20.

The second mounting fitting 14 has a thin-walled, large-diameter approximately round tubular shape, at the upper end of which is provided a tapered tube portion 22 of gradually increasing diameter towards the top in the axial direction. At the bottom end of the second mounting fitting 14 there is integrally formed a swaging piece 24 of tubular form projecting downward from the outside peripheral edge of a step that flares outward in the axial direction. Also, a bracket 26 is arranged axially below the second mounting fitting 14, and is secured in place by the swaging piece 24. This bracket 26 has approximately bottomed round tubular shape, and at the rim of the opening at its axial upper side there is integrally formed a support piece 30 of flange form that projects peripherally outward, with the support piece 30 being supported by the swaging piece 24 thereby securing the bracket 26 to the second mounting fitting 14. Additionally, several mounting leg portions 32 are mounted on the outside peripheral face of the bracket 26 so that the second mounting fitting 14 may be secured to the vehicle body through the agency of the bracket 26 by securing the mounting leg portions 32 to the vehicle body with bolts or the like.

The first mounting fitting 12 and the second mounting fitting 14 coaxially situated with the first mounting fitting 12 positioned at a distance above the upper opening of the second mounting fitting 14. The main rubber elastic body 16 is then interposed between the first mounting fitting 12 and the second mounting fitting 14 so that the first mounting fitting 12 and the second mounting fitting 14 are elastically linked. The main rubber elastic body 16 has approximately truncated cone shape to which the bottom part of the first mounting fitting 12 has been vulcanization bonded while embedded into the small-diameter end, while the tapered tube portion 22 of the second mounting fitting 14 has been superposed against and vulcanization bonded to the outside peripheral face of the large-diameter end. In the end at the lower side (the large-diameter side) of the main rubber elastic body 16 there is formed a large-diameter recess 34 of inverted bowl shape opening onto the lower end face. At the rim of the opening of the large-diameter recess 34 a seal rubber layer 36 having a thin-walled round tubular shape has been integrally formed with the main rubber elastic body 16, and extends axially downward while being vulcanization bonded to the inside peripheral face of the second mounting fitting 14. A stopper rubber 38 of annular form is integrally formed at the upper end of the main rubber elastic body 16 and anchored thereon so as to sheath the outside peripheral face and upper face of the flange portion 18 of the first mounting fitting 12. In the present embodiment, the main rubber elastic body 16 takes the form of an integrally vulcanization molded component incorporating the first mounting fitting 12 and the second mounting fitting 14.

At the lower end of the second mounting fitting 14 there is arranged a diaphragm 40 provided as the flexible film. The diaphragm 40 is a thin rubber film of approximately circular disk shape having ample slack in the axial direction. An anchor rubber 42 of annular form is integrally formed at the outside peripheral edge of the diaphragm 40, and a fastener fitting 44 of annular form has been vulcanization bonded to this anchor rubber 42. The fastener fitting 44 is then slipped into the lower opening of the second mounting fitting 14 and secured in place with the swaging piece 24, thereby positioning the diaphragm 40 at the lower opening of the second mounting fitting 14. The diaphragm 40 takes the form of an integrally vulcanization molded component incorporating the fastener fitting 44.

With the diaphragm 40 installed in the above manner, the upper opening of the second mounting fitting 14 will be blocked off by the main rubber elastic body 16, while the lower opening of the second mounting fitting 14 will be blocked off by the diaphragm 40. A fluid chamber 46 filled with a non-compressible fluid is thereby defined to the inside peripheral side of the second mounting fitting 14. While no particular limitation is imposed as to the non-compressible fluid filling the fluid chamber 46, favorable examples are water, alkylene glycols, polyalkylene glycols, silicone oil, and mixtures of these. In terms of advantageously achieving vibration damping based on flow action of the fluid discussed later, it is preferable to employ low-viscosity fluids having viscosity of 0.1 Pa•s or lower.

A partition member 48 is arranged in the fluid chamber 46. The partition member 48 has a thick, approximately circular disk shape on the whole, and is supported by the second mounting fitting 14. The partition member 48 further includes a first orifice-defining member 50 provided as an outer orifice member, and a second orifice-defining member 52 provided as an inner orifice member.

The first orifice-defining member 50 on the whole has an inverted, approximately bottomed round tubular shape whose peripheral wall takes the form of tubular portion of round tube contours. In the present embodiment, a step has been formed on the inside peripheral face of the first orifice-defining member 50 in the axially medial section of its tubular portion, so as to advantageously ensure ample volume for an equilibrium chamber 70, discussed later. A circumferential groove 58 of helical form extending for a length approximately equal to the circumference while sloping in the axial direction is formed in the tubular portion of the first orifice-defining member 50, so as to open onto the outside peripheral face.

Also, in the diametrical center section of the first orifice-defining member 50 there is integrally formed a support tube portion 54 of small-diameter round tubular shape projecting downward from the upper base wall portion. A guide sleeve 56 of tube form is inserted into and secured in the support tube portion 54. This guide sleeve 56 is made of self-lubricating synthetic resin, or has been coated with grease, to give the inside peripheral face a sufficiently low coefficient of friction.

Further, in the upper base wall portion of the first orifice-defining member 50 there are formed a plurality of through-holes 60 spaced apart in the circumferential direction and passing through it in the axial direction to the outside peripheral side of the support tube portion 54. In the present embodiment, a first moveable rubber film 62 provided as respective flow regulating means is arranged over these through-holes 60. This first moveable rubber film 62 is a rubber elastic body of plate form having a flat profile corresponding in shape to the through-holes 60, and has been vulcanization bonded along the entire circumference of its outside peripheral face to the first orifice-defining member 50. The through-holes 60 are thereby respectively blocked off by the first moveable rubber film 62.

The second orifice-defining member 52 has a small-diameter, approximately bottomed round tubular shape thicker in its peripheral wall than in its base wall part. In the diametrical center section of the second orifice-defining member 52 there is integrally formed a guide projection 64 provided as a guide projection of approximately circular post shape projecting upward from the base wall part. This guide projection 64 has outside diameter approximately equal to the inside diameter of the guide sleeve 56 which has been secured to the first orifice-defining member 50. An orifice-defining groove 66 provided as an orifice-defining window and having helical form extending in the circumferential direction while sloping in the axial direction is formed in the second orifice-defining member 52, so as to open onto its outside peripheral face. In the present embodiment, the orifice-defining groove 66 has circumferential length about equal to the circumference.

The second orifice-defining member 52 is fitted into the center hole of the tubular part of the first orifice-defining member 50 and is arranged therein so as to be relatively displaceable in the axial direction, thus constituting the partition member 48. In the present embodiment, axial direction guide means are provided to the upper side of the second orifice-defining member 52 by inserting the guide projection 64 which is integrally formed on the second orifice-defining member 52 into the guide sleeve 56 which has been installed in the first orifice-defining member 50. Thus, utilizing sliding contact between the inside peripheral face of the guide sleeve 56 and the outside peripheral face of the guide projection 64, relative displacement of the first orifice-defining member 50 and the second orifice-defining member 52 in the axial direction will be allowed, while relative displacement in the axis-perpendicular direction will be limited so as to relatively position the members.

The partition member 48 constructed in the above manner is arranged with the first orifice-defining member 50 fitting into the axially medial section of the second mounting fitting 14 so as to be supported at its outside peripheral face, and is thereby supported by the second mounting fitting 14. The partition member 48 is then arranged inside the fluid chamber 46 so as to extend in the axis-perpendicular direction, dividing the fluid chamber 46 into two axial sides with the partition member 48 between them. Specifically, to the axial upper side of the partition member 48 there is defined a pressure-receiving chamber 68 whose wall is partly constituted by the main rubber elastic body 16 and that experiences internal pressure fluctuations during vibration input. To the axial lower side of the partition member 48 there is defined an equilibrium chamber 70 whose wall is partly constituted by the diaphragm 40 and which readily allows change in volume by virtue of the flexibility of the diaphragm 40. The pressure-receiving chamber 68 and the equilibrium chamber 70 are filled with the non-compressible fluid that fills the fluid chamber 46.

The outside peripheral face of the first orifice-defining member 50 is superposed against the inside peripheral face of the second mounting fitting 14 via the intervening seal rubber layer 36 so that the outside peripheral opening of the circumferential groove 58 is covered fluidtightly by the second mounting fitting 14. A first lengthwise end of the circumferential groove 58 connects with the pressure-receiving chamber 68 through a communicating hole 72, while the other end connects with the equilibrium chamber 70 through a communicating hole 74. By so doing the circumferential groove 58 is utilized to define a first orifice passage 76 provided as a fluid passage that extends for prescribed distance in the circumferential direction to connect the pressure-receiving chamber 68 and the equilibrium chamber 70 to one another. By adjusting the ratio (A/L) of passage cross sectional area (A) to passage length (L) with consideration to the wall spring rigidity of the pressure-receiving chamber 68 and the equilibrium chamber 70, the first orifice passage 76 can be tuned to a low frequency corresponding to engine shake. The first orifice passage 76 assumes a continuous communicating state.

The outside peripheral face of the second orifice-defining member 52 is superposed against the inside peripheral face of the first orifice-defining member 50 so that the outside peripheral opening of the orifice-defining groove 66 is at least partially covered by the first orifice-defining member 50. Additionally, a first circumferential end of the orifice-defining groove 66 communicates with the pressure-receiving chamber 68 through a communicating hole 78 that opens onto the upper end face of the second orifice-defining member 52; and at least a portion of the orifice-defining groove 66 along its circumference is situated below and away from the first orifice-defining member 50 so as to communicate with the equilibrium chamber 70. By so doing the orifice-defining groove 66 is utilized to define a second orifice passage 80 provided as an orifice passage connecting the pressure-receiving chamber 68 and the equilibrium chamber 70 to one another. The second orifice passage 80 is tuned to higher frequency than the first orifice passage 76; in the present embodiment, it is tuned to a midrange- to high-frequency corresponding to idling vibration or lockup rumble.

Furthermore, in the present embodiment, the first moveable rubber film 62 is situated on the fluid path that leads through the second orifice passage 80. Specifically, the first moveable rubber film 62 is arranged extending in the axis-perpendicular direction towards the pressure-receiving chamber 68 side from the second orifice-defining member 52; and the opening of the second orifice passage 80 on the pressure-receiving chamber 68 end (i.e. the communicating hole 78) is covered by the first moveable rubber film 62. Thus, under conditions permitting elastic deformation of the first moveable rubber film 62, fluid flow through the second orifice passage 80 will be produced on the basis of the liquid pressure transmission action of the first moveable rubber film 62. Meanwhile, under constrained conditions in which elastic deformation of the first moveable rubber film 62 is inhibited, the opening of the second orifice passage 80 on the pressure-receiving chamber 68 end will be sealed off, restricting fluid flow through the second orifice passage 80. That is, the second orifice passage 80 is switched between the communicating state and the blocked state by the first moveable rubber film 62.

An actuation member 82 is attached to the second orifice-defining member 52. The actuation member 82 has a small-diameter, approximately round post shape integrally furnished with a linking bolt 84 that projects axially upward. An anchoring flange 86 of annular form is integrally formed in the axially medial section of the actuation member 82 and projects peripherally outward from it. By threading the linking bolt 84 into a screw hole 88 that has been formed in the diametrical center part of the second orifice-defining member 52, the actuation member 82 is secured to the second orifice-defining member 52 and superposed against its bottom face.

The actuation member 82 is arranged so as to pass in the axial direction through the diametrical center part of the diaphragm 40. Specifically, in the diametrical center part of the diaphragm 40 there is formed a circular passage hole the rim of whose opening has been vulcanization bonded to the anchoring flange 86 of the actuation member 82. The actuation member 82 is thereby secured at its axial upper part to the second orifice-defining member 52 inside the fluid chamber 46, while its axial lower part is exposed to the outside of the fluid chamber 46.

An actuator 90 is attached to the actuation member 82. The actuator 90 is situated below the equilibrium chamber 70 with the diaphragm 40 between them, and is adapted to convert rotational actuating force of a stepping motor (pulse motor) into reciprocating actuating force in the axial direction by a motion conversion mechanism and output the force; it includes a stepping motor, a motion conversion mechanism, a gear train, and so on. A housing 92 for housing the stepping motor, motion conversion mechanism, gear train etc. is supported by the bracket 26, and secured to the second mounting fitting 14 via the bracket 26.

The actuator 90 has an output shaft 94. The output shaft 94 has a small-diameter, approximately rod shape extending along the center axis of the mount and secured at its upper end to the actuation member 82 so as to constitute the actuator shaft. While not shown explicitly in the drawings, at the lower end of the output shaft 94 there is provided a motion conversion mechanism such as a screw mechanism or cam mechanism for converting rotational actuating force of the stepping motor into reciprocating actuating force in the axial direction. The actuating force of the stepping motor is then transmitted as reciprocating actuating force to the output shaft 94 via the motion conversion mechanism and an appropriate gear train.

The output shaft 94 is displaceable in reciprocating fashion in the axial direction by virtue of the actuating force of the stepping motor so as to bring about displacement in the axial direction of the actuation member 82 which is secured to the output shaft 94. The second orifice-defining member 52 which is secured to the actuation member 82 undergoes displacement in the axial direction by the actuating force of the stepping motor; and the relative position of the second orifice-defining member 52 in the axial direction with respect to the first orifice-defining member 50 is controlled through control of the amount of rotation of the actuating shaft in the stepping motor. The actuating shaft of the present embodiment is made up of the actuation member 82 and the output shaft 94.

Thus, by changing the relative position of the second orifice-defining member 52 in the axial direction with respect to the first orifice-defining member 50, in the orifice-defining groove 66 which has been formed in the second orifice-defining member 52 the zone covered by the first orifice-defining member 50 will change in the lengthwise direction of the orifice-defining groove 66. It is accordingly possible to vary the passage length (L) of the second orifice passage 80 while holding constant the passage cross sectional area (A) of the second orifice passage 80, making it possible through control of the stepping motor to reset the tuning frequency of the second orifice passage 80, which is established by the ratio (A/L) of passage cross sectional area to passage length.

With an automotive engine mount constructed in the above manner installed in a vehicle, if low-frequency, large-amplitude vibration corresponding to engine shake is input, fluid flow will be produced through the first orifice passage 76 on the basis of relative pressure fluctuations of the pressure-receiving chamber 68 and the equilibrium chamber 70. The intended vibration damping (high attenuating action) will then be produced on the basis of flow action such as resonance action of the fluid caused to flow through the first orifice passage 76.

As shown in FIG. 1, at times of input of such low-frequency, large-amplitude vibration, the second orifice-defining member 52 will be positioned at top in the displacement direction. Thus, the entire outside peripheral opening of the orifice-defining groove 66 will be covered by the first orifice-defining member 50, closing off the opening of the second orifice passage 80 into the equilibrium chamber 70. As a result, internal pressure in the pressure-receiving chamber 68 will be prevented from escaping due to fluid flow through the second orifice passage 80, so as to efficiently ensure an ample amount of fluid flowing through the first orifice passage 76. As will be appreciated from the preceding description, in the present embodiment, the peripheral wall (tubular part) of the first orifice-defining member 50 is utilized to form the cover part.

On the other hand, at times of input of midrange- to high-frequency vibration corresponding to idling vibration, the second orifice-defining member 52 will experience axial downward movement so that the outside peripheral opening of the orifice-defining groove 66 becomes situated partially below and away from the first orifice-defining member 50. By so doing, the opening on the equilibrium chamber 70 end of the second orifice passage 80 will be switched to the communicating state so that the pressure-receiving chamber 68 and the equilibrium chamber 70 now communicate through the second orifice passage 80. Fluid flow will then arise through the second orifice passage 80, and vibration damping will be produced on the basis of flow action of the fluid. In this engine mount 10 in particular, the wall of the second orifice passage 80 is defined by the first orifice-defining member 50 and the second orifice-defining member 52, and the second orifice passage 80 is a passage of tunnel form. Thus, even at times of fluid flow, the second orifice passage 80 will maintain consistent passage shape so that the intended vibration damping is obtained effectively and efficiently. At times of input of midrange- to high-frequency vibration, because the first orifice passage 76 becomes blocked off due to antiresonance action a sufficient level of fluid flow through the second orifice passage 80 will be advantageously assured.

Further, in the present embodiment, effective vibration damping can be achieved against midrange- to high-frequency vibration (lockup rumble) that occurs on the basis of torque fluctuations by the lockup when moving at constant speed. Specifically, in the present embodiment, the first moveable rubber film 62 is arranged so as to cover the opening at the pressure-receiving chamber 68 end of the second orifice passage 80. By so doing, with the opening at the equilibrium chamber 70 end of the second orifice passage 80 being held in the communicating state, if low-frequency, large-amplitude vibration corresponding to engine shake is input, the second orifice passage 80 will assume a substantially blocked state based on the flow limiting action of the first moveable rubber film 62. For this reason, even with the opening at the equilibrium chamber 70 end of the second orifice passage 80 in the communicating state depicted in FIGS. 2 and 3, effective vibration damping by the first orifice passage 76 can be achieved against low-frequency, large-amplitude vibration. Thus, as long as the opening at the equilibrium chamber 70 end of the second orifice passage 80 is held in the communicating state when the vehicle is moving, effective vibration damping based on flow action of fluid in the second orifice passage 80 can be produced against midrange- to high-frequency vibration corresponding to lockup rumble so that better vibration damping characteristics may be achieved when moving. Vibration damping on the part of the first orifice passage 76 will be more advantageously produced as the tuning frequency of the second orifice passage 80 changes towards the high-frequency band with respect to the tuning frequency of the first orifice passage 76, so ample vibration damping of engine shake can be attained as well, while at the same time effectively attaining vibration damping of lockup rumble, which represents vibration having relatively high frequency.

By changing the relative position of the first orifice-defining member 50 and the second orifice-defining member 52 in the axial direction in response to changes in frequency of input vibration, the tuning frequency of the second orifice passage 80 can be reset on a continuum or stepwise. For example, at times of midrange-frequency vibration input, by positioning the second orifice-defining member 52 midway along the displacement direction as shown in FIG. 2 to switch the second orifice passage 80 to the communicating state as well as establish longer passage length for the second orifice passage 80, the tuning frequency of the second orifice passage 80 can be set to a midrange frequency. At times of input of high-frequency vibration on the other hand, by positioning the second orifice-defining member 52 at the bottom along the displacement direction as shown in FIG. 3 to switch the second orifice passage 80 to the communicating state as well as establish shorter passage length of the second orifice passage 80, the tuning frequency of the second orifice passage 80 can be set to a high frequency. Through adjustment of the tuning frequency of the second orifice passage 80 carried out in this way, effective vibration damping can be attained over a wide frequency range from midrange to high frequencies. In the present embodiment, through adjustment of the extent of rotation of the actuator shaft of the stepping motor, the passage length of the second orifice passage 80 can be adjusted appropriately within a range from the maximum extension depicted in FIG. 2 to the minimum extension depicted in FIG. 3, making it possible for the tuning frequency of the second orifice passage 80 to be reset in multiple steps.

In this engine mount 10, the circumferential groove 58 that defines the first orifice passage 76 is formed so as to extend in the circumferential direction. For this reason, passage length of the first orifice passage 76 can be advantageously assured, and tuning of the first orifice passage 76 to low frequencies will be possible with a high degree of freedom. Moreover, in the present embodiment, the first orifice passage 76 is formed so as to extend along the outside peripheral edge part of the large-diameter first orifice-defining member 50. Thus, a first orifice passage 76 of ample passage length can be formed with good space efficiency.

Further, in this engine mount 10, the orifice-defining groove 66 that defines the second orifice passage 80 is formed so as to extend in a helical pattern in the circumferential direction. Thus, passage length of the second orifice passage 80 can be advantageously assured, and it will be possible for the tuning frequency of the second orifice passage 80 to be reset over a wider frequency range.

Because the first orifice passage 76 which is tuned to low frequency is formed in the large-diameter first orifice-defining member 50, while the second orifice passage 80 which is tuned to midrange to high frequency and has relatively short passage length is formed in the small-diameter second orifice-defining member 52, the first and second orifice passages 76, 80 can be formed with good space efficiency, while ensuring ample freedom in tuning. Thus, a high-performance engine mount 10 of double-orifice construction affording variable tuning frequency of the second orifice passage 80 can be achieved in a compact structure without increasing the size of the unit.

Additionally, the first orifice-defining member 50 is secured to the second mounting fitting 14, while the second orifice-defining member 52 undergoes reciprocating actuation by the actuator 90. Thus, as compared to a scenario involving actuation of the first orifice-defining member 50, short-circuiting of the first orifice passage 76 can be avoided. Moreover, by actuating the second orifice-defining member 52, which is relatively small in diameter and light in weight, the actuating force required of the actuator 90 can be minimized to achieve reductions in heat emission and power consumption.

A guide mechanism adapted to relatively position the first orifice-defining member 50 and the second orifice-defining member 52 in the axis-perpendicular direction and to guide relative displacement of the first and second orifice-defining members 50, 52 in the axial direction is realized through a bearing mechanism composed of the support tube portion 54, the guide sleeve 56, and the guide projection 64. Thus, as compared to the case where the inside peripheral face of the first orifice-defining member 50 and the outside peripheral face of the second orifice-defining member 52 constitute the guide mechanism for the first and second orifice-defining members 50, 52, operation failure or damage due to sticking can be prevented.

Figure 4:
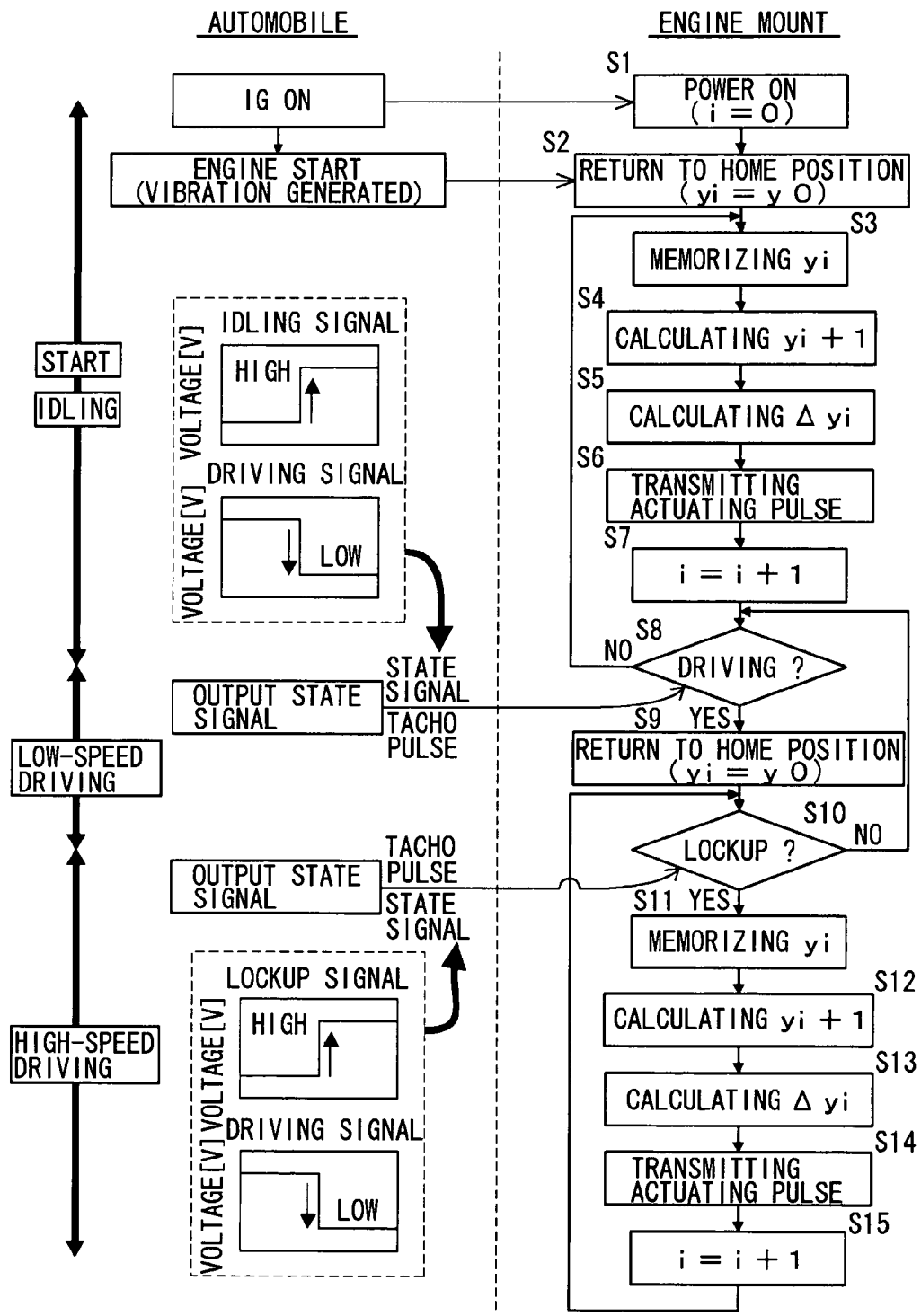
FIG. 4 is a flow chart depicting an example of a control method for the engine mount.

FIG. 4 depicts an example of a control method for the automotive engine mount 10, shown by a flowchart and a graph. The following description of the control method makes reference to FIG. 4.

First, in Step (hereinafter denoted by "S") 1, a power-on process to activate the power supply is executed. This power-on process will be executed, for example, when the ignition switch of the automobile is turned to ON.

Next, in S2, by inputting a power-on signal to the stepping motor, a home position return process for rotating the actuator shaft of the stepping motor to return the second orifice-defining member 52 to its home position is executed. In the present embodiment, the home position refers to the position of the second orifice-defining member 52 shown in FIG. 1 in which it blocks the opening at the equilibrium chamber 70 side of the second orifice passage 80; $y_0$ denotes the actuation step number of the stepping motor when holding the second orifice-defining member 52 at the home position. Through this home position return process, the system will be switched to shake mode depicted in FIG. 1 in which the second orifice passage 80 is blocked, so that vibration damping will be advantageously produced by the first orifice passage 76 against low-frequency, high-amplitude vibration during engine startup. Actuation steps refer to rotation of the actuator shaft by a prescribed angle occurring with input of a single pulse to the stepping motor; actuation step number means substantially the same thing as input pulse number to the stepping motor.

Next, in S3, the current actuation step number: $y_i$ of the actuator shaft of the stepping motor is placed in memory.

Next, in S4, an actuation step number: $y_{i+1}$ of the stepping motor depending on engine rpm: $x_{i+1}$ is calculated using the arithmetic expression given in Expression 1 below. In Expression 1, $x_{i+1}$ denotes engine rotations per minute at a specific point in time: i+1; n is a multiplying factor determined according to the engine model (the number of cylinders); and a and b are constants determined according to vehicle characteristics.

[Expression 1]

Then, in S5, the required step number: $\Delta y_i$ of the actuator shaft depending on engine rpm is calculated on the basis of $y_i$ and $y_{i+1}$, using the equation below.

[Expression 2]

In S6, the required step number: $\Delta y_i$; that was calculated through the above operation is transmitted as an actuating pulse to the stepping motor. The actuator shaft of the stepping motor will then rotate by the equivalent of the required step number: $\Delta y_i$; to bring about displacement of the actuation member 82 by a prescribed amount in the axial direction, thereby varying the passage length of the second orifice passage 80 according to the speed of the engine. As a result, the tuning frequency of the second orifice passage 80 will be reset in response to a change in frequency to idling vibration according to engine speed, so that the second orifice passage 80 may efficiently produce vibration damping.

In S8, after adding 1 to i, in S9 it will be determined whether the automobile is moving or idling. Specifically, it will be determined whether a state signal output by the engine control unit (ECU) of the automobile is an idling state signal or a moving state signal. If the state signal is an idling state signal, the process beginning from S3 will be executed again. By so doing, the second orifice passage 80 can be held in the communicating state so that the second orifice passage 80 effectively produces vibration damping of idling vibration, which can be a problem when the automobile is at a stop. No particular limitation is imposed on the state signals, and it would be acceptable, for example, for signals of mutually different voltage to serve as the idling state signal (high voltage) and the moving state signal (low voltage), as depicted in the graph in FIG. 4.

On the other hand, if a moving state signal is input in S8, in S9 the home position return process will be executed. By so doing, the second orifice passage 80 will assume the blocked state so that the first orifice passage 76 effectively produces vibration damping of engine shake, which can be a problem when driving at low speed.

Further, in S10, a lockup determination will be made. Specifically, it will be determined whether the state signal output by the ECU is a moving state signal or a lockup signal. Then, if the input signal is a moving state signal, the process beginning from S8 will be executed again. By so doing, both vibration damping by the first orifice passage 76 in the moving state and vibration damping by the second orifice passage 80 in the idling state can take place effectively. As shown in the graph in FIG. 4, in the present embodiment, the lockup signal is a high-voltage signal.

If on the other hand a lockup signal is input in S10, in S11, the current step number: $y_i$ of the actuator shaft of the stepping motor will be placed in memory.

Next, in S12, a step number: $y_{i+1}$ of the actuator shaft of the stepping motor depending on engine rpm: $x_{i+1}$ is calculated using the arithmetic expression given in Expression 1.

Then, in S13, the required step number: $\Delta y_i$; of the actuator shaft depending on engine rpm is calculated on the basis of $y_i$ and $y_{i+1}$, using Expression 2.

In S14, the required step number: $\Delta y_i$; that was calculated through the above operation is transmitted as an actuating pulse to the stepping motor. The actuator shaft of the stepping motor will then rotate by the equivalent of the required step number: $\Delta y_i$; to bring about displacement of the second orifice-defining member 52 by a prescribed amount in the axial direction, thereby varying the passage length of the second orifice passage 80 according to the speed of the engine. As a result, the tuning frequency of the second orifice passage 80 will be reset in response to a change in frequency to lockup rumble with reference to engine speed, so that the second orifice passage 80 may efficiently produce vibration damping.

After adding 1 to i in S15, the process beginning from S10 will be repeated. By so doing, in the lockup state, the vibration damping characteristics of the engine mount 10 will be controlled on a continuous basis according to frequency changes of input vibration, so as to achieve effective vibration damping of vibration over a wide frequency range, and so as to respond to disengagement of the lockup due to shifting to lower speed.

By employing control methods such as that described above, the position of the second orifice-defining member 52 in the axial direction can be controlled with high accuracy and reset on a continuous basis, without the need for a position sensor to sense the second orifice-defining member 52 position in the axial direction.

Figure 5:
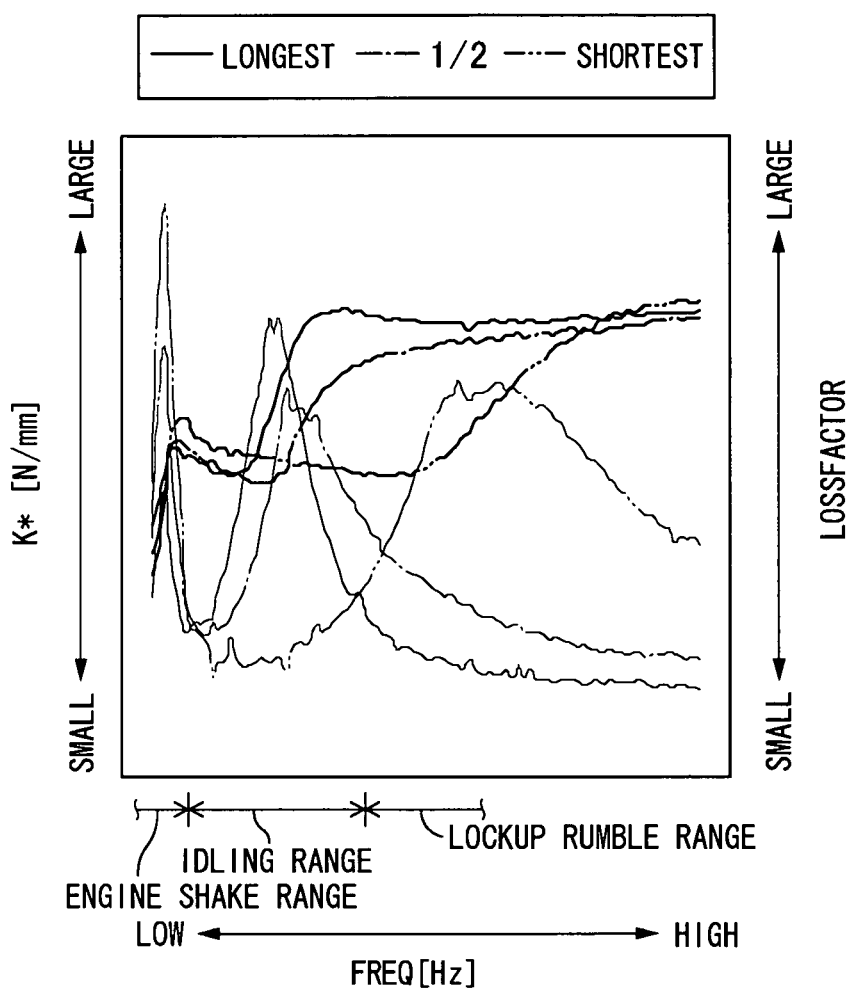
FIG. 5 is a graph depicting vibration damping characteristics of the engine mount.

FIG. 5 shows a graph depicting vibration damping characteristics of the engine mount 10 constructed according to the present embodiment. In FIG. 5, the heavy lines indicate dynamic spring action constant, and the thin lines indicate attenuation. The solid lines represent conditions with the second orifice passage 80 tuned to the lowest frequency band (FIG. 2), the dot-and-dash lines represent conditions with the second orifice passage 80 tuned to midrange frequency, and the double-dot-and-dash lines represent conditions with the second orifice passage 80 tuned to the highest frequency band (FIG. 3).

The graph shows that, in this engine mount 10, with the second orifice passage 80 set to maximum passage length, low dynamic spring action will be effectively produced over a frequency range corresponding to idling vibration; and with the second orifice passage 80 set to minimum passage length, low dynamic spring action will be effectively produced over a frequency range corresponding to lockup rumble. Thus, low dynamic spring action may be produced over a wide frequency range extending from frequencies corresponding to idling vibration to frequencies corresponding to lockup rumble. Additionally, it will be appreciated that attenuation based on fluid flow through the second orifice passage 80 will be produced over a range from frequencies corresponding to idling vibration to frequencies corresponding to lockup rumble, and that high attenuating action against rough idling and the like will be produced over a wide frequency range as well. In this way, it will be appreciated from the plots in FIG. 5 that the engine mount 10 constructed according to the present embodiment affords-effective vibration damping over a wide frequency range from midrange to high frequencies.

Figure 6:
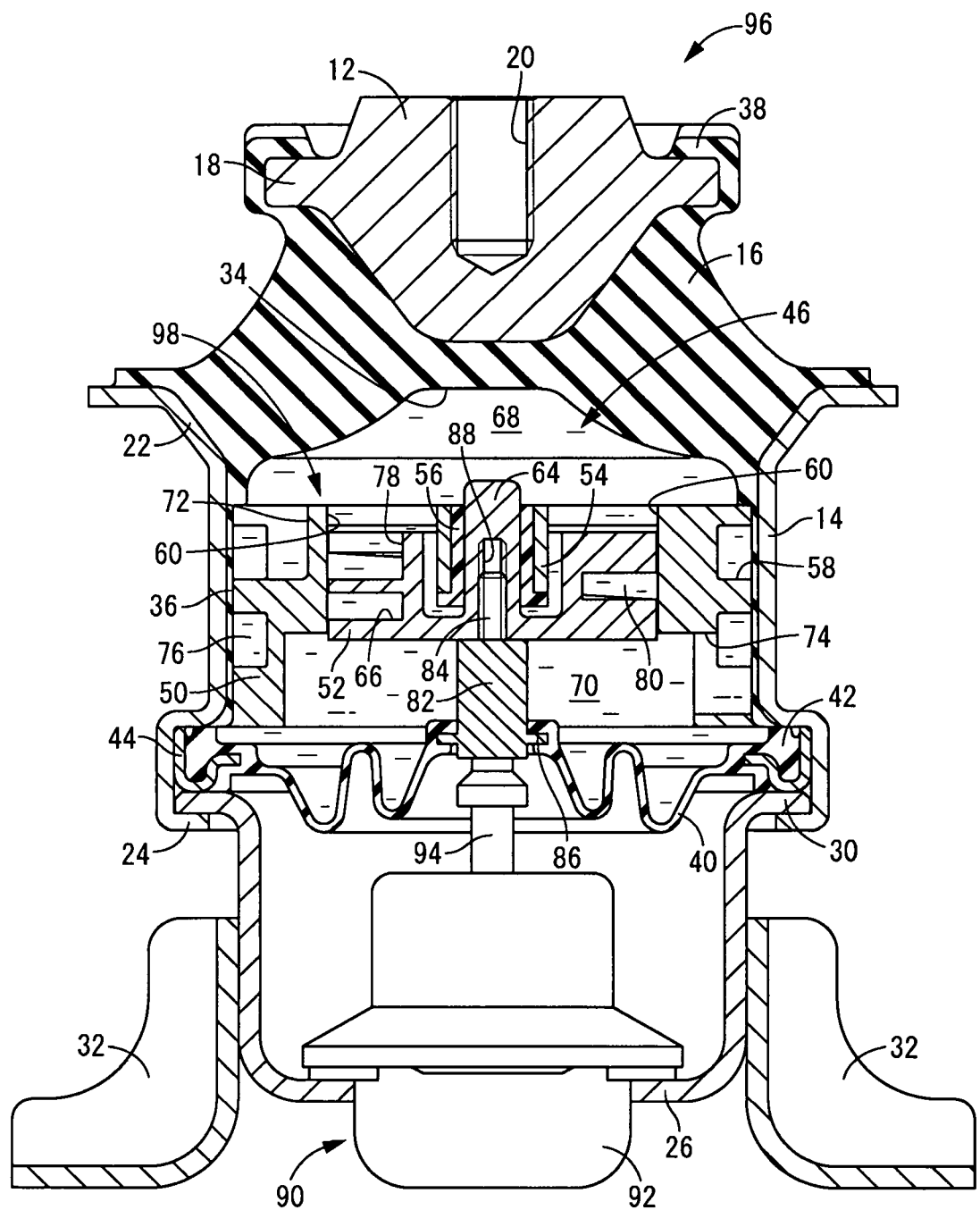
FIG. 6 is a vertical cross sectional view of an automobile engine mount according to a second embodiment of the present invention.

Next, FIG. 6 depicts an automotive engine mount 96 according to a second embodiment of the fluid-filled vibration damping device constructed according to the present invention. This engine mount 96 is furnished with a partition member 98. In the following description, components and parts that are identical to those in the first embodiment have been assigned like symbols in the drawings, omitting description.

Turning to a more detailed description, the partition member 98 differs in construction from the partition member 48 shown in the first embodiment, in that the first moveable rubber film 62 is omitted. Thus, the through-holes 60 are always open and the opening on the pressure-receiving chamber 68 end of the second orifice passage 80 is in constant communication with the pressure-receiving chamber 68.

In the engine mount 96 constructed in the above manner, when the automobile is moving, the opening at the equilibrium chamber 70 end of the second orifice passage 80 will be covered and blocked by the first orifice-defining member 50 as depicted in FIG. 6. Thus, the first orifice passage 76 will be able to produce vibration damping (high attenuating action) against low-frequency, large-amplitude vibration such as engine shake.

On the other hand, with the automobile at a stop, the second orifice-defining member 52 will undergo downward displacement in the axial direction with respect to the first orifice-defining member 50, so that the opening at the equilibrium chamber 70 side of the second orifice passage 80 connects to the equilibrium chamber 70 and fluid flow arises through the second orifice passage 80 between the pressure-receiving chamber 68 and the equilibrium chamber 70. Thus, the second orifice passage 80 will be able to produce vibration damping (low dynamic spring action) against midrange- to high-frequency vibration corresponding to idling vibration.

Accordingly, as in the first embodiment described previously, with the automobile at a stop, the passage length of the second orifice passage 80 will be controlled to adjust the vibration damping characteristics in response to input vibration. Thus, vibration damping effect afforded by the second orifice passage 80 will be produced efficiently over a wide frequency range of midrange- to high-frequencies.

Also, in the engine mount 96, because the second orifice passage 80 is held in the blocked state when the automobile is moving, control of the actuator 90 is simpler.

Figure 7:
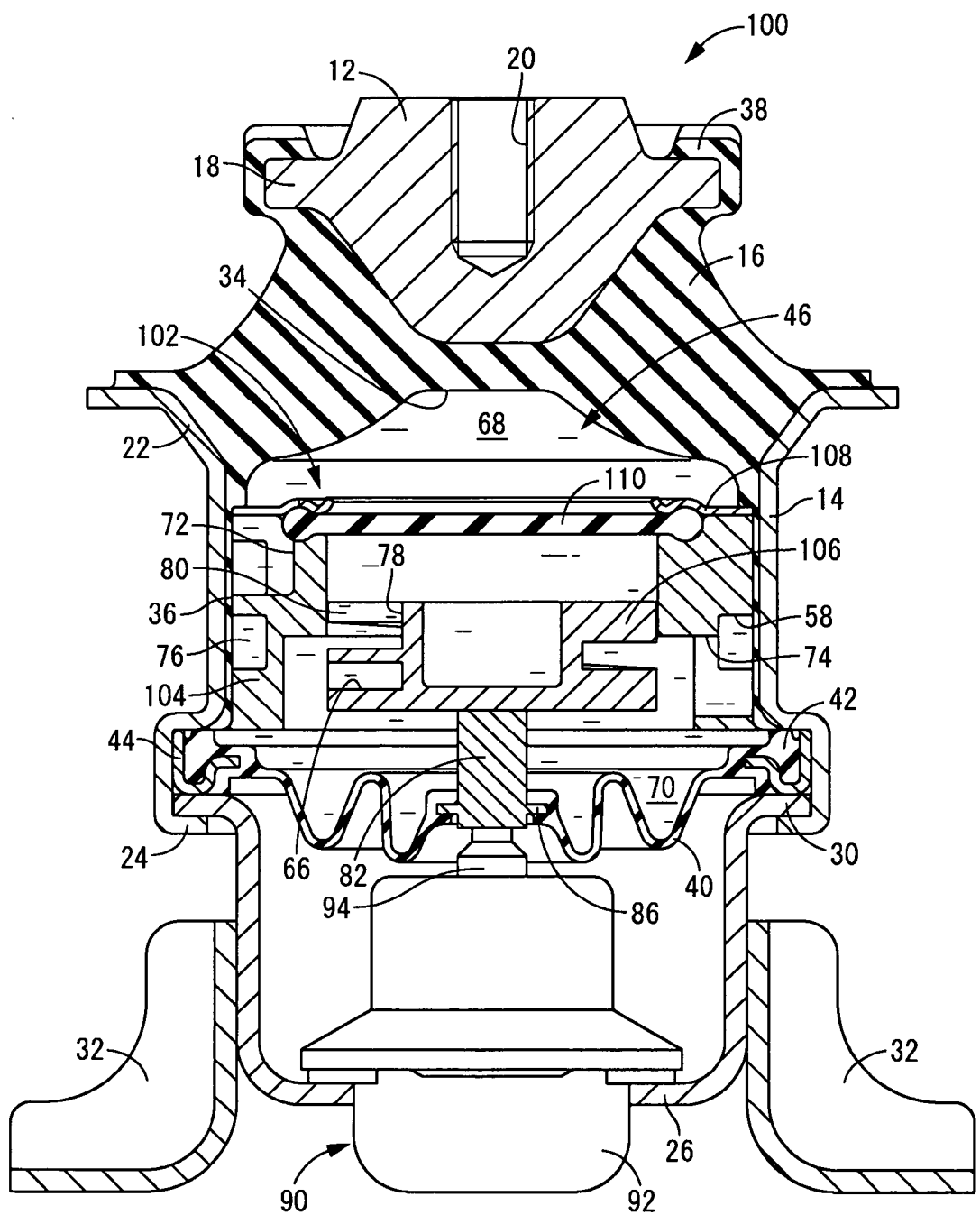
FIG. 7 is a vertical cross sectional view of an automobile engine mount according to a third embodiment of the present invention.

Next, FIG. 7 depicts an automotive engine mount 100 according to a third embodiment of the fluid-filled vibration damping device constructed according to the present invention. This engine mount 100 is furnished with a partition member 102.

Turning to a more detailed description, the partition member 102 has a thick, approximately circular disk shape on the whole, and includes a first orifice-defining member 104 provided as an outer orifice member, a second orifice-defining member 106 provided as an inner orifice member fitting inside the first orifice-defining member 104, and a cover fitting 108 superposed against the first orifice-defining member 104.

The first orifice-defining member 104 has a thick-walled, large-diameter, approximately round tubular shape of greater thickness in its axial upper side located to one side of a step formed on the inside peripheral face thereof, as compared to its lower side. That is, the first orifice-defining member 104 in the present embodiment has a structure in which the upper base wall and the support tube portion 54 have been omitted from the first orifice-defining member 50 of the first embodiment.

The second orifice-defining member 106 has approximately bottomed round tubular shape, and a structure in which the guide projection 64 at the diametrical center of the second orifice-defining member 52 in the first embodiment has been omitted.

The second orifice-defining member 106 fits into the center hole of the first orifice-defining member 104. The passage length of the second orifice passage 80 is resettable through reciprocating actuation of the second orifice-defining member 106 in the axial direction by the actuator 90. In the present embodiment, the first orifice-defining member 104 and the second orifice-defining member 106 are guided in a relative way in the axial direction by the inside peripheral face of the first orifice-defining member 104 and the outside peripheral face of the second orifice-defining member 106.

The cover fitting 108 is superposed against the first orifice-defining member 104. The cover fitting 108 has a thin, approximately annular disk shape, and is superposed against the first orifice-defining member 104 from above in the axial direction. Between the superposed faces of the cover fitting 108 and the first orifice-defining member 104 there is defined a slot that opens to the inner peripheral side. A notch is formed in the cover fitting 108 at a location corresponding to the communicating hole 72 in the first orifice-defining member 104, and the first orifice passage 76 communicates with the pressure-receiving chamber 68 through this notch.

A first moveable rubber film 110 provided as flow regulating means is arranged covering the upper opening of the first orifice-defining member 104. The first moveable rubber film 110 is made of a rubber elastic body having approximately circular disk shape, and its outside peripheral edge is clasped about the entire circumference by the first orifice-defining member 104 and the cover fitting 108 to attach it to the first orifice-defining member 104. The first moveable rubber film 110 is situated axially above the second orifice-defining member 106, and is arranged covering the opening at the pressure-receiving chamber 68 end of the second orifice passage 80.

With the engine mount 100 constructed in the above manner, vibration damping by the first orifice passage 76 against input vibration of low-frequency, and vibration damping by the second orifice passage 80 against input vibration of midrange- to high-frequency, may both be attained effectively. As in the engine mount 10 according to the first embodiment, because the amount of fluid flow through the second orifice passage 80 is limited by the first moveable rubber film 110, in the moving state the second orifice passage 80 will be open, and will afford vibration damping of midrange- to high-frequency vibration corresponding to lockup rumble.

Figure 8:
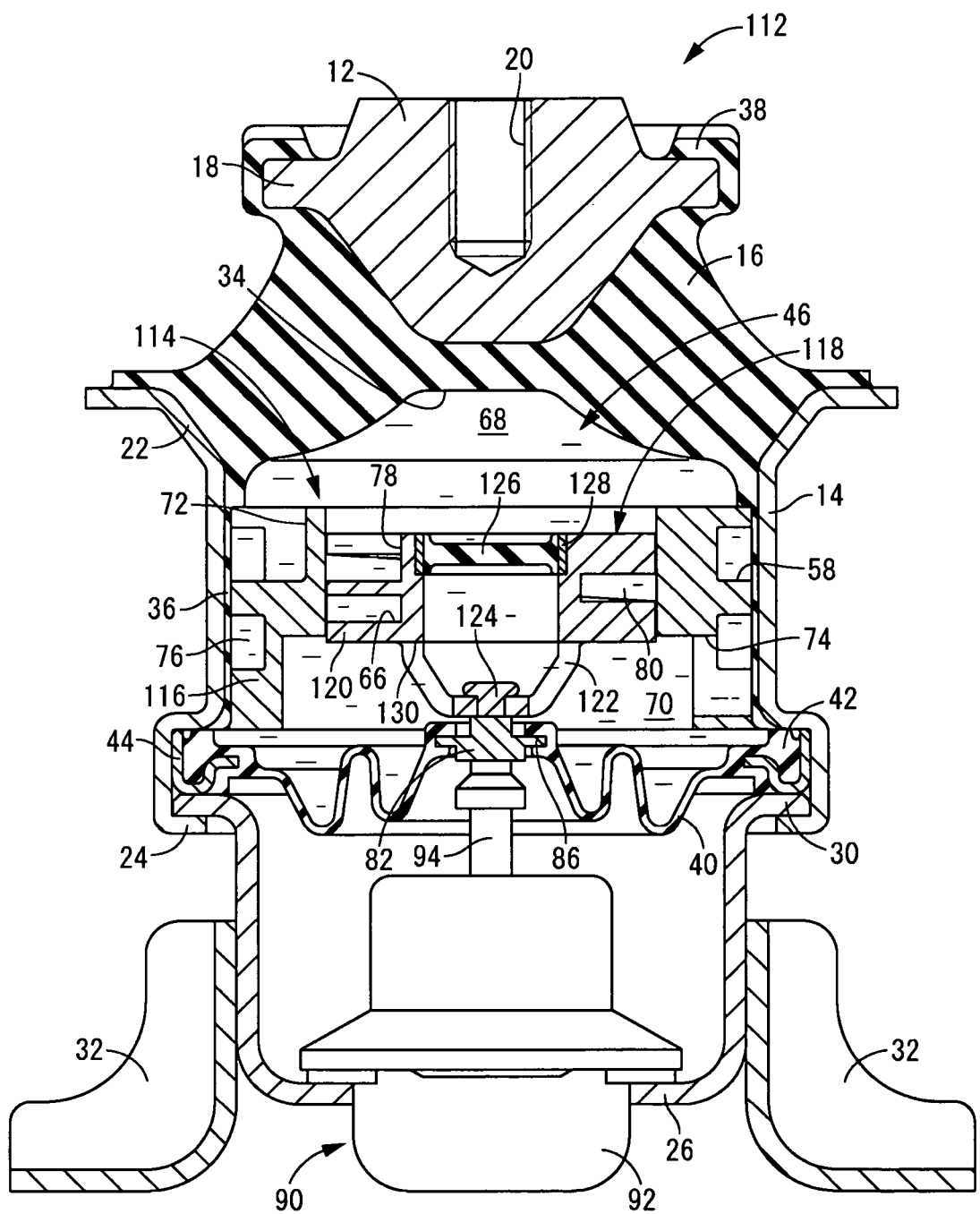
FIG. 8 is a vertical cross sectional view of an automobile engine mount according to a fourth embodiment of the present invention.

Next, FIG. 8 depicts an automotive engine mount 112 according to a fourth embodiment of the fluid-filled vibration damping device constructed according to the present invention. This engine mount 112 has a partition member 114; the partition member 114 includes a first orifice-defining member 116 provided as an outer orifice member, and a second orifice-defining member 118 provided as an inner orifice member.

The first orifice-defining member 116 is a thick, large-diameter approximately circular disk shape having a step on the inside peripheral face as well as a circumferential groove 58 formed opening onto the outside peripheral face. This first orifice-defining member 116 fits into the inside peripheral side of the second mounting fitting 14 and is supported by the second mounting fitting 14.

Meanwhile, the second orifice-defining member 118 has a passage-defining member 120 of approximately round tubular shape with an orifice-defining groove 66 extending in the circumferential direction formed on its outside peripheral section. A support portion 122 is integrally formed on the second orifice-defining member 118. This support portion 122 is approximately saucer-shaped projecting downward from the inside peripheral edge part of the passage-defining member 120, and is formed so as to cover the lower opening of the center hole of the passage-defining member 120. A small-diameter passage hole is formed passing in the axial direction through the base part of the support portion 122, and the actuation member 82 attached to the output shaft 94 of the actuator 90 is secured to the support portion 122 by a linking fitting 124 that has been inserted through the passage hole, so that the second orifice-defining member 118 may undergo reciprocating actuation in the axial direction by the actuator 90. No particular limitation is imposed on the linking fitting 124, and there could be employed, for example, a rivet, screw, or metal fitting of stepped shape adapted to be anchored to the actuation member 82.

A second moveable rubber film 126 provided as liquid pressure absorbing means is attached to the passage-defining member 120 of the second orifice-defining member 118. The second moveable rubber film 126 has approximately circular disk shape with a mating fit fitting 128 of annular shape vulcanization bonded to the outside peripheral face. The mating fit fitting 128 is then pressure-fit against the upper end of the inside peripheral edge of the passage-defining member 120 of the second orifice-defining member 118 in order to secure the second moveable rubber film 126 to the second orifice-defining member 118. The center hole of the second orifice-defining member 118 is thereby sealed off by the second moveable rubber film 126. As will be apparent from the above description, the second moveable rubber film 126 is arranged to the inside peripheral side, away from the fluid path leading through the second orifice passage 80.

A pair of slits 130, 130 are formed passing in the thickness direction through the support portion 122 of the second orifice-defining member 118. A zone defined between the opposed support portion 122 and second moveable rubber film 126 communicates with the equilibrium chamber 70 through these slits 130. Thus, the second moveable rubber film 126 will be exposed on a first face thereof to pressure of the pressure-receiving chamber 68, and exposed on the other face to pressure of the equilibrium chamber 70 through the slits 130. Elastic deformation of the second moveable rubber film 126 can thus be utilized when devising liquid pressure absorbing means adapted to transmit pressure fluctuations of the pressure-receiving chamber 68 to the equilibrium chamber 70 for absorption.

With the engine mount 112 constructed in this way, as with that of the second embodiment, vibration damping by the first orifice passage 76 will be effectively produced when the automobile is moving, while vibration damping by the second orifice passage 80 will be effectively produced when the automobile is idling.

In the present embodiment, by providing the second moveable rubber film 126, effective vibration damping can be produced against vibration of frequencies equal to or higher than the tuning frequency of the second orifice passage 80.

Specifically, when the automobile is moving, liquid pressure absorbing action based on tiny elastic deformations of the second moveable rubber film 126 will be produced in response to input of vibration of midrange frequency corresponding to lockup rumble and to input of vibration of high frequency corresponding to driving rumble. Thus, diminished vibration damping characteristics resulting from very high dynamic spring action can be prevented so that the intended vibration damping is produced.

On the other hand, with the automobile at a stop, in addition to vibration damping based on fluid flow through the second orifice passage 80, vibration damping will also be produced on the basis of liquid pressure absorbing action of the second moveable rubber film 126, making it possible to attain excellent vibration damping capabilities against idling vibration.

Figure 9:
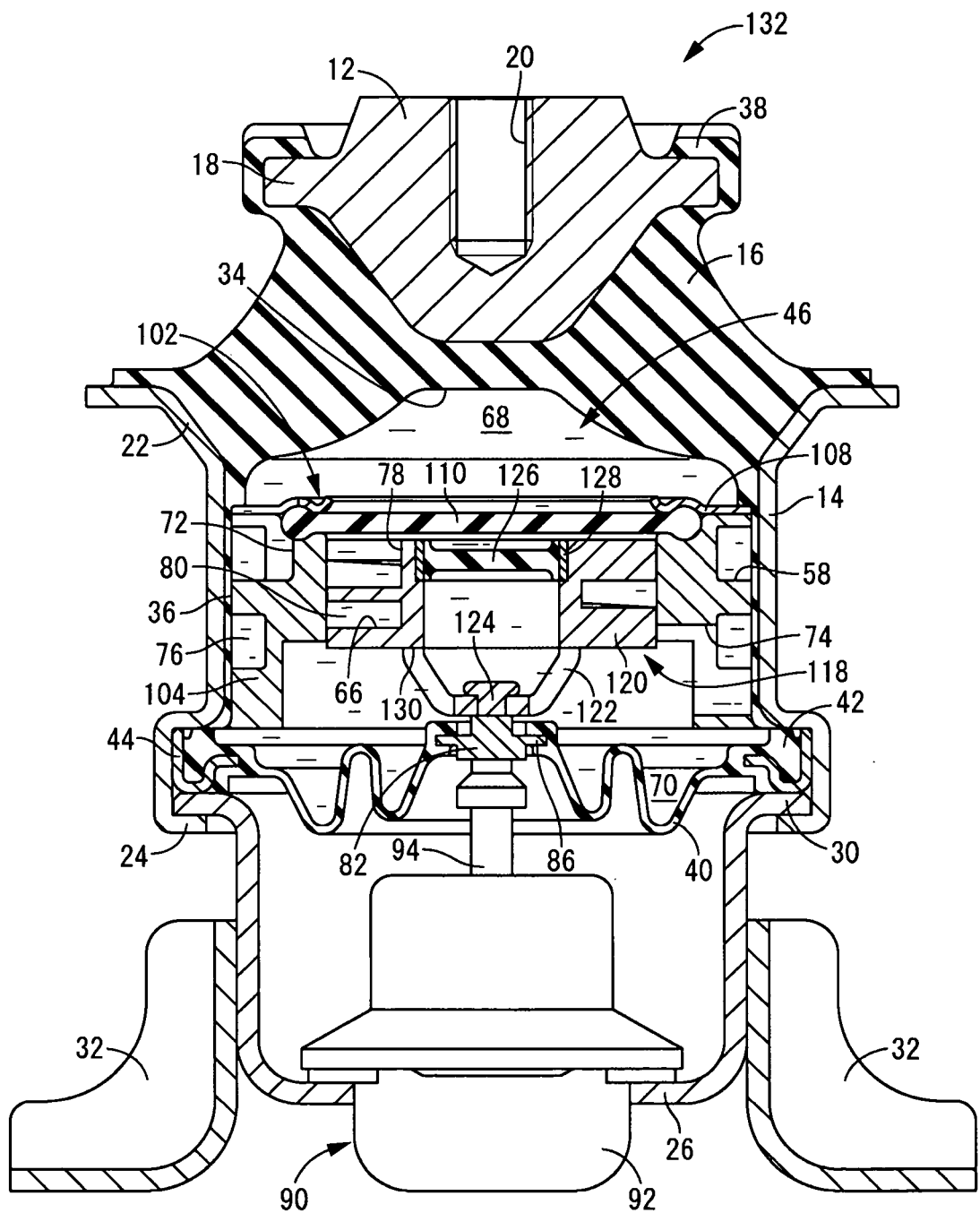
FIG. 9 is a vertical cross sectional view of an automobile engine mount according to a fifth embodiment of the present invention.

A construction furnished with both the first moveable rubber film 110 shown in the third embodiment and the second moveable rubber film 126 shown in the fourth embodiment can also be employed, as in the automotive engine mount 132 according to a fifth embodiment of the present invention shown in FIG. 9.

By so doing, vibration damping based on fluid flow action of the first orifice passage 76, vibration damping based on fluid flow action of the second orifice passage 80, and vibration damping based on liquid pressure absorbing action of the second moveable rubber film 126 can all be effectively achieved when the automobile is moving, making it possible to further improve vibration damping capabilities while moving.

Figure 10:
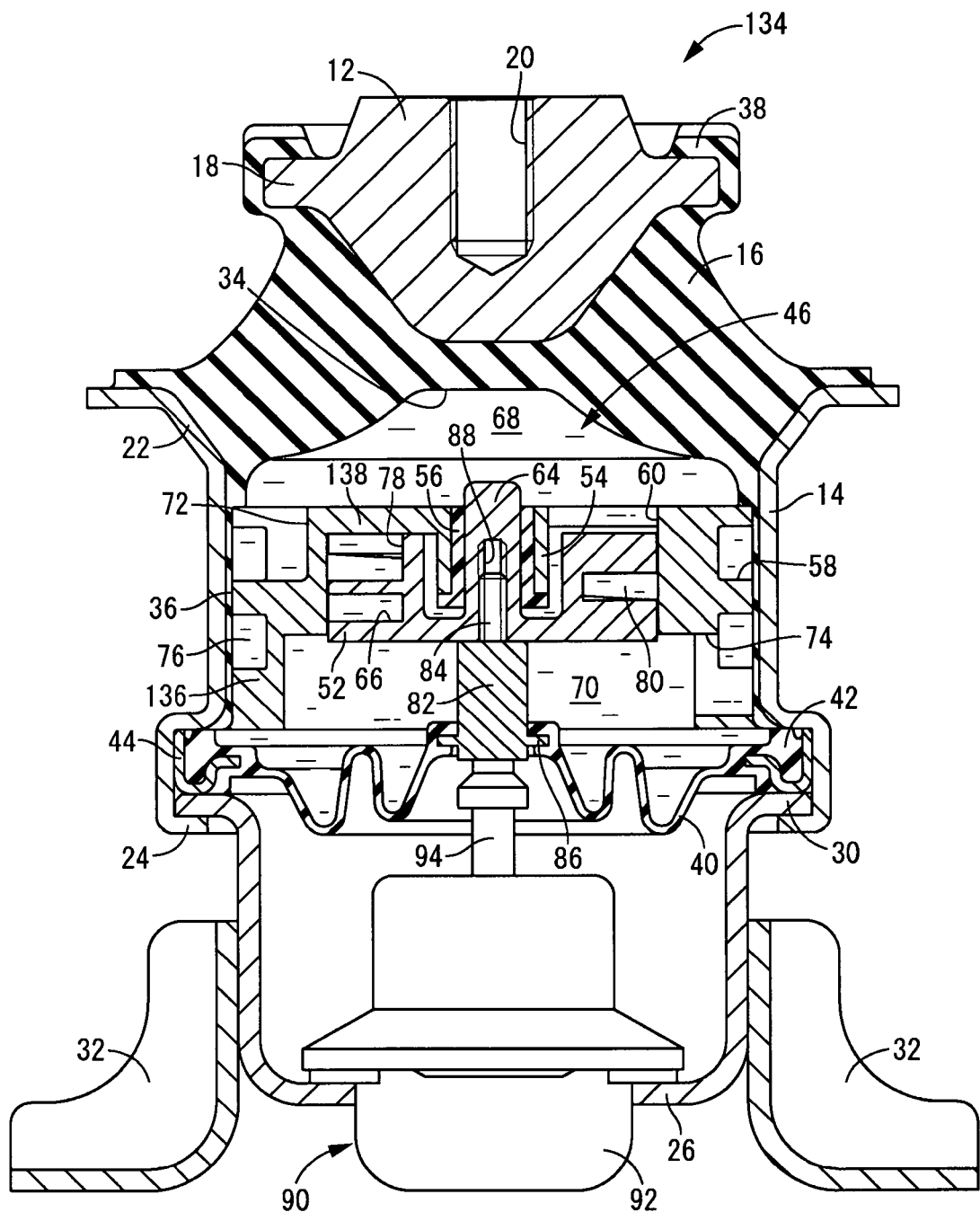
FIG. 10 is a vertical cross sectional view of an automobile engine mount according to a sixth embodiment of the present invention.

Next, FIG. 10 depicts an automotive engine mount 134 according to a sixth embodiment of the fluid-filled vibration damping device constructed according to the present invention. This engine mount 134 has construction all in all similar to that of the engine mount 96 shown in the second embodiment, and is provided with a first orifice-defining member 136 as an outer orifice member.

The first orifice-defining member 136 differs from the first orifice-defining member 50 of the first and second embodiments in that the through-holes 60 have been omitted from the area corresponding to the communicating hole 78 of the second orifice-defining member 52, this area instead being furnished with a barrier wall 138 provided as a cover part. This barrier wall 138 is situated so as to overlap in axial projection the communicating hole 78 of the second orifice-defining member 52, and with the second orifice-defining member 52 positioned at top in the axial direction, will be superimposed against the upper end face of the peripheral wall of the second orifice-defining member 52 so as to block the communicating hole 78.

In the engine mount 134 constructed in this way, with the system in shake mode depicted in FIG. 10 in which the opening at the equilibrium chamber 70 end of the second orifice passage 80 is blocked, the opening at the pressure-receiving chamber 68 end of the second orifice passage 80 will be sealed off by the barrier wall 138. The second orifice passage 80 can thus be placed in the blocked state in a more reliable manner, preventing liquid pressure of the pressure-receiving chamber 68 from escaping to the equilibrium chamber 70 due to short-circuiting of the second orifice passage 80 through a gap between the first and second orifice-defining members 136, 52. Consequently, a satisfactory level of fluid flow through the first orifice passage 76 can be efficiently assured, and vibration damping of engine shake based on fluid flow action of the first orifice passage 76 can be more advantageously achieved.

Figure 11:
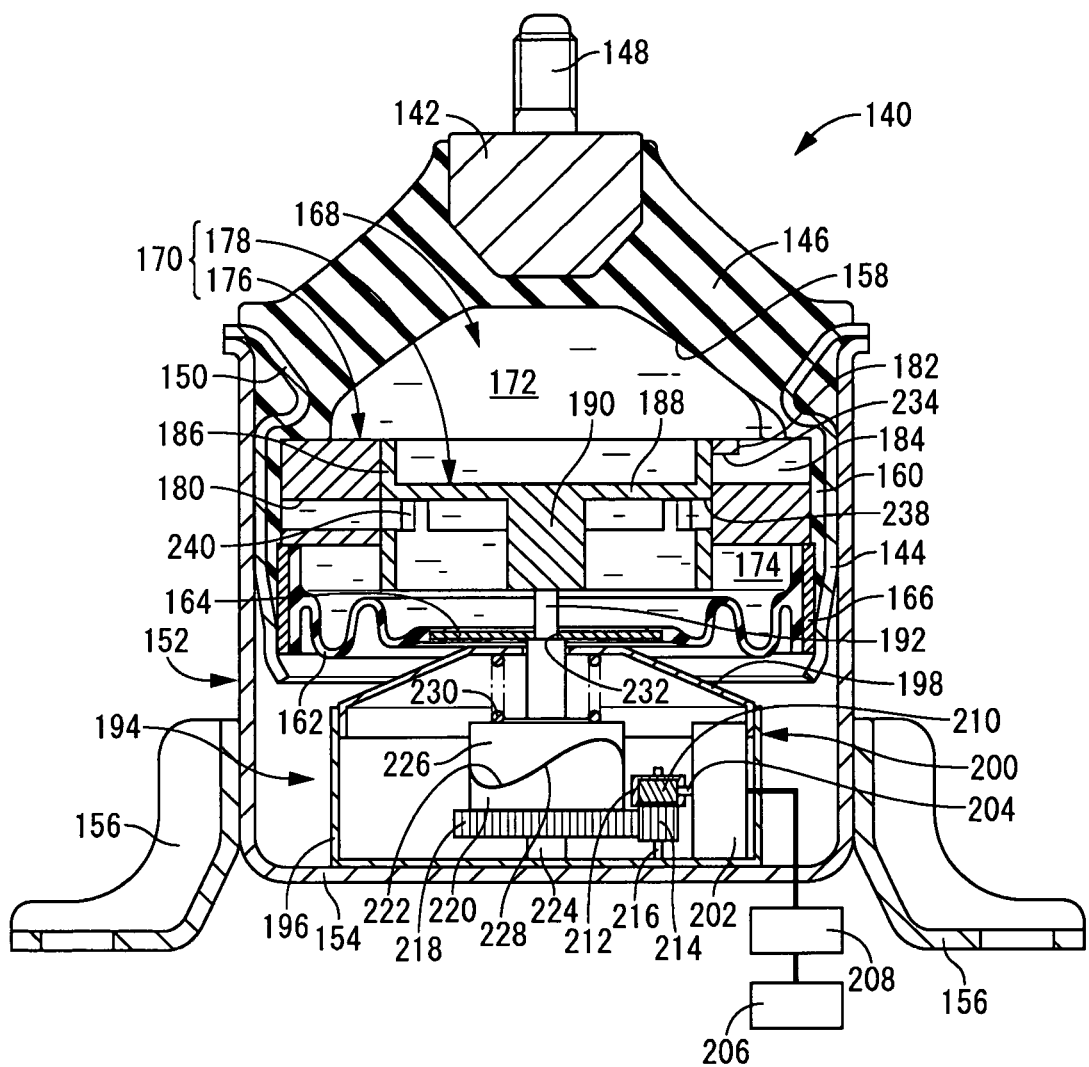
FIG. 11 is a vertical cross sectional view of an automobile engine mount according to a seventh embodiment of the present invention where the orifice passage is tuned to a low frequency band.
Figure 12:
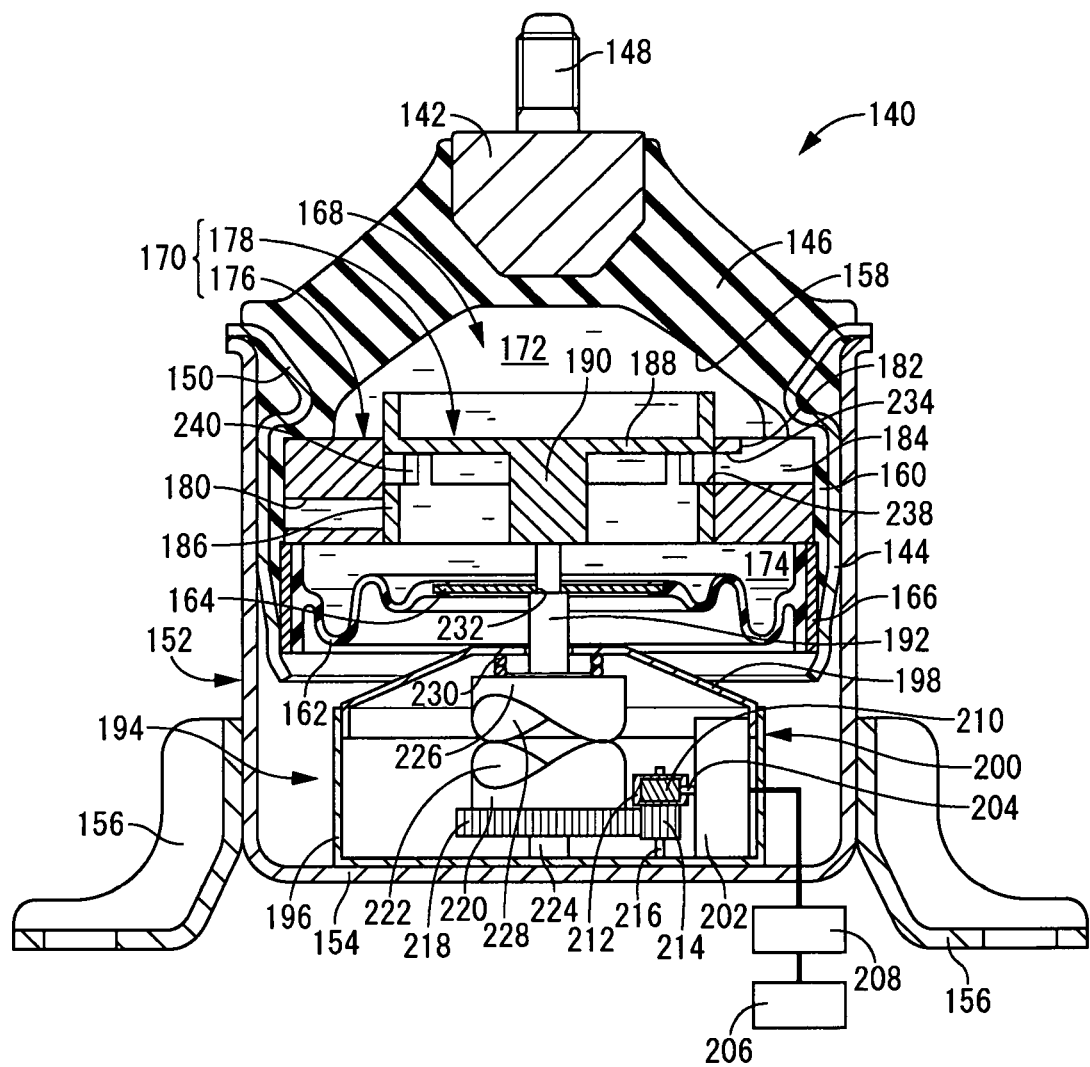
FIG. 12 is a vertical cross sectional view of the engine mount where the orifice passage is tuned to a high frequency band.
Figure 13:
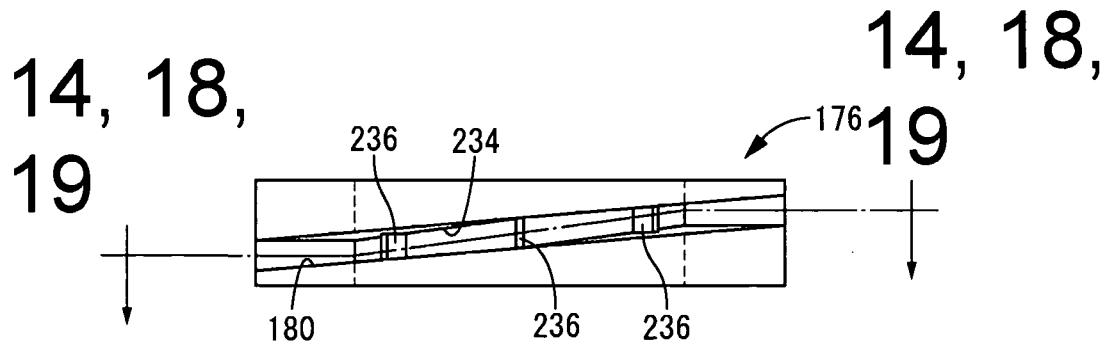
FIG. 13 is a front view of a first orifice-defining member of the engine mount.
Figure 14:
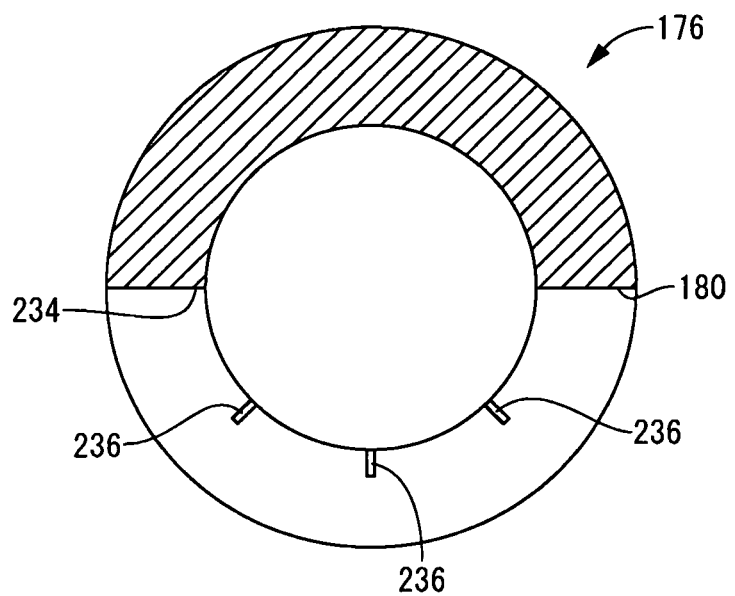
FIG. 14 is a cross sectional view taken along line 14-14 of FIG. 13.
Figure 15:
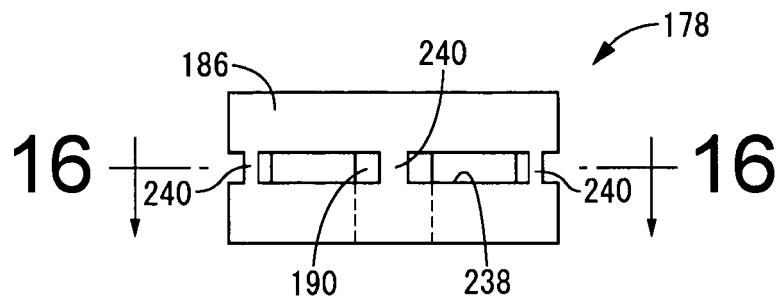
FIG. 15 is a front view of a second orifice-defining member of the engine mount.
Figure 16:
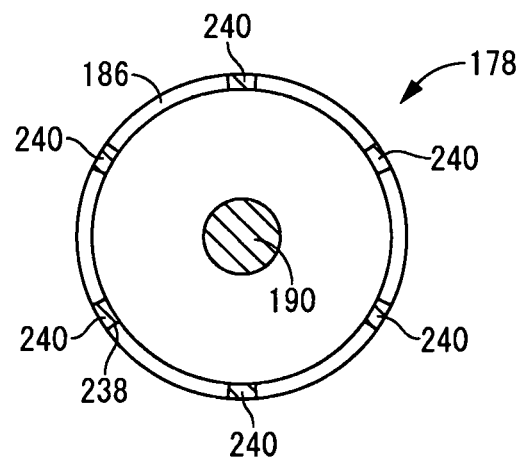
FIG. 16 is a cross sectional view taken along line 16-16 of FIG. 15.

FIGS. 11 and 12 depict an automotive engine mount 140 according to a seventh embodiment of the fluid-filled vibration damping device according to the present invention. The engine mount 140 has a construction in which a first mounting fitting 142 provided as a first mounting member and a second mounting fitting 144 provided as a second mounting member are linked by a main rubber elastic body 146. The first mounting fitting 142 is mounted onto the power unit (not shown) side, while the second mounting fitting 144 is mounted onto the vehicle body (not shown) side to provide the power unit with vibration-damped support on the vehicle body. In the following description, unless indicated otherwise, the vertical direction refers to the vertical direction in FIG. 11, which is also the axial direction of the engine mount 140.

To describe in greater detail, the first mounting fitting 142 has approximately circular block shape with a mounting bolt 148 that projects upward anchored to the center of its upper end face. The first mounting fitting 142 is designed to be secured to the power unit by this mounting bolt 148.

Meanwhile, the second mounting fitting 144 has on the whole a large-diameter, approximately round tubular shape, the upper end section of which takes the form of a gradually flaring tapered tube portion 150. A bracket 152 is secured fitting about the exterior of the second mounting fitting 144. The bracket 152 has construction in which several mounting leg portions 156 are welded to the outside peripheral face of an approximately cup-shaped mounting portion 154. The mounting portion 154 is then pressure-fit slipped about the exterior of the second mounting fitting 144 in order to attach the bracket 152 to the second mounting fitting 144. The bracket 152, and hence the second mounting fitting 144, is secured to the vehicle body by fastening bolts (not shown) which are passed through mounting holes that have been formed in the mounting leg portions 156 of the bracket 152.

The first mounting fitting 142 and the second mounting fitting 144 are linked by the main rubber elastic body 146. The main rubber elastic body 146 has approximately truncated cone shape to which the first mounting fitting 142 has been vulcanization bonded while embedded to prescribed depth into the small-diameter end; while the tapered tube portion 150 of the second mounting fitting 144 has been vulcanization bonded to the outside peripheral face of the large-diameter end of the main rubber elastic body 146. In the large-diameter end face of the main rubber elastic body 146 there is formed a large-diameter recess 158 of inverted bowl shape. A thin seal rubber layer 160 sheathing the inside peripheral face of the second mounting fitting 144 is integrally formed with the main rubber elastic body 146 and extends downward from its outside peripheral edge.

The opening at the lower end of the second mounting fitting 144 is covered by a diaphragm 162 provided as a flexible film. The diaphragm 162 is a rubber film of thin, approximately annular disk shape having ample slack in the axial direction, with an anchor plate 164 of approximately circular disk shape arranged in its diametrical center section, and the inside peripheral edge of the diaphragm 162 vulcanization bonded about the entire circumference to the outside peripheral edge of the anchor plate 164. Additionally, a fastener fitting 166 of annular form is vulcanization bonded to the outside peripheral edge of the diaphragm 162, and the fastener fitting 166 is then secured fitting internally into the lower end of the second mounting fitting 144 so that the lower opening of the second mounting fitting 144 is provided with fluidtight closure by the diaphragm 162. By so doing there is defined in the axial direction between the main rubber elastic body 146 and the diaphragm 162 inside the second mounting fitting 144 a fluid chamber 168 that is sealed off from the outside and filled with a non-compressible fluid. A low-viscosity fluid such as water or an alkylene glycol is favorable for use as this fluid.

A partition member 170 having thick, approximately circular disk shape is positioned inside the fluid chamber 168 so as to extend in the axis-perpendicular direction. The fluid chamber 168 is bifurcated to either side of the partition member 170 in the axial direction, defining to the upper side of the partition member 170 a pressure-receiving chamber 172 whose wall is partly constituted by the main rubber elastic body 146 and that is exposed to pressure fluctuations during vibration input, while defining to the lower side of the partition member 170 an equilibrium chamber 174 whose wall is partly constituted by the diaphragm 162, and having variable volume.

The partition member 170 includes a first orifice-defining member 176 provided as an outer orifice member, and a second orifice-defining member 178 provided as an inner orifice member.

As depicted in FIGS. 11 to 14, the first orifice-defining member 176 has a thick-walled, large diameter, approximately round tubular shape, and is a rigid component made of metal or synthetic resin material. In the first orifice-defining member 176 there is formed an orifice-defining groove 180 that opens onto the outside peripheral face and extends in the circumferential direction for a prescribed length equal to approximately halfway around the circumference. A passage hole 182 extending upward in the axial direction is formed in a first end of the orifice-defining groove 180. By then subjecting the second mounting fitting 144 to a diameter reduction process, the first orifice-defining member 176 is secured to the inside peripheral side of the second mounting fitting 144 and supported thereon.

Further, the outside peripheral face of the first orifice-defining member 176 is superposed against and supported by the inside peripheral face of the second mounting fitting 144, so that the outside peripheral opening of the orifice-defining groove 180 which has been formed in the first orifice-defining member 176 is covered fluidtightly. A tunnel-like path that extends in the circumferential direction is thereby defined in the outside peripheral edge of the first orifice-defining member 176. A first end of this tunnel-like passage communicates with the pressure-receiving chamber 172 through a passage hole 182, while the other end communicates with the equilibrium chamber 174 through a communication slit 234 and a communicating window 238, to be discussed later, thereby utilizing the orifice-defining groove 180 to form an orifice passage 184 through which the pressure-receiving chamber 172 and the equilibrium chamber 174 communicate with each other.

The second orifice-defining member 178 fits inserted internally into the first orifice-defining member 176. As depicted in FIGS. 11, 12, 15 and 16, the second orifice-defining member 178 has an inner tubular portion 186. The inner tubular portion 186 has an approximately round tubular shape of outside diameter corresponding to the inside diameter of the first orifice-defining member 176, and extends in a straight line in the axial direction. A dividing wall 188 is integrally formed in the axially medial section of the inner tubular portion 186 so as to extend in the axis-perpendicular direction, and the center hole of the inner tubular portion 186 is sealed off and divided into upper and lower parts by the dividing wall 188. A linking portion 190 of small-diameter round post shape projecting downward is integrally formed in the diametrical center part of the dividing wall 188.

Figure 17:
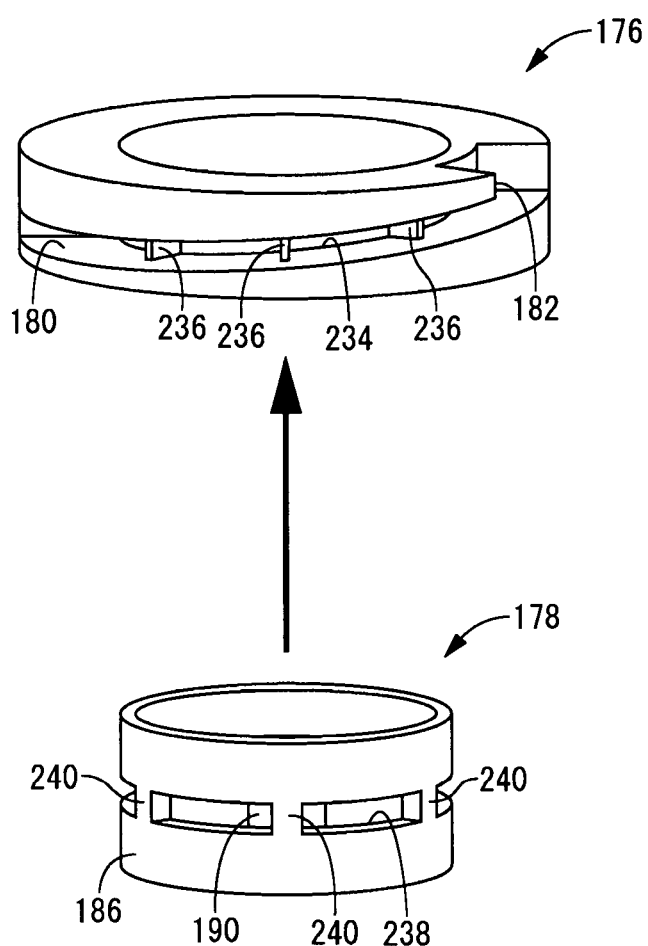
FIG. 17 is a perspective view of the first and second orifice-defining members.

As depicted in FIG. 17, the second orifice-defining member 178 is positioned inserted within the first orifice-defining member 176 so that the inside peripheral side (center hole) of the tubular first orifice-defining member 176 is bifurcated into upper and lower parts by the second orifice-defining member 178. Thus, the partition member 170 of the present embodiment, which partitions the fluid chamber 168 into upper and lower parts, is constituted by the first orifice-defining member 176 and the second orifice-defining member 178. The second orifice-defining member 178 fits into the first orifice-defining member 176 in a condition such that relative displacement in the axial direction is allowed. The pressure-receiving chamber 172 is partially constituted by a zone situated to the inside peripheral side of the inner tubular portion 186 and above the dividing wall 188 in the second orifice-defining member 178, while the equilibrium chamber 174 is partially constituted by a zone situated diametrically between the inner tubular portion 186 and the linking portion 190 in the second orifice-defining member 178.

As shown in FIG. 11, to the linking portion 190 of the second orifice-defining member 178 there is secured by way of an actuator shaft an output shaft 192 that extends downward and passes through the diaphragm 162 so as to project to the outside of the fluid chamber 168. The output shaft 192 is attached at the bottom end to an actuator 194. The actuator 194 is situated below the diaphragm 162, and is furnished with a housing 200 composed of a case 196 of approximately bottomed round tubular shape, and a cover plate 198 of approximately circular disk shape.

The housing 200 accommodates an electric motor 202. The electric motor 202 is of conventional known construction in which a rotating shaft 204 rotates about its center axis when actuated through energization by an externally provided power supply unit 206. In the present embodiment, a control unit 208 is provided on the circuit that connects the electric motor 202 with the power supply unit 206 and rotates the rotating shaft 204 of the electric motor 202 in prescribed rotation increments about the center axis. A worm 210 having a helical thread of screw form on its outside peripheral face is attached to the rotating shaft 204 of the electric motor 202.

A worm wheel 212 having on its outside peripheral face teeth that correspond with the worm 210 meshes with the worm 210. Below the worm wheel 212 there is integrally formed a coaxially positioned first spur gear 214 having formed on its outside peripheral face teeth that extend in the axial direction. The worm wheel 212 and the first spur gear 214 are supported by a spindle 216 attached to the case 196, so as to be rotatable about a center axis extending in the vertical direction.

A second spur gear 218 having formed on its outside peripheral face teeth that correspond with the first spur gear 214 meshes with the first spur gear 214. Above the second spur gear 218 there is integrally formed a coaxially positioned main drive cam member 220. The main drive cam member 220 is a hard member having approximately circular disk shape whose upper face constitutes a main drive cam face 222 that extends in a wave pattern in the circumferential direction. The second spur gear 218 and the main drive cam member 220 are rotatably supported about a center axis extending in the vertical direction by a rotary actuator shaft 224 attached to the case 196.

A follower cam member 226 is superposed in the axial direction against the main drive cam member 220. The follower cam member 226 is a hard member having approximately circular disk shape whose lower face constitutes a follower cam face 228 of a wave pattern corresponding to the main drive cam face 222. The output shaft 192 is anchored to the upper end face of the follower cam member 226 and projects upward along the center axis of the mount. The output shaft 192 has approximately stepped rod shape smaller in diameter at the top than at the bottom, and passes through the center section of the cover plate 198 to project out from the housing 200. While not depicted clearly in the drawings, in the present embodiment, a rotation inhibiting mechanism adapted to inhibit rotation of the output shaft 192 about the center axis while allowing actuation thereof in the axial direction is provided between the output shaft 192 and the housing 200 so as to inhibit rotation about the center axis by the follower cam member 226, which is integrally formed with the output shaft 192.

Additionally, the inside peripheral edge of the cover plate 198 of the housing 200 is positioned in opposition in the axial direction to the follower cam member 226. A coil spring 230 is positioned between the opposed faces of the cover plate 198 and the follower cam member 226. The urging force of the coil spring 230 will be exerted between the main drive earn face 222 of the main drive cam member 220 and the follower cam face 228 of the follower cam member 226, in the direction of juxtaposition of these two cam faces 222, 228. By so doing, the main drive cam member 220 and the follower cam member 226 will be held in superposed condition while allowing relative displacement of the output shaft 192 with respect to the rotary actuator shaft 224 in the axial direction in opposition to the urging force of the coil spring 230.

The actuator 194 is situated axially between the diaphragm 162 and the bracket 152, while the housing 200 is secured to the bracket 152. The upper part (small-diameter part) of the output shaft 192 that projects out from the housing 200 is inserted through and secured in an insertion hole 232 that has been formed passing through the anchor plate 164 of the diaphragm 162. The output shaft 192 is anchored to the diaphragm 162 through the agency of the anchor plate 164 so as to project out to both the upper and lower sides of the diaphragm 162. A fluidtight seal is provided between the output shaft 192 and the anchor plate 164 to prevent the sealed non-compressible fluid from leaking to the outside through the insertion hole 232 of the anchor plate 164. Sealing of the insertion hole 232 of the anchor plate 164 may be accomplished, for example, by disposing an O-ring between the axially opposed faces of the step of the output shaft 192 and the inside peripheral edge of the anchor plate 164; by integrally forming the output shaft 192 and the anchor plate 164; or by securing the output shaft 192 and the anchor plate 164 through welding. In the present embodiment, the output shaft 192 and the anchor plate 164 are welded together, and the actuator shaft is composed of the output shaft 192 and the anchor plate 164.

The upper end part of the output shaft 192 projecting up beyond the anchor plate 164 is secured to the linking portion 190 of the second orifice-defining member 178 which constitutes part of the partition member 170 so that reciprocating motion exerted in the axial direction on the output shaft 192 will be transmitted to the second orifice-defining member 178.

Specifically, rotational actuating force exerted on the rotating shaft 204 by energizing the electric motor 202 is transmitted to the main drive cam member 220 by a gear train composed of the worm 210, the worm wheel 212, the first spur gear 214, and the second spur gear 218. Rotational motion about the center axis transmitted to the main drive cam member 220 is then converted to reciprocating motion in the axial direction by the action of the cam faces 222, 228, and is transmitted to the follower cam member 226. Thus, reciprocating actuating force in the axial direction will be exerted on the output shaft 192 affixed to the follower cam member 226, causing the second orifice-defining member 178 secured to the upper end of the output shaft 192 to experience reciprocating motion in the axial direction. From the above discussion it will be appreciated that the rotational actuating force of the electric motor 202 is converted between the main drive cam member 220 and the follower cam member 226 into reciprocating actuating force in the axial direction, with the main drive cam member 220 and the follower cam member 226 constituting a cam mechanism provided as a motion conversion mechanism.

Here, one end of the orifice passage 184 communicates with the pressure-receiving chamber 172 via the passage hole 182, while the other end of the orifice passage 184 communicates with the equilibrium chamber 174 through the intersection point of the communication slit 234 with the communicating window 238 provided as an orifice connection window.

The communication slit 234 is formed with a helical pattern so as to pass in the diametrical direction through the inside peripheral wall of the orifice-defining groove 180 that was formed in the first orifice-defining member 176 and open onto the inside peripheral face of the first orifice-defining member 176. By furnishing such a communication slit 234 that extends in the circumferential direction, the orifice-defining groove 180 communicates along approximately its entire length in the circumferential direction with the center hole of the first orifice-defining member 176. In the present embodiment, reinforcing crosspieces 236 are provided at several locations along the circumference of the communication slit 234 so that the upper and lower sides of the first orifice-defining member 176 to either side of the communication slit 234 are integrally linked by the reinforcing crosspieces 236. In the present embodiment, the orifice-defining groove 180 and the communication slit 234 constitute an orifice-defining window.

Meanwhile, the communicating window 238 is formed so as to pass in the diametrical direction through the inner tubular portion 186 of the second orifice-defining member 178 and open onto the outside peripheral face of the second orifice-defining member 178. The communicating window 238 is formed below the dividing wall 188 in the inner tubular portion 186 of the second orifice-defining member 178 so that the communicating window 238 communicates with a zone situated diametrically between the linking portion 190 and the inner tubular portion 186 which constitutes part of the equilibrium chamber 174. Further, in the second orifice-defining member 178 in the present embodiment, several linking crosspieces 240 are provided along the circumference of the communicating window 238 so that the inner tubular portion 186 at the two sides thereof bordering the communicating window 238 is integrally linked at several locations along the circumference by the linking crosspieces 240.

Moreover, in the present embodiment, the communication slit 234 has approximately helical form extending in the circumferential direction approximately halfway about the circumference while sloping in the axial direction at the same angle as the orifice-defining groove 180, whereas the communicating window 238 has annular form extending in the circumferential direction around the entire circumference without sloping in the axial direction. Consequently, the communication slit 234 and the communicating window 238 extend in the circumferential direction at a relative slope in the axial direction.

The second orifice-defining member 178 fits inside the center hole of the first orifice-defining member 176 in a condition permitting relative displacement in the axial direction, whereby the communication slit 234 of the first orifice-defining member 176 and the communicating window 238 of the second orifice-defining member 178 intersect one another in part of the circumference. The opening at the equilibrium chamber 174 side of the orifice passage 184 is thereby formed at the intersection point of the communication slit 234 and the communicating window 238 so that the pressure-receiving chamber 172 and the equilibrium chamber 174 communicate with each other by the orifice passage 184. In the present embodiment in particular, the section of the communication slit 234 situated away from the intersection point with the communicating window 238 is covered and sealed off by the inner tubular portion 186 so that the orifice passage 184 forms between the passage hole 182 and the aforementioned intersection point.

In the present embodiment, the inside peripheral face of the first orifice-defining member 176 and the outside peripheral face of the second orifice-defining member 178 are superposed with a slight gap between them in the axis-perpendicular direction. This provides axial direction guide means adapted to guide relative displacement of the second orifice-defining member 178 in the axial direction with respect to the first orifice-defining member 176, while restricting relative displacement in the axis-perpendicular direction.

The orifice passage 184 has variable passage length, making it possible for the tuning frequency, which is established by the ratio (A/L) of passage cross sectional area (A) to passage length (L), to be adjusted according to the frequency of input vibration. Specifically, when displacement of the second orifice-defining member 178 in the axial direction is actuated by the actuator 194, the intersection location of the helical communication slit 234 and the communicating window 238 that extends in the circumferential direction will change in the lengthwise direction of the orifice-defining groove 180. Thus, the location of the opening at the equilibrium chamber 174 side of the orifice passage 184 which is defined in concert by the communication slit 234 and the communicating window 238 will change in the circumferential direction, and the passage length (L) of the orifice passage 184 will change. As a result, the tuning frequency of the orifice passage 184 will be reset so that effective vibration damping can be produced respectively against vibrations of different frequencies.

Figure 18:
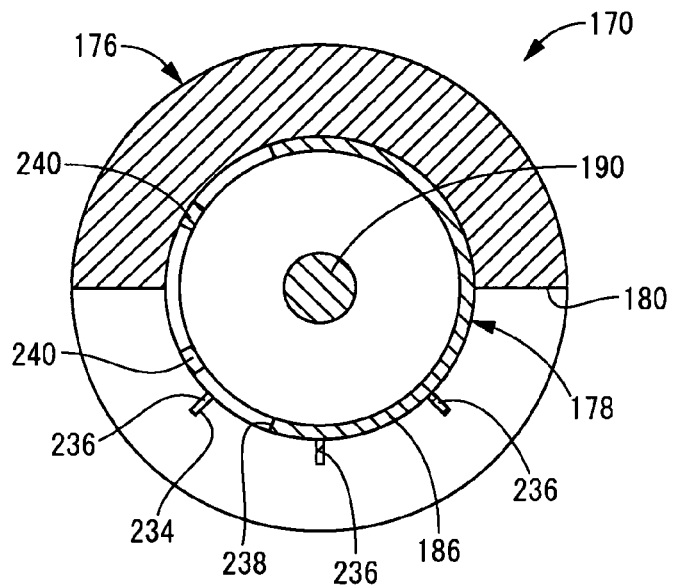
FIG. 18 is a cross sectional view of a partition member where the orifice passage is tuned to a low frequency, taken along line 18-18 of FIG. 13.
Figure 19:
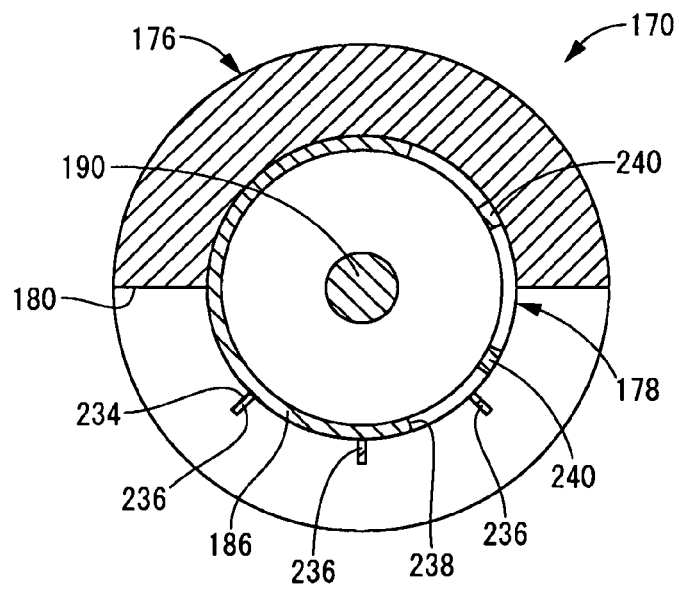
FIG. 19 is a cross sectional view of a partition member where the orifice passage is tuned to a high frequency, taken along line 19-19 of FIG. 13.

As an example of such retuning of the orifice passage 184, FIG. 18 depicts a condition in which the orifice passage 184 has been turned to a low frequency on the order of several Hz corresponding to engine shake, while FIG. 19 depicts a condition in which the orifice passage 184 has been turned to a midrange frequency on the order of 20 Hz to 40 Hz corresponding to idling vibration.

Specifically, with the second orifice-defining member 178 positioned at bottom as depicted in FIG. 11, the intersection point of the communication slit 234 and the communicating window 238 will be set to a location distant in the circumferential direction from the end at the pressure-receiving chamber 172 side of the orifice passage 184 as depicted in FIG. 18. Under these conditions the orifice passage 184 will have passage length equal to about half the circumference in the circumferential direction, so the ratio of passage cross sectional area to passage length of the orifice passage 184 will be small, and the orifice passage 184 will be tuned to low frequency.

On the other hand, with the second orifice-defining member 178 positioned at top as depicted in FIG. 12, the intersection point of the communication slit 234 and the communicating window 238 will be set to a location proximal in the circumferential direction to the end of the orifice passage 184 lying towards the pressure-receiving chamber 172 side, as depicted in FIG. 19. Under these conditions the orifice passage 184 will have very short passage length, so the ratio of passage cross sectional area to passage length of the orifice passage 184 will be large and the orifice passage 184 will be tuned to midrange frequency.

While not depicted in the drawings, by positioning the second orifice-defining member 178 midway along the direction of reciprocating motion, it will be possible to set the orifice passage 184 to an intermediate tuning frequency between low frequency corresponding to engine shake and midrange frequency corresponding to idling vibration.

Modification of the tuning of the orifice passage 184 may be carried out through control of the electric motor 202 by the control unit 208 so as to carry out stepwise tuning to several different frequencies established beforehand, or to reset tuning in continuous fashion according to the frequency of input vibration. With stepwise control, by employing for example a simple control unit such as a contact-type self switch, or employing as the electric motor a stepping motor having an internal control unit, adjustment of the tuning of the orifice passage 184 can be accomplished with a simple construction and few parts. With continuous control on the other hand, the tuning frequency of the orifice passage 184 can be set with a high degree of accuracy according to the frequency of input vibration, so better vibration damping capabilities can be achieved. In the present embodiment, the tuning frequency of the orifice passage 184 is controlled by the control unit 208 according to the speed of the engine.

With the automotive engine mount 140 constructed as above installed in a vehicle, if low-frequency vibration corresponding to engine shake is input, the second orifice-defining member 178 will undergo displacement towards the bottom in the operating direction through operation of the electric motor 202. This will set the orifice passage 184 to longer passage length and reset the tuning frequency of the orifice passage 184 to low frequency corresponding to engine shake. Consequently, effective vibration damping (high attenuating action) of the input vibration can be obtained on the basis of fluid flow through the orifice passage 184.

On the other hand, if midrange frequency vibration corresponding to idling vibration is input, the second orifice-defining member 178 will undergo displacement towards the top in the operating direction through operation of the electric motor 202. This will set the orifice passage 184 to shorter passage length and reset the tuning frequency of the orifice passage 184 to a midrange frequency corresponding to idling vibration. Consequently, the intended vibration damping (low dynamic spring action) of the input vibration will be obtained on the basis of fluid flow through the orifice passage 184.

Alternatively, during input of vibration in an intermediate frequency range (midrange frequency) lying midway between engine shake frequency and idling vibration frequency, vibration damping appropriate to the input vibration can be obtained through displacement of the second orifice-defining member 178 to a medial location in the operating direction.

As will be apparent from the above, in the engine mount 140 constructed in accordance with the present embodiment, the passage length of the orifice passage 184 is variable, and the tuning frequency of the orifice passage 184 is changeable according to the input vibration. Thus, by changing the tuning of the orifice passage 184 according to input vibration frequencies that vary according to different states such as moving etc., effective vibration damping of vibration over a wider frequency range or of several different frequencies can be achieved.

Additionally, the output shaft 192 which transmits actuating force from the actuator 194 which has been disposed to the outside of the fluid chamber 168 to the second orifice-defining member 178 is designed to undergo reciprocating motion in the axial direction. Thus, sealing of the output shaft 192 passage zone in the diaphragm 162 can be accomplished easily and with high reliability. Consequently, the non-compressible fluid filling the fluid chamber 168 can be prevented from leaking out through the output shaft 192 penetration zone, so that reliability and durability of the engine mount 140 may be improved, and sealing of the output shaft 192 penetration zone may be accomplished with a simple construction.

Further, in the present embodiment, the first orifice-defining member 176 is reinforced by several reinforcing crosspieces 236 disposed along the circumference of the communication slit 234 so as to achieve improved durability of the first orifice-defining member 176. Meanwhile, several linking crosspieces 240 are disposed along the circumference of the communicating window 238 so that the sections of the second orifice-defining member 178 to either side of the communicating window 238 are linked and unified through these linking crosspieces 240, and the second orifice-defining member 178 is reinforced by the linking crosspieces 240 to achieve improved durability.

Figure 20:
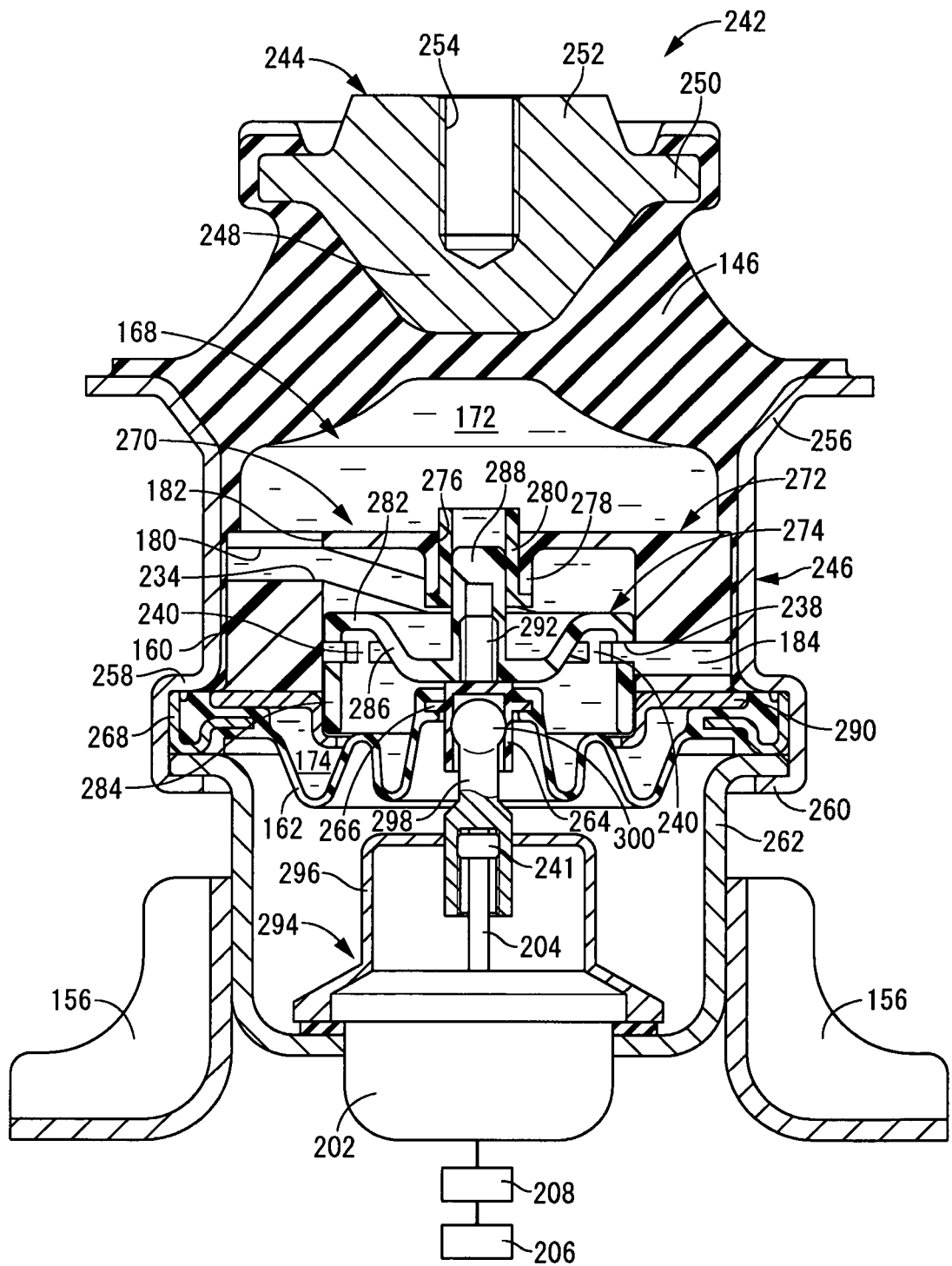
FIG. 20 is a cross sectional view of an automobile engine mount according to an eighth embodiment of the present invention.

FIG. 20 depicts an automotive engine mount 242 according to an eighth embodiment of the fluid-filled vibration damping device according to the present invention. This engine mount 242 has a construction in which a first mounting fitting 244 provided as a first mounting member and a second mounting fitting 246 provided as a second mounting member are linked by a main rubber elastic body 146.

Turning to a more detailed discussion, the first mounting fitting 244 has integrally formed construction that includes an anchor portion 248 of inverted, approximately truncated cone shape; a flange portion 250 that projects peripherally outward at the upper end of the anchor portion 248; and a mounting portion 252 of approximately truncated cone shape projecting upward from the upper end of the anchor portion 248. The first mounting fitting 244 is designed to be mounted on the power unit by threading a mounting bolt (not shown) into a bolt hole 254 that extends along the center axis.

Meanwhile, the second mounting fitting 246 is made of rigid material comparable to the first mounting fitting 244, and has large-diameter, approximately round tubular shape on the whole. Further, the upper end part of the second mounting fitting 246 takes the form of a gradually flaring tapered section 256 while in the lower end part there is integrally formed a swaging piece 260 of tubular contours, with a step portion 258 between. The rim of the opening of a bracket 262 of approximately bottomed round tubular shape is swaged and secured by the swaging piece 260 to the lower end of the second mounting fitting 246, and several mounting leg portions 156 fastened to the outside peripheral face of the bracket 262 are mounted onto the vehicle body (not shown) so that the second mounting fitting 246 is mounted onto the vehicle body via the bracket 262.

The first mounting fitting 244 and the second mounting fitting 246, positioned coaxially and spaced apart in the vertical direction, are linked to one another by the main rubber elastic body 146. The upper opening of the second mounting fitting 246 is thereby sealed off fluidtightly by the main rubber elastic body 146.

The lower opening of the second mounting fitting 246 is covered by a diaphragm 162. The diaphragm 162 is a thin, approximately annular disk shaped rubber film imparted with ample slack in the axial direction and whose inside peripheral edge is vulcanization bonded about the entire circumference to a joint tube member 264. The joint tube member 264 is a component having inverted, approximately bottomed round tubular shape in which a curving face has been formed extending about the entire circumference of the axially medial section of its inside peripheral face, and an anchor flange 266 of flange form projecting peripherally outward has been integrally formed in the axially medial section. The inside peripheral face of the diaphragm 162 is superposed against the outside peripheral face of the joint tube member 264, and the section that includes the anchor flange 266 is vulcanization bonded thereto to anchor the joint tube member 264 to the diametrical center section of the diaphragm 162.

Meanwhile, the outside peripheral edge of the diaphragm 162 is vulcanization bonded about the entire circumference to a fastener fitting 268 of annular form. The fastener fitting 268 is then inserted into the lower end of the second mounting fitting 246 and secured swaged in place by the swaging piece 260 to attach the diaphragm 162 at the lower end of the second mounting fitting 246. By so doing the lower opening of the second mounting fitting 246 is sealed off fluidtightly by the diaphragm 162, forming to the inside peripheral side of the second mounting fitting 246 a fluid chamber 168 that is situated between the axially opposing faces of the main rubber elastic body 146 and the diaphragm 162, and filled with a non-compressible fluid.

A partition member 270 is positioned inside the fluid chamber 168. The partition member 270 has thick, approximately circular disk shape and is arranged so as to extend in the axis-perpendicular direction inside the fluid chamber 168 while supported by the second mounting fitting 246. The fluid chamber 168 is thereby bifurcated into upper and lower parts to either side of the partition member 270, defining a pressure-receiving chamber 172 and an equilibrium chamber 174 to either side of the partition member 270.

The partition member 270 includes a first orifice-defining member 272 provided as an outer orifice member, and a second orifice-defining member 274 provided as an inner orifice member.

The first orifice-defining member 272 on the whole has an inverted, approximately bottomed tubular shape and is made of synthetic resin such as PPS or metal such as aluminum alloy. In the first orifice-defining member 272 there are formed an orifice-defining groove 180 that opens onto the outside peripheral face and a communication slit 234 that passes in the diametrical direction through the inside peripheral wall of the orifice-defining groove 180 and opens onto the inside peripheral face of the first orifice-defining member 272 to provide an orifice-defining window. In the diametrical center section of the first orifice-defining member 272 there is formed a support hole 276 that passes through the upper base wall, and a support tube portion 278 of tubular form projects downward from the rim of the opening of the support hole 276. A guide sleeve 280 of tubular form is attached fitting into the support hole 276. This guide sleeve 280 is fabricated of self-lubricating resin or coated with grease for example, to keep the coefficient of friction on its inside face to a minimum.

The first orifice-defining member 272 fits inserted to the inside peripheral side of the second mounting fitting 246 and is supported by the second mounting fitting 246. The outside peripheral face of the first orifice-defining member 272 is positioned in intimate contact against the inside peripheral face of the second mounting fitting 246 via an intervening seal rubber layer 160 so that, utilizing the orifice-defining groove 180, there is formed a tunnel-like path that extends in a helical pattern. A first end of this tunnel-like path communicates with the pressure-receiving chamber 172 through a passage hole 182, while the other end communicates with the equilibrium chamber 174 through the intersection of the communication slit 234 and the communicating window 238, thereby defining an orifice passage 184.

The second orifice-defining member 274 is inserted and fit to the inside peripheral side of the first orifice-defining member 272. The second orifice-defining member 274 has an inverted, approximately bottomed round tubular shape integrally incorporating a dividing wall 282 of approximately circular disk shape, and an inner tubular portion 284 that projects downward from the outside peripheral edge of the dividing wall 282; and is made of synthetic resin such as POM or metal such as aluminum alloy. The dividing wall 282 has a construction in which an outside peripheral section and an inside peripheral section respectively having flat plate shape are linked by a sloping portion 286 of tapered shape disposed in the diametrical medial section, and has a stepped plate profile in which the inside peripheral section to one side of the sloping portion 286 is situated below the outside peripheral section. A guide projection 288 of small-diameter post shape projecting upward in the axial direction is integrally formed in the inside peripheral section of the dividing wall 282. While imposing no particular limitation on the second orifice-defining member 274, in preferred practice its surface will have a low coefficient of friction in order to achieve smooth displacement in the axial direction, discussed later.

The second orifice-defining member 274 is then inserted and fit to the inside peripheral side of the first orifice-defining member 272. Then, with the second orifice-defining member 274 having been inserted to the inside peripheral side of the first orifice-defining member 272, a cover fitting 290 of approximately annular disk shape is attached to the lower end face of the first orifice-defining member 272. In this cover fitting 290 the inside peripheral side thereof is positioned below its outside peripheral side via an intervening step provided in the diametrical medial section. The inside diameter is smaller than the inside diameter of the first orifice-defining member 272 so that the inside peripheral side of the step juts out into the lower opening of the first orifice-defining member 272. Thus, the bottom position of the second orifice-defining member 274 will regulated by the lower end face of the inner tubular portion 284 of the second orifice-defining member 274 coming into abutment against the upper face of the inside peripheral edge of the cover fitting 290, preventing the second orifice-defining member 274 from becoming dislodged from the first orifice-defining member 272. In the present embodiment, the inside peripheral face of the first orifice-defining member 272 and the outside peripheral face of the second orifice-defining member 274 are situated in opposition in the diametrical direction across a gap sufficiently small to substantially prevent fluid flow through the gap. The zone to the inside peripheral side of the first orifice-defining member 272 is bifurcated into upper and lower part by the second orifice-defining member 274.

The guide projection 288 of the second orifice-defining member 274 fits inside the guide sleeve 280 of the first orifice-defining member 272 and is supported slidably in the axial direction. This arrangement provides axial direction guide means adapted to limit relative displacement of the second orifice-defining member 274 in the axis-perpendicular direction with respect to the first orifice-defining member 272, and to guide relative displacement of the second orifice-defining member 274 in the axial direction with respect to the first orifice-defining member 272. In the present embodiment, the inside peripheral face of the first orifice-defining member 272 and the outside peripheral face of the inner tubular portion 284 of the second orifice-defining member 274 are superposed across a very small gap, whereby the inside peripheral face of the first orifice-defining member 272 and the outside peripheral face of the second orifice-defining member 274 also afford positioning action in the axis-perpendicular direction, and guiding action in the axial direction.

The second orifice-defining member 274 is secured to the joint tube member 264 which has been anchored in the diametrical center of the diaphragm 162. Specifically, a connecting bolt 292 that projects upward from the joint tube member 264 is threaded into the guide projection 288 of the second orifice-defining member 274, thereby securing the joint tube member 264 and the second orifice-defining member 274 so that they are positioned approximately coaxially.

Meanwhile, the joint tube member 264 is linked to an actuator 294. The actuator 294 is supported by the bracket 262 that has been secured to the second mounting fitting 246, and is situated to the opposite side (lower side) of the diaphragm 162 from the fluid chamber 168. In more detail, the actuator 294 includes an electric motor 202 housed inside a housing 296 and an actuation member 298 provided as an actuator shaft constituting a follower member that undergoes displacement in the axial direction when actuated by rotation of the electric motor 202.

The electric motor 202 here is a pulse motor in which successive pulses are applied to the multiphase windings of a stator so that the stator (rotating shaft 204) rotates by a given angular increment each time that a pulse is applied, the amount of rotation being controllable through control of energization by a power supply unit 206 such as a battery by the control unit 208. In the present embodiment, a signal indicating information such as engine speed is input to the control unit 208 from the engine control unit, and rotation control of the electric motor 202 by the control unit 208 is carried out on the basis of the input signal.

A male screw member 241 is secured to the rotating shaft 204 of the electric motor 202. The male screw member 241 has approximately round post shape with a thread extending along the entire length of the outside peripheral face in the axial direction.

The actuation member 298 provided as the follower member is threaded onto the male screw member 241. The actuation member 298 in its upper part has approximately rod shape extending in the axial direction, and in its lower part has an inverted, approximately bottomed round tubular shape, with a female thread corresponding to the male thread of the male screw member 241 having been cut into the inside peripheral face of the lower part. Additionally, a rotation limiting mechanism adapted to prevent the actuation member 298 from relative rotation with respect to the housing 296 is disposed between the actuation member 298 and the housing 296. In the present embodiment, the outside peripheral face of the actuation member 298 is provided with opposing flats (not shown), and an insertion hole provided in the upper base wall of the housing 296 for insertion of the actuation member 298 has a shape corresponding to the opposing flats of the actuation member 298. The actuation member 298 is thereby detained by the housing 296, preventing the actuation member 298 from rotating about the center axis. By energizing the electric motor 202 and causing the rotating shaft 204 and the male screw member 241 to rotate, the actuation member 298 will undergo up-and-down motion in the axial direction due to the screw mechanism.

The upper section of the actuation member 298 is approximately rod-shaped and extends in the axial direction with the upper end forming a spherical linking portion 300 of ball form. The spherical linking portion 300 inserts into the joint tube member 264 which has been anchored to the diaphragm 162, and is supported in abutment against the curving face formed on the inside peripheral face of the joint tube member 264 so that the joint tube member 264 and the actuation member 298 are linked. With this arrangement, rotational actuating force of the actuator 294 will be converted by the screw mechanism into reciprocating actuating force in the axial direction which is exerted on the actuation member 298, and this reciprocating actuating force is then transmitted to the second orifice-defining member 274 via the joint tube member 264 which has been linked to the actuation member 298.

Additionally, because the outside peripheral face of the spherical linking portion 300 is guided by the curving face of the joint tube member 264, the actuation member 298 and the joint tube member 264 are capable of relative tilt. Thus, a bendable area is formed along the path of transmission of the actuating force of the actuator 294 to the second orifice-defining member 274. From the preceding description it will be apparent that in the present embodiment the actuation member 298 and the joint tube member 264 constitute a ball joint.

In the engine mount 242 constructed in accordance with the present embodiment, passage length of the orifice passage 184 is variable through relative displacement of the second orifice-defining member 274 in the axial direction with respect to the first orifice-defining member 272. By controlling the passage length of the orifice passage 184 according to the frequency of input vibration, effective vibration damping of any of various type of vibration with different frequencies can be produced.

Also, the second orifice-defining member 274 and the actuation member 298 of the actuator 294 are linked via a ball joint composed of the joint tube member 264 and the spherical linking portion 300. Thus, misalignment of the second orifice-defining member 274 and the actuation member 298 in the axis-perpendicular direction due to errors during component manufacture or during assembly will be absorbed by the ball joint, preventing defective assembly of the actuator 294.

Moreover, because the actuation member 298 of the actuator 294 has been vulcanization bonded along the entire circumference of the inside peripheral face of the diaphragm 162 to the joint tube member 264 which is linked to the second orifice-defining member 274, actuated displacement of the second orifice-defining member 274 can be accomplished while maintaining the equilibrium chamber 174 in a highly hermetic condition.

Additionally, the inner tubular portion 284 of the second orifice-defining member 274 juts only towards the downward direction from the dividing wall 282, thus affording smaller size in the axial direction as compared with the seventh embodiment wherein it juts out to both the upper and lower sides. Moreover, the dividing wall 282 has recessed contours in its diametrical center section as compared with its outside peripheral section, and by positioning the support tube portion 278 which projects from the first orifice-defining member 272 inside the recessed section of the dividing wall 282, it is possible to avoid increased axial dimension caused by provision of the support tube portion 278.

Also, an axial direction guide means is provided by inserting the guide projection 288 which has been integrally formed on the second orifice-defining member 274 into the guide sleeve 280 which has been provided to the first orifice-defining member 272. Thus, the second orifice-defining member 274 can be made to undergo relative displacement in the axial direction smoothly and with minimal frictional resistance with respect to the first orifice-defining member 272, so that this relative displacement can be brought about with minimal actuating force while also minimizing heat emission by the electric motor 202. Particularly as compared to the case where axial direction guide means is constituted solely by the inside peripheral face of the first orifice-defining member 272 and the outside peripheral face of the second orifice-defining member 274, sticking by the communication slit 234 or communicating window 238 can be avoided so as to provide more effective guiding functionality.

Further, the zone to the inside peripheral side of the first orifice-defining member 272 is bifurcated into upper and lower parts by the second orifice-defining member 274 so as to prevent fluid flow between the zones above and below the second orifice-defining member 274 through any path other than the orifice passage 184. Thus, fluid flow can be produced with high accuracy as a function of passage shape of the orifice passage 184 on the basis of relative pressure differentials between the pressure-receiving chamber 172 and the equilibrium chamber 174, so that the intended vibration damping may be produced efficiently.

Figure 21:
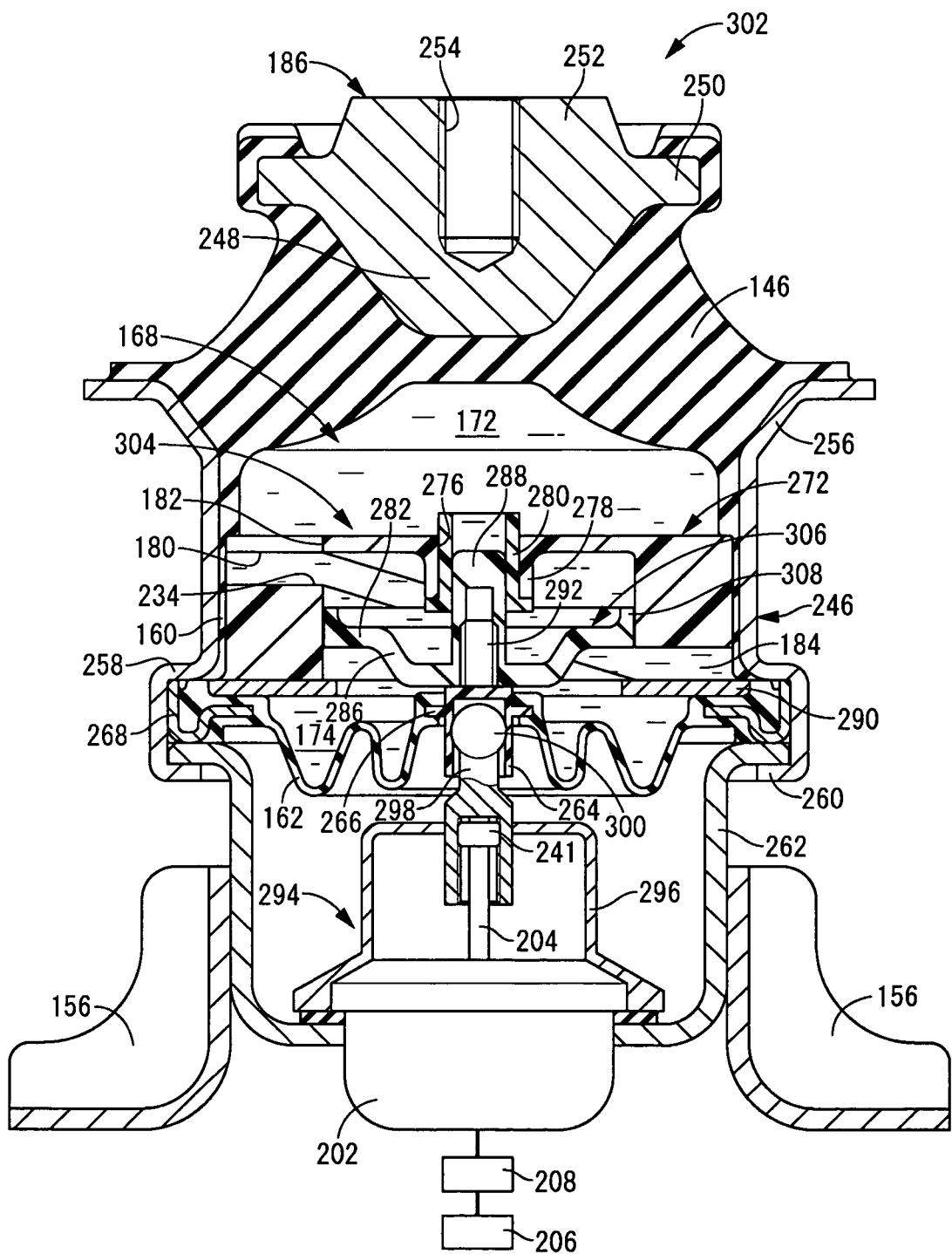
FIG. 21 is a cross sectional view of an automobile engine mount according to a ninth embodiment of the present invention.

Next, FIG. 21 depicts an automotive engine mount 302 according to a ninth embodiment of the fluid-filled vibration damping device constructed according to the present invention. Specifically, the engine mount 302 is furnished with a partition member 304. The partition member 304 has a first orifice-defining member 272 provided as an outer orifice member, and a second orifice-defining member 306 provided as an inner orifice member.

Turning to a more detailed description, the second orifice-defining member 306 is constructed similarly to the second orifice-defining member 274 shown in the eighth embodiment but with the inner tubular portion 284 omitted. Specifically, the second orifice-defining member 306 as a whole is of plate shape having construction in which a center section of approximately circular plate form extending in the axis-perpendicular direction and an outside peripheral section of approximately annular disk form likewise extending in the axis-perpendicular direction are linked by a tapered portion. In the present embodiment, a guide portion 308 of annular form projecting upward has been integrally formed at the outside peripheral edge of a dividing wall 282 of the second orifice-defining member 306. The projecting height of this guide portion 308 may be designed to be greater than the opening height of the communication slit 234 so that its outside peripheral face is able to block the communication slit 234, or designed to be less than the opening height of the communication slit 234 so as to not block the communication slit 234.

The second orifice-defining member 306 fits to the inside peripheral side of the first orifice-defining member 272 and provides the partition member 304. The outside peripheral face of the second orifice-defining member 306 is superposed against the inside peripheral face of the first orifice-defining member 272, and part of the circumference of the communication slit 234 is covered by the outside peripheral face of the second orifice-defining member 306. With this arrangement, the opening at the pressure-receiving chamber 172 side of the orifice passage 184 will be formed to the upper side of the second orifice-defining member 306, while the opening at the equilibrium chamber 174 side of the orifice passage 184 will be formed to the lower side.

In the engine mount 302 having the partition member 304 constructed in this way, passage length of the orifice passage 184 is variable, and effective vibration damping can be produced against vibration of a wider frequency range by controlling the tuning frequency of the orifice passage 184 according to the frequency of input vibration.

Specifically, in the present embodiment, the opening at the equilibrium chamber 174 side of the orifice passage 184 is defined by the section in the communication slit 234 situated axially below the dividing wall 282. The orifice-defining groove 180 of the first orifice-defining member 272 has a helical pattern that slopes in the axial direction while extending in the circumferential direction. On the other hand, the lower face of the outside peripheral edge of the second orifice-defining member 306 takes the form of an approximately flat face extending in the circumferential direction without sloping in the axial direction. With this arrangement, when the second orifice-defining member 306 undergoes relative displacement in the axial direction with respect to the first orifice-defining member 272, the opening at the equilibrium chamber 174 side of the orifice passage 184 will be shifted in the circumferential direction. As a result, the length of the fluid path between the pressure-receiving chamber 172 side opening and the equilibrium chamber 174 side opening of the orifice passage 184 is variable, and the tuning frequency of the orifice passage 184 will be controllable according to the frequency of input vibration.

In the present embodiment, the second orifice-defining member 306 as a whole is approximately plate shaped, allowing the axial dimension to be made smaller at the outside peripheral edge part of the second orifice-defining member 306. Thus, the size of the partition member 304 in the axial direction can be smaller, and the engine mount 302 as a whole can be smaller in size and lighter in weight.

Figure 22:
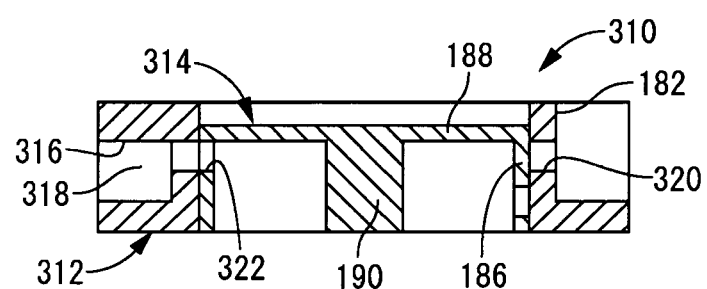
FIG. 22 is a vertical cross sectional view of a partition member of an automobile engine mount according to a tenth embodiment of the present invention.

FIG. 22 depicts a partition member 310 that makes up an engine mount according to a tenth embodiment of the fluid-filled vibration damping device according to the present invention. In FIGS. 22 to 27, parts omitted in the drawings are substantially identical to those in the seventh embodiment.

Figure 23:
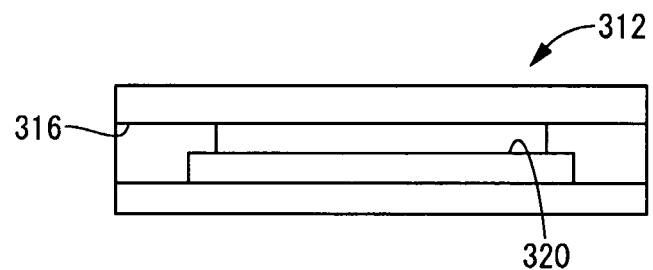
FIG. 23 is a front view of a first orifice-defining member of the partition member.
Figure 24:
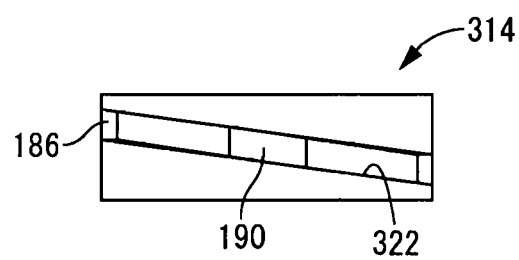
FIG. 24 is a front view of a second orifice-defining member of the partition member.

Specifically, the partition member 310 is composed of a first orifice-defining member 312 provided as an outer orifice member and a second orifice-defining member 314 provided as an inner orifice member. The first orifice-defining member 312 has thick, approximately round tubular shape. As shown in FIG. 23 as well, an orifice-defining groove 316 opens onto its outside peripheral face and extends in the circumferential direction without slope in the axial direction for a distance approximately halfway around the circumference in the axially medial section. The opening at the outside peripheral side of this orifice-defining groove 316 is covered by the second mounting fitting 144, thereby forming an orifice passage 318 that connects the pressure-receiving chamber 172 with the equilibrium chamber 174. Meanwhile, as shown in FIG. 24, the construction of the second orifice-defining member 314 integrally incorporates an inner tubular portion 186, a dividing wall 188, and a linking portion 190.

A communication slit 320 is formed in the first orifice-defining member 312, while a communicating window 322 provided as an orifice connection window is formed in the second orifice-defining member 314. In the present embodiment, the communication slit 320 extends in the circumferential direction without sloping in the axial direction. On the other hand, the communicating window 322 has a helical pattern sloping at a prescribed angle in the axial direction while extending in the circumferential direction, so that the communication slit 320 and the communicating window 322 are formed so as to extend in the circumferential direction at a relative slope in the axial direction. The communication slit 320 and the communicating window 322 intersect in part of the circumference, and the opening at the equilibrium chamber 174 side of the orifice passage 318 is formed at the intersection point of the communication slit 320 and the communicating window 322. In the present embodiment, the orifice-defining groove 316 and the communication slit 320 constitute an orifice-defining window.

Because the communication slit 320 and the communicating window 322 are relatively sloped, the location of the intersection point of the communication slit 320 and the communicating window 322 will change in the lengthwise direction of the orifice-defining groove 316 in association with relative displacement of the first orifice-defining member 312 and the second orifice-defining member 314 in the axial direction, making it possible to modify the tuning of the orifice passage 318 by changing the length of the orifice passage 318.

Thus, in an engine mount that incorporates the partition member 310 furnished with the communication slit 320 of annular form in the circumferential direction and the helical communicating window 322, through reciprocating displacement of the second orifice-defining member 314 in the axial direction the tuning frequency of the orifice passage 318 can be adjusted to achieve effective vibration damping of vibration of a wider range of frequencies.

Figure 25:
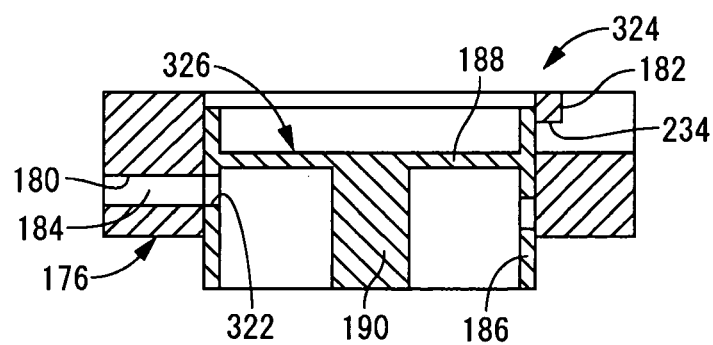
FIG. 25 is a vertical cross sectional view of a partition member of an automobile engine mount according to an eleventh embodiment of the present invention.

FIG. 25 depicts a partition member 324 that makes up an engine mount according to an eleventh embodiment of the fluid-filled vibration damping device according to the present invention. Specifically, the partition member 324 is composed of a first orifice-defining member 176, and a second orifice-defining member 326 provided as an inner orifice member. The second orifice-defining member 326 has a construction integrally incorporating an inner tubular portion 186, a dividing wall 188, and a linking portion 190. In the second orifice-defining member 326 there is formed a communicating window 322 that passes in the diametrical direction through the inner tubular portion 186 and extends for a distance about halfway around circumference, corresponding to the communication slit 234.

As shown in FIG. 25, both the communication slit 234 and the communicating window 322 have helical patterns that slope in the axial direction while extending in the circumferential direction, with the slope direction of the communication slit 234 and the slope direction of the communicating window 322 being mutually opposite. Thus, the communication slit 234 and the communicating window 322 extend in the circumferential direction while sloping relatively in the axial direction, and intersect on part of the circumference. The orifice passage 184 connects to the equilibrium chamber 174 at the intersection point of the communication slit 234 with the communicating window 322.

Because the communication slit 234 and the communicating window 322 are relatively sloped, the location of the intersection point of the communication slit 234 and the communicating window 322 will change in the lengthwise direction of the orifice-defining groove 180 in association with relative displacement of the first orifice-defining member 176 and the second orifice-defining member 326 in the axial direction, making it possible to modify the tuning of the orifice passage 184 by changing the length of the orifice passage 184.

Thus, in an engine mount that incorporates the partition member 324 furnished with the helical communication slit 234 and the helical communicating window 322, it is possible for the tuning frequency of the orifice passage 184 to be adjusted through reciprocating actuated displacement of the second orifice-defining member 326 in the axial direction, so effective vibration damping of vibration of a wider range of frequencies can be achieved.

Furthermore, because the communication slit 234 and the communicating window 322 have helical patterns of opposite slope, it is possible to establish a large angle of relative slope in the axial direction for the communication slit 234 and the communicating window 322. Thus, the extent of change in the location of the intersection point of the communication slit 234 and the communicating window 322 will be smaller relative to the level of relative displacement of the first and second orifice-defining members 176, 326 in the axial direction, so tuning of the orifice passage 184 can be modified with a high degree of accuracy.

Figure 26:
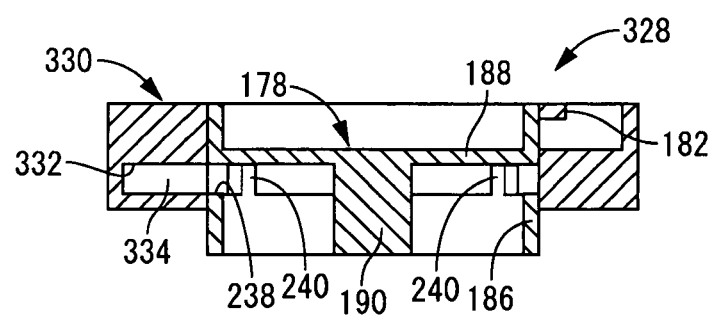
FIG. 26 is a vertical cross sectional view of a partition member of an automobile engine mount according to a twelfth embodiment of the present invention.

FIG. 26 depicts a partition member 328 that makes up an engine mount according to a twelfth embodiment of the fluid-filled vibration damping device according to the present invention. The partition member 328 is composed of a first orifice-defining member 330 provided as an outer orifice member, and a second orifice-defining member 178. In the first orifice-defining member 330 there is formed an orifice-defining groove 332 that opens onto the inside peripheral face and extends in the circumferential direction. The inside peripheral opening of the orifice-defining groove 332 is covered by the second orifice-defining member 178 thereby forming an orifice passage 334 that connects the pressure-receiving chamber 172 with the equilibrium chamber 174. Additionally, in the second orifice-defining member 178 there is formed a communicating window 238 that extends in the circumferential direction at a relative slope in the axial direction to the orifice-defining groove 332. The orifice passage 334 communicates with the equilibrium chamber 174 through the intersection point of the inside peripheral opening of the orifice-defining groove 332 with the communicating window 238, so that passage length of the orifice passage 334 is modifiable through axial displacement of the second orifice-defining member 178. Thus, it should be appreciated that no particular limitations are imposed on the specific construction of the orifice passage.

Figure 27:
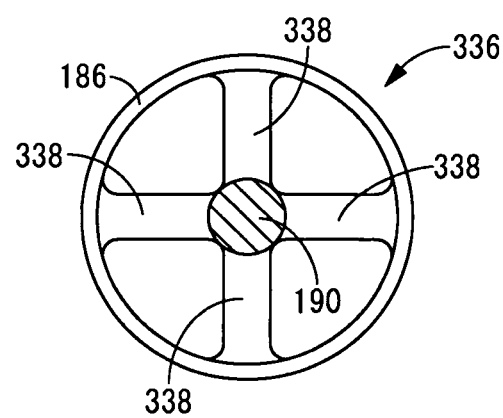
FIG. 27 is a vertical cross sectional view of a second orifice-defining member of an automobile engine mount according to a thirteenth embodiment of the present invention.

FIG. 27 depicts a second orifice-defining member 336 of a partition member that makes up an engine mount according to a thirteenth embodiment of the fluid-filled vibration damping device according to the present invention. This second orifice-defining member 336 has a plurality of spoke portions 338 extending diametrically between an inner tubular portion 186 and a linking portion 190, with the two axial sides to either side of the communicating window 238 being linked together through linking of the inner tubular portion 186 and the linking portion 190 by the spoke portions 338. Thus, it is not essential for the two axial sides of the second orifice-defining member to either side of the communicating window to be linked by a plurality of linking crosspieces.

Figure 28:
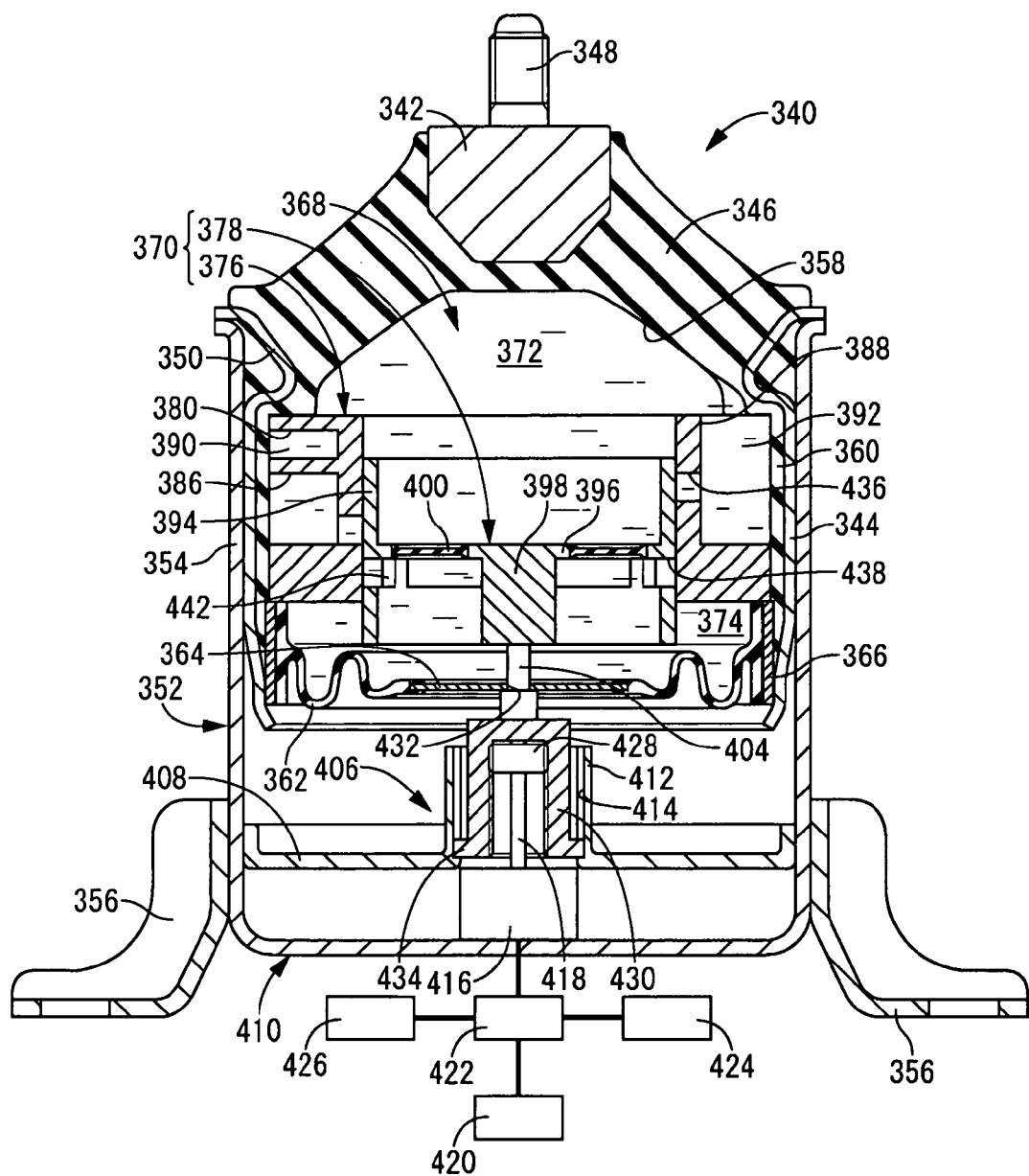
FIG. 28 is a vertical cross sectional view of an automobile engine mount according to a fourteenth embodiment of the present invention where an orifice passage is blocked.

FIG. 28 depicts an automotive engine mount 340 according to a fourteenth embodiment of the fluid-filled vibration damping device according to the present invention. The engine mount 340 has a construction in which a first mounting fitting 342 provided as a first mounting member and a second mounting fitting 344 provided as a second mounting member are linked by a main rubber elastic body 346. The first mounting fitting 342 is mounted onto the power unit (not shown) side, while the second mounting fitting 344 is mounted onto the vehicle body (not shown) side to provide the power unit with vibration-damped support on the vehicle body. In the following description, unless indicated otherwise, the vertical direction refers to the vertical direction in FIG. 28, which is also the axial direction of the engine mount 340.

To describe in greater detail, the first mounting fitting 342 has approximately circular block shape with a mounting bolt 348 that projects upward anchored to the center of its upper end face. The first mounting fitting 342 is designed to be secured to the power unit by this mounting bolt 348.

Meanwhile, the second mounting fitting 344 on the whole has large-diameter, approximately round tubular shape, the upper end section of which takes the form of a gradually flaring tapered tube portion 350. A bracket 352 is secured fitting about the exterior of the second mounting fitting 344. The bracket 352 has a construction in which several mounting leg portions 356 are welded to the outside peripheral face of an approximately cup-shaped mounting portion 354. The mounting portion 354 is then pressure-fit slipped about the exterior of the second mounting fitting 344 in order to attach the bracket 352 to the second mounting fitting 344. The bracket 352, and hence the second mounting fitting 344, is secured to the vehicle body by fastening bolts (not shown) which are passed through mounting holes that have been formed in the mounting leg portions 356 of the bracket 352.

The first mounting fitting 342 and the second mounting fitting 344 are linked by the main rubber elastic body 346. The main rubber elastic body 346 has approximately truncated cone shape to which the first mounting fitting 342 has been vulcanization bonded while embedded to prescribed depth into the small-diameter end. The tapered tube portion 350 of the second mounting fitting 344 has been vulcanization bonded to the outside peripheral face of the large-diameter end of the main rubber elastic body 346. In the large-diameter end face of the main rubber elastic body 346 there is formed a large-diameter recess 358 of inverted bowl shape. A thin seal rubber layer 360 sheathing the inside peripheral face of the second mounting fitting 344 is integrally formed with the main rubber elastic body 346 so as to extend downward from its outside peripheral edge.

The opening at the lower end of the second mounting fitting 344 is covered by a diaphragm 362 provided as a flexible film. The diaphragm 362 is a rubber film of thin, approximately annular disk shape having slack in the axial direction, with an anchor plate 364 of approximately circular disk shape arranged in its diametrical center section, and the inside peripheral edge of the diaphragm 362 vulcanization bonded about the entire circumference to the outside peripheral edge of the anchor plate 364. Additionally, a fastener fitting 366 of annular form is vulcanization bonded to the outside peripheral edge of the diaphragm 362, and the fastener fitting 366 is then secured fitting internally into the lower end of the second mounting fitting 344 so that the lower opening of the second mounting fitting 344 is provided with fluidtight closure by the diaphragm 362. By so doing, inside the second mounting fitting 344 there is defined in the axial direction between the main rubber elastic body 346 and the diaphragm 362 a fluid chamber 368 that is sealed off from the outside and filled with a non-compressible fluid. A low-viscosity fluid such as water or an alkylene glycol is favorable for use as the sealed fluid.

A partition member 370 of thick, approximately circular disk shape is positioned inside the fluid chamber 368 so as to extend in the axis-perpendicular direction. The fluid chamber 368 is bifurcated to either side of the partition member 370 in the axial direction, defining to the upper side of the partition member 370 a pressure-receiving chamber 372 whose wall is partly constituted by the main rubber elastic body 346 and that is exposed to pressure fluctuations during vibration input, while defining to the lower side of the partition member 370 an equilibrium chamber 374 whose wall is partly constituted by the diaphragm 362, and which has variable volume.

Figure 29:
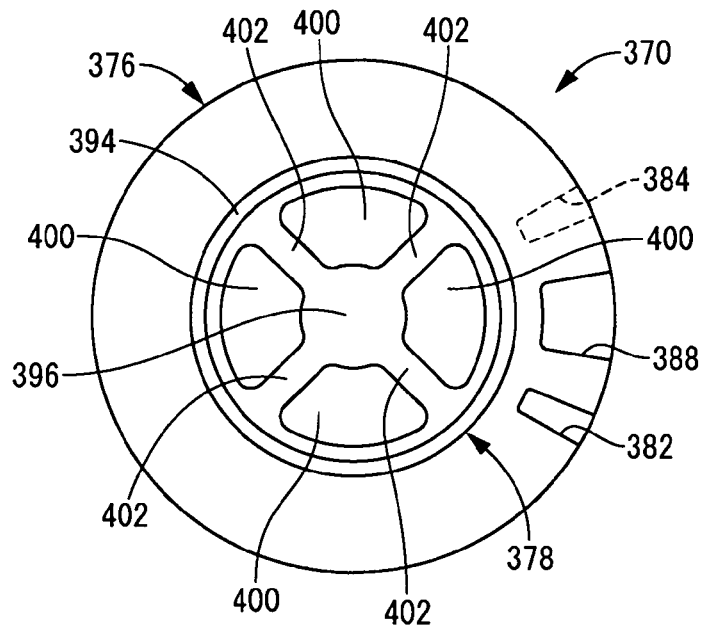
FIG. 29 is a plan view of a partition member of the engine mount.

As shown in FIGS. 28 and 29, the partition member 370 includes a first orifice-defining member 376 provided as an outer orifice member, and a second orifice-defining member 378 provided as an inner orifice member.

Figure 30:
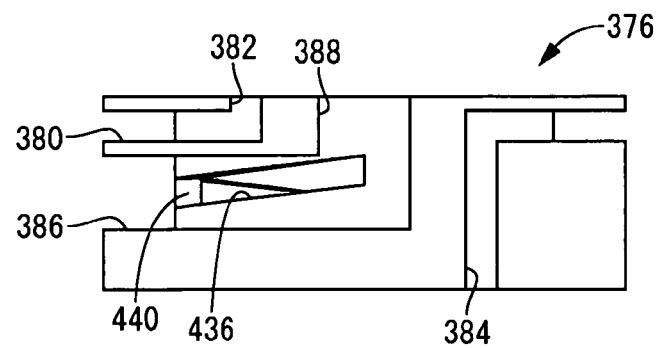
FIG. 30 is a front view of a first orifice-defining member of the partition member.
Figure 31:
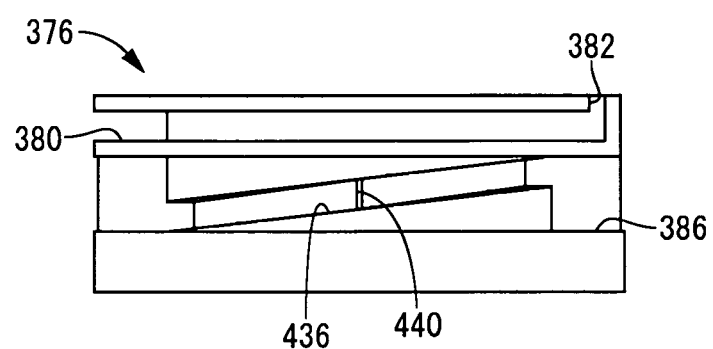
FIG. 31 is a side view of the first orifice-defining member.

The first orifice-defining member 376 has approximately round tubular shape, and is a rigid component made of metal, synthetic resin or the like secured fitting to the inside peripheral side of the second mounting fitting 344. As shown in FIGS. 30 and 31, in the axial upper part of the first orifice-defining member 376 there is formed a circumferential groove 380 that opens onto the outside peripheral face and extends in the circumferential direction for a prescribed distance just short of full circle. At the two ends of this circumferential groove 380 there are formed communicating holes 382, 384 that extend in the axial direction, and the two ends of the circumferential groove 380 communicate with the pressure-receiving chamber 372 and the equilibrium chamber 374 through these communicating holes 382, 384. Additionally, in the axially medial section of the first orifice-defining member 376 there is formed an orifice-defining groove 386 that opens onto the outside peripheral face and extends in the circumferential direction for a distance equal to about half the circumference. This orifice-defining groove 386 communicates at a first end thereof with the pressure-receiving chamber 372 through a communicating hole 388 that extends axially upward. The orifice-defining groove 386 has the same depth as the circumferential groove 380 but a larger axial dimension than the circumferential groove 380, so the cross sectional area of the groove is larger. As shown in FIG. 30, the communicating holes 382, 384 and the communicating hole 388 are respectively formed independently at different locations on the circumference.

The first orifice-defining member 376 is secured supported to the inside peripheral side of the second mounting fitting 344 by subjecting the second mounting fitting 344 to a diameter reduction process. Additionally, the outside peripheral face of the first orifice-defining member 376 is supported superposed against the inside peripheral face of the second mounting fitting 344 so that the opening on the outside peripheral side of the circumferential groove 380 formed in the first orifice-defining member 376 is covered fluidtightly. A first orifice passage 390 provided as fluid passage that extends in the circumferential direction through the outside peripheral edge part of the first orifice-defining member 376 and connects the pressure-receiving chamber 372 and the equilibrium chamber 374 to one another is formed thereby. In the present embodiment, this first orifice passage 390 is formed such that the pressure-receiving chamber 372 and the equilibrium chamber 374 are in constant communication. In the present embodiment, the first orifice passage 390 is tuned to low frequency corresponding to engine shake, and is thus set to a lower frequency than the tuning frequency of a second orifice passage 392, discussed later, which has been tuned to a midrange frequency corresponding to idling vibration.

The opening at the outside peripheral side of the orifice-defining groove 386 is also covered fluidtightly by the second mounting fitting 344. A tunnel-like path that extends in the circumferential direction without sloping in the axial direction is thereby formed in the outside peripheral edge part of the first orifice-defining member 376, independently of the first orifice passage 390. This path connects at one end to the pressure-receiving chamber 372 through the communicating hole 388, while its other end connects to the equilibrium chamber 374 through the intersection point of a communication slit 436 and a communicating window 438, discussed later, so that utilizing the orifice-defining groove 386 there is formed the second orifice passage 392 which is provided as an orifice passage connecting the pressure-receiving chamber 372 and the equilibrium chamber 374 to one another. The second orifice passage 392 is tuned to a midrange frequency on the order of 20 Hz to 40 Hz corresponding to idling vibration.

The first orifice-defining member 376 fits inserted into the second orifice-defining member 378. As shown in FIG. 28, the second orifice-defining member 378 has an inner tubular portion 394. The inner tubular portion 394 has approximately round tubular shape of outside diameter corresponding to the inside diameter of the first orifice-defining member 376, and extends in a straight line in the axial direction. A dividing wall 396 is integrally formed in the axially medial section of the inner tubular portion 394 so as to extend in the axis-perpendicular direction, and the center hole of the inner tubular portion 394 is sealed off and divided into upper and lower parts by the dividing wall 396. A linking portion 398 of small-diameter round post shape projecting downward is integrally formed in the diametrical center part of the dividing wall 396.

A second moveable rubber film 400 provided as liquid pressure absorbing means is arranged in the second orifice-defining member 378. The second moveable rubber film 400 is positioned extending in the axis-perpendicular direction so as to cover through-holes that have been formed in the diametrical medial section of the dividing wall 396 so that pressure of the pressure-receiving chamber 372 is exerted on one face, while pressure of the equilibrium chamber 374 is exerted on the other face. As shown in FIG. 29, the through-holes have been formed at multiple locations along the circumference with spoke portions 402 that extend in the diametrical direction between them. The second moveable rubber film 400 is composed of several rubber films of approximately fan-shape viewed in the axial direction, arranged so as to close off the through-holes.

As shown in FIG. 28, the second orifice-defining member 378 is positioned inserted into the first orifice-defining member 376 so that the inside peripheral side (center hole) of the tubular first orifice-defining member 376 is bifurcated into upper and lower parts by the inner tubular member 394 and the dividing wall 396 of the second orifice-defining member 378. Thus, the partition member 370 of the present embodiment, which partitions the fluid chamber 368 into upper and lower parts, is constituted cooperatively by the first orifice-defining member 376 and the second orifice-defining member 378. The second orifice-defining member 378 fits into the first orifice-defining member 376 in a condition such that relative displacement in the axial direction is allowed. The pressure-receiving chamber 372 is partially constituted by a zone situated to the inside peripheral side of the inner tubular portion 394 and above the dividing wall 396 in the second orifice-defining member 378, while the equilibrium chamber 374 is partially constituted by a zone situated diametrically between the inner tubular portion 394 and the linking portion 398 in the second orifice-defining member 378.

As shown in FIG. 28, to the linking portion 398 of the second orifice-defining member 378 there is anchored by way of an actuator shaft an output shaft 404 that extends downward. This output shaft 404 has approximately stepped rod shape smaller in diameter at the top than at the bottom, and passes through the center section of a cover plate 408 to project out from a housing 410. The lower end of the output shaft 404 is attached to an actuator 406. The actuator 406 is situated below a diaphragm 362, and has a housing 410 composed of the mounting portion 354 of the bracket 352, and a cover plate 408 of approximately annular disk shape attached so as to cover the opening of the mounting portion 354 in the axially medial section. A guide tube portion 412 of approximately round tubular shape projecting axially upward is integrally formed at the inside peripheral edge of the cover plate 408. In sections of the guide tube portion 412 situated in opposition along a diametrical axis there are formed a pair of mating grooves 414, 414 that open onto the inside peripheral face and extend in the axial direction; these open onto the inside peripheral face and upper end face of the guide tube portion 412.

The housing 410 accommodates an electric motor 416. The electric motor 416 is a pulse motor in which successive pulses are applied to the multiphase windings of a stator so that the stator (rotating shaft 418) rotates by a given angular increment each time that a pulse is applied, the amount of rotation of the rotating shaft 418 being controllable through control by a control circuit 422 of the actuating pulses applied to the electric motor 416 from a power supply unit 420 such as a battery. In the present embodiment in particular, a state signal serving as a basis for deciding whether the automobile is in a moving or idling state is input to the control circuit 422 by a speed sensor 424 provided as driving/idling determining means. Engine speed information for the automobile is input to the control circuit 422 by an engine control unit 426 provided as speed measuring means. The control circuit 422 will control whether to energize the electric motor 416 and the duration of energization (i.e. the amount of rotation of the rotating shaft 418) in response to these input signals.

The electric motor 416 is situated in the diametrical center section of the housing 410, and the rotating shaft 418 projects upward through the center hole of the cover plate 408. A male screw member 428 is secured externally fitted onto the rotating shaft 418 so as to be coaxially positioned therewith, so that the male screw member 428 undergoes rotating movement in unison with the rotating shaft 418. A thread is formed on the outside peripheral face of this male screw member 428.

An actuation member 430 is attached to the male screw member 428. The actuation member 430 as a whole has an inverted, approximately bottomed round tubular shape, and on the inside peripheral face of its peripheral wall there is formed a thread that corresponds to the male screw member 428. The actuation member 430 is attached to the rotating shaft 418 to which the male screw member 428 has been attached, with the male screw member 428 and the actuation member 430 screwed together.

By anchoring the output shaft 404 in the upper face of the actuation member 430 there is provided an actuator shaft that extends along the center axis, and which passes through the anchor plate 364 and is secured to the second orifice-defining member 378 of the partition member 370. Specifically, the upper part (small-diameter part) of the output shaft 404 projecting outside the housing 410 is secured inserted through an insertion hole 432 that has been formed passing through the anchor plate 364 of the diaphragm 362. The output shaft 404 is anchored to the diaphragm 362 through the agency of the anchor plate 364 so as to project out to both the upper and lower sides of the diaphragm 362. A fluidtight seal is provided between the output shaft 404 and the anchor plate 364 to prevent the non-compressible fluid from leaking to the outside through the insertion hole 432 of the anchor plate 364. Sealing of the insertion hole 432 in the anchor plate 364 may be accomplished, for example, by disposing a O-ring between the axially opposed faces of the step of the output shaft 404 and the inside peripheral edge of the anchor plate 364; by adopting an integral structure for the output shaft 404 and the anchor plate 364; or by securing the output shaft 404 and the anchor plate 364 through welding. In the present embodiment, the output shaft 404 and the anchor plate 364 are welded together, and the actuator shaft is composed of the output shaft 404 and the anchor plate 364.

At the lower end of the actuation member 430 there are formed a pair of mating projections 434, 434 that project outwardly along an axis in the diametrical direction, and each mating projection 434 is adapted to insert into one of the mating grooves 414 of the guide tube portion 412. Through abutment of the mating grooves 414 and the mating projections 434 in the circumferential direction, the actuation member 430 is prevented from rotating about the center axis, while permitting actuated displacement of the actuation member 430 in the axial direction through displacement of the mating projections 434 along the mating grooves 414. In this way, the mating grooves 414 and the mating projections 434 provide the rotation inhibiting mechanism in the present embodiment.

Reciprocating movement of the actuation member 430 in the axial direction is then actuated by energizing the electric motor 416 from the external power supply unit 420 to actuate rotation of the rotating shaft 418. Specifically, owing to the male screw member 428 and the actuation member 430 being screwed together, and to the rotation inhibiting mechanism provided by the mating grooves 414 and the mating projections 434, when the male screw member 428 which has been secured to the rotating shaft 418 undergoes actuated rotation, the actuation member 430 will experience relative displacement in the axial direction with respect to the male screw member 428, depending on the direction of rotation of the rotating shaft 418. Thus, in the present embodiment, a screw mechanism composed of the male screw member 428 and the actuation member 430 provides the motion conversion mechanism for converting rotational actuating force of the electric motor 416 to reciprocating actuating force in the axial direction.

Furthermore, actuating force exerted in the axial direction on the actuation member 430 will be transmitted to the second orifice-defining member 378 via the output shaft 404 which has been fixed to the actuation member 430, thus producing actuated reciprocation of the second orifice-defining member 378 in the axial direction. In the present embodiment, the actuation member 430 is secured passing through the anchor plate 364 which has been vulcanization bonded to the inside peripheral edge of the diaphragm 362, and actuated displacement of the actuation member 430 in the axial direction is permitted through deformation of the diaphragm 362.

Here, one end of the second orifice passage 392 communicates with the pressure-receiving chamber 392 through the communicating hole 382, while the other end of the second orifice passage 372 communicates with the equilibrium chamber 374 through the intersection of the communication slit 436 and the communicating window 438 which is provided as an orifice connection window.

The communication slit 436 is formed with an approximately helical pattern so as to pass in the diametrical direction through the inside peripheral wall of the orifice-defining groove 386 that was formed in the first orifice-defining member 376, and open onto the inside peripheral face of the first orifice-defining member 376. By furnishing such a communication slit 436 that extends in the circumferential direction, the orifice-defining groove 386 will communicate along approximately its entire length in the circumferential direction with the center hole of the first orifice-defining member 376. In the present embodiment, reinforcing crosspieces 440 are provided along the circumference of the communication slit 436 so that the upper and lower sides of the first orifice-defining member 376 to either side of the communication slit 436 are integrally linked by the reinforcing crosspieces 440. In the present embodiment, the orifice-defining groove 386 and the communication slit 436 provide an orifice-defining window.

Meanwhile, the communicating window 438 has approximately annular form so as to pass in the diametrical direction through the inner tubular portion 394 of the second orifice-defusing member 378 and open onto the outside peripheral face of the second orifice-defining member 378. The communicating window 438 is formed below the dividing wall 396 in the inner tubular portion 394 of the second orifice-defining member 378 so that the communicating window 438 communicates with a zone situated diametrically between the linking portion 398 and the inner tubular portion 394 which constitutes part of the equilibrium chamber 374. Further, in the second orifice-defining member 378 in the present embodiment, several linking crosspieces 442 are provided along the circumference of the communicating window 438 so that the inner tubular portion 394 at the two sides thereof bordering the communicating window 438 is integrally linked at several locations along the circumference by the linking crosspieces 442.

Moreover, in the present embodiment, the communication slit 436 has an approximately helical pattern extending for a distance equal to approximately half the circumference in the circumferential direction while sloping in the axial direction; whereas the communicating window 438 has annular form extending in the circumferential direction around the entire circumference without sloping in the axial direction. Consequently, the communication slit 436 and the communicating window 438 extend in the circumferential direction at a relative slope in the axial direction. In the present embodiment, the communication slit 436 has a smaller axial dimension than the orifice-defining groove 386, and one circumferential end thereof is situated at the upper end of the orifice-defining groove 386 while the other circumferential end is situated at the lower end of the orifice-defining groove 386, so as to extend in the circumferential direction on a slope in the axial direction.

The second orifice-defining member 378 fits inside the center hole of the first orifice-defining member 376 in a condition permitting relative displacement in the axial direction, whereby the communication slit 436 of the first orifice-defining member 376 and the communicating window 438 of the second orifice-defining member 378 intersect one another in part of the circumference. The opening at the equilibrium chamber 374 side of the second orifice passage 392 is thereby formed at the intersection point of the communication slit 436 and the communicating window 438 so that the pressure-receiving chamber 372 and the equilibrium chamber 374 communicate with one another through the second orifice passage 392. In the present embodiment in particular, the section of the communication slit 436 situated away from the intersection point with the communicating window 438 is covered and sealed off by the inner tubular portion 394 so that the path of the second orifice passage 392 forms between the communicating hole 382 and the aforementioned intersection point.

In the present embodiment, the inside peripheral face of the first orifice-defining member 376 and the outside peripheral face of the second orifice-defining member 378 are superposed with a slight gap between them in the axis-perpendicular direction. This provides axial direction guide means adapted to guide relative displacement of the second orifice-defining member 378 in the axial direction with respect to the first orifice-defining member 376, while restricting relative displacement in the axis-perpendicular direction.

The second orifice passage 392 has variable passage length, making it possible for the tuning frequency, which is established by the ratio (A/L) of passage cross sectional area (A) to passage length (L), to be adjusted according to the frequency of input vibration. Specifically, when actuated displacement of the second orifice-defining member 378 in the axial direction is actuated by the actuator 406, the intersection location of the helical communication slit 436 and the communicating window 438 that extends in the circumferential direction will change in the lengthwise direction of the orifice-defining groove 386. Thus, the location of the opening at the equilibrium chamber 374 side of the second orifice passage 392, which is defined in concert by the communication slit 436 and the communicating window 438, will change in the circumferential direction, and the passage length (L) of the second orifice passage 392 will change. As a result, the tuning frequency of the second orifice passage 392 will be reset so that effective vibration damping can be produced respectively against vibrations of different frequencies.

Additionally, in the present embodiment, by positioning the second orifice-defining member 378 at the top or a medial position in the operating direction, the communication slit 436 and the communicating window 438 will be made to intersect at part of the circumference. While by positioning the second orifice-defining member 378 at the bottom in the operating direction as depicted in FIG. 28, the communicating window 438 will be positioned below the lower end of the communication slit 436 so that the communication slit 436 and the communicating window 438 no longer intersect. Thus, the second orifice passage 392 is selectively switchable between the communicating and blocked states.

When installed in a vehicle, the engine mount 340 constructed in accordance with the present embodiment will experience selective or combined input of several types of vibration of different frequencies depending on factors such as driving conditions of the automobile and engine speed. Then, a speed sensor 424 will decide whether the automobile is moving or idling while measuring the engine speed of the automobile by an engine control unit 426, and on the basis of this information the axial position of the second orifice-defining member 378 will be controlled in order to efficiently produce vibration damping of the input vibration.

Specifically, if the speed sensor 424 decides that the automobile is moving, the control circuit 422 will control the electric motor 416 and actuated displacement of the second orifice-defining member 378 to the bottom position. The communication slit 436 and the communicating window 438 will thereby be moved apart in the axial direction and held in a non-communicating state so that the second orifice passage 392 is blocked off. As a result, fluid flow through the first orifice passage 390 will be created efficiently, so as to produce the intended vibration damping (high attenuating action) of low-frequency vibration corresponding to engine shake, which can be a problem during driving.

On the other hand, if the speed sensor 424 decides that the automobile is idling, the control circuit 422 will control the electric motor 416 and actuated displacement of the second orifice-defining member 378 to a prescribed position lying between the top and a medial location in the axial direction, switching the second orifice passage 392 to the communicating state. Accordingly, the axial position of the second orifice-defining member 378 will be controlled based on engine speed information measured by the engine control unit 426 in order to adjust the passage length of the second orifice passage 392 according to the engine speed. Then, by changing the passage length while maintaining the same path cross sectional area, the tuning frequency of the second orifice passage 392 will be adjusted to the frequency of the input vibration, which varies according to engine speed.

More specifically, if the engine speed has increased to high rpm in association with startup of the engine or with use of the air conditioner, the second orifice-defining member 378 will undergo actuated displacement towards the top, making the passage length of the second orifice passage 392 shorter. Thus, vibration damping will be produced efficiently against idling vibration of relatively high frequency input at times of high engine rpm. Meanwhile, at times of rated rpm, i.e. excluding the special high rpm condition mentioned above, the second orifice-defining member 378 will be positioned at a medial location in the axial direction, making the passage length of the second orifice passage 392 relatively long. Thus, vibration damping will be produced efficiently against idling vibration of relatively low frequency.

When carrying out control in the above manner, it is possible to employ a design whereby the second orifice-defining member 378 may be displaced to and held at any position in the axial direction so that the tuning frequency of the second orifice passage 392 is continuously adjustable. Alternatively, it is possible to employ a design whereby the second orifice-defining member 378 is displaced in stepwise fashion to and held at a given plurality of positions in the axial direction so that the tuning frequency of the second orifice passage 392 is adjustable in steps. Where the tuning of the second orifice passage 392 is adjusted stepwise, the engine control unit 426 may measure engine speed as stepwise measurements.

Further, the present embodiment employs a construction whereby the first orifice passage 390 is held in a state of constant communication, with the tuning frequency of the first orifice passage 390 set to a lower frequency than the tuning frequency of the second orifice passage 392. Thus, at times of input of idling vibration, during which the second orifice passage 392 is switched to the communicating state, the first orifice passage 390 will give rise to clogging due to antiresonance action and will become substantially blocked. As a result, fluid flow will be produced efficiently through the second orifice passage 392 so that the intended vibration damping can be effectively achieved. Moreover, there is no need to provide a special mechanism for blocking off the first orifice passage 390, so switching of the orifice passages 390, 392 can be accomplished with a simple construction.

Additionally, in response to input of vibration corresponding to driving rumble, which has an even higher frequency than idling vibration, the second moveable rubber film 400 which has been provided to the dividing wall 396 of the second orifice-defining member 378 will experience minute deformation and give rise to vibration damping (low dynamic spring action) based on liquid pressure absorbing action of the second moveable rubber film 400.

Thus, in the present embodiment, the first orifice passage 390 which has been tuned to low frequency, the second orifice passage 392 which produces vibration damping of a wide range of midrange frequencies, and the second moveable rubber film 400 which has been tuned to high frequency together produce effective vibration damping of input vibration of a wider range of frequencies.

Figure 32:
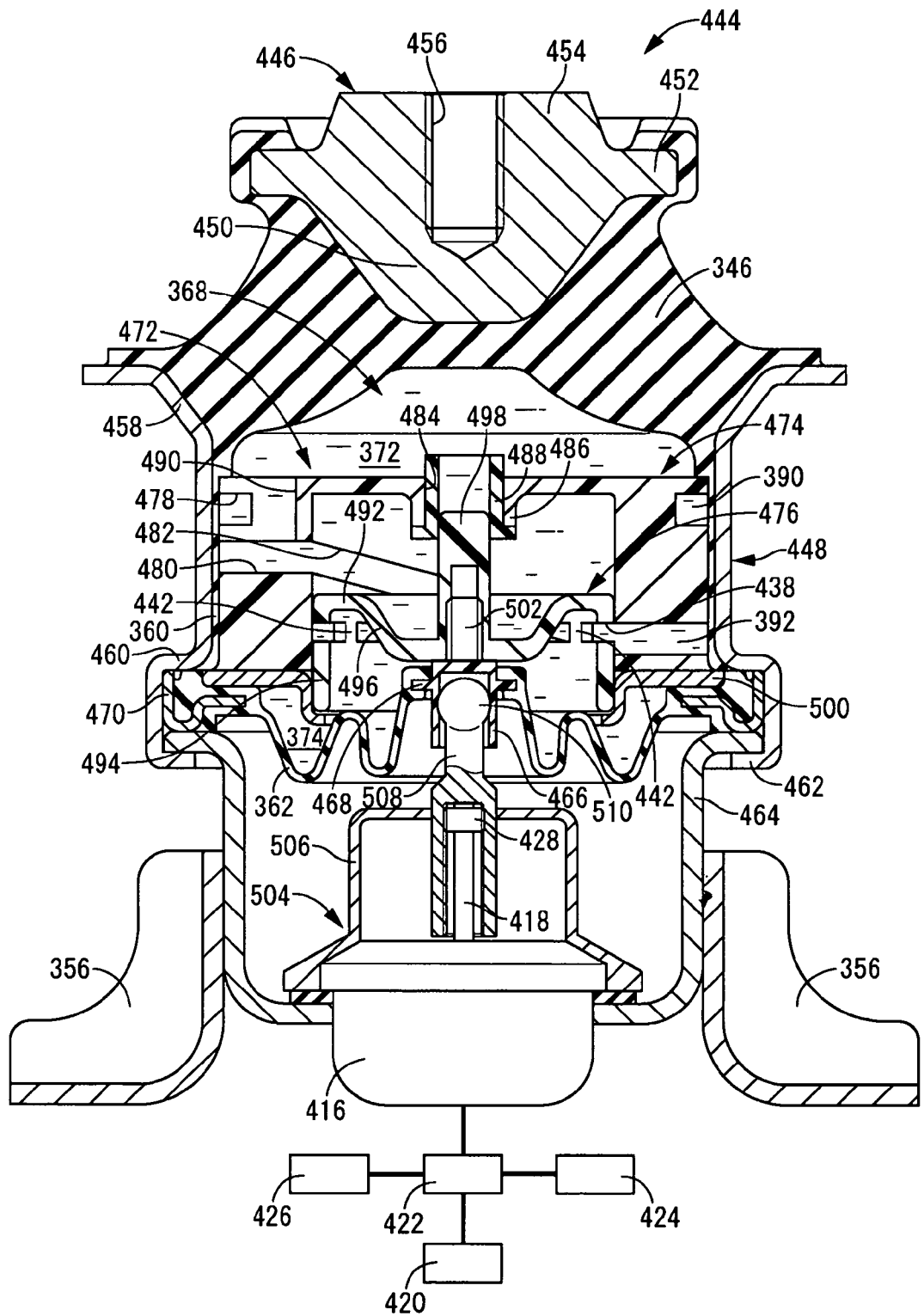
FIG. 32 is a vertical cross sectional view of an automobile engine mount according to a fifteenth embodiment of the present invention

FIG. 32 depicts an automotive engine mount 444 according to a fifteenth embodiment of the fluid-filled vibration damping device according to the present invention. This engine mount 444 has a construction in which a first mounting fitting 446 provided as a first mounting member and a second mounting fitting 448 provided as a second mounting member are linked by a main rubber elastic body 346. In the following description, components and parts identical to those in the preceding embodiments have been assigned like symbols and are not described.

Turning to a more detailed discussion, the first mounting fitting 446 is of integrally formed construction including an anchor portion 450 of inverted, approximately truncated cone shape; a flange portion 452 that projects peripherally outward at the upper end of the anchor portion 450; and a mounting portion 454 of approximately truncated cone shape projecting upward from the upper end of the anchor portion 450. The first mounting fitting 446 is designed to be mounted on the power unit by threading a mounting bolt (not shown) into a bolt hole 456 that extends along the center axis.

Meanwhile, the second mounting fitting 448 is made of rigid material comparable to the first mounting fitting 446, and has large-diameter, approximately round tubular shape on the whole. Further, the upper end part of the second mounting fitting 448 takes the form of a gradually flaring tapered section 458, while in the lower end part there is integrally formed a swaging piece 462 of tubular contours, with a step portion 460 between. The rim of the opening of a bracket 464 of approximately bottomed round tubular shape is swaged and secured by the swaging piece 462 to the lower end of the second mounting fitting 448, and several mounting leg portions 356 fastened to the outside peripheral face of the bracket 464 are mounted onto the vehicle body (not shown) so that the second mounting fitting 448 is mounted onto the vehicle body via the bracket 464.

The first mounting fitting 446 and the second mounting fitting 448, positioned coaxially and spaced apart in the vertical direction, are linked to one another by the main rubber elastic body 346. The upper opening of the second mounting fitting 448 is thereby sealed off fluidtightly by the main rubber elastic body 346.

The lower opening of the second mounting fitting 448 is covered by a diaphragm 362. The diaphragm 362 is a thin, approximately annular disk shaped rubber film imparted with ample slack in the axial direction and whose inside peripheral edge is vulcanization bonded about its entire circumference to a joint tube member 466. The joint tube member 466 is a component having inverted, approximately bottomed round tubular shape in which a curving face has been formed extending about the entire circumference of the axially medial section of its inside peripheral face, and an anchor flange 468 of flange form projecting peripherally outward has been integrally formed in the axially medial section. The inside peripheral face of the diaphragm 362 is superposed against the outside peripheral face of the joint tube member 466, and the section that includes the anchor flange 468 is vulcanization bonded thereto to anchor the joint tube member 466 to the diametrical center section of the diaphragm 362.

Meanwhile, the outside peripheral edge of the diaphragm 362 is vulcanization bonded about its entire circumference to a fastener fitting 470 of annular form. The fastener fitting 470 is then inserted into the lower end of the second mounting fitting 448 and secured swaged in place by the swaging piece 462 to attach the diaphragm 362 at the lower end of the second mounting fitting 448. By so doing the lower opening of the second mounting fitting 448 is sealed off fluidtightly by the diaphragm 362, forming to the inside peripheral side of the second mounting fitting 448 a fluid chamber 368 that is situated between the axially opposing faces of the main rubber elastic body 346 and the diaphragm 362, and filled with a non-compressible fluid.

A partition member 472 is positioned inside the fluid chamber 368. The partition member 472 has thick, approximately circular disk shape and is arranged so as to extend in the axis-perpendicular direction inside the fluid chamber 368 while supported by the second mounting fitting 448. The fluid chamber 368 is thereby bifurcated into upper and lower parts to either side of the partition member 472 to define a pressure-receiving chamber 372 and an equilibrium chamber 374 to either side of the partition member 472.

The partition member 472 includes a first orifice-defining member 474 provided as an outer orifice member, and a second orifice-defining member 476 provided as an inner orifice member.

The first orifice-defining member 474 on the whole has an inverted, approximately bottomed tubular shape and is made of synthetic resin such as PPS or metal such as aluminum alloy. In the first orifice-defining member 474 there is formed a circumferential groove 478 of annular form in the circumferential direction opening onto the outside peripheral face. Below the circumferential groove 478 there is formed an orifice-defining groove 480 of helical form opening onto the outside peripheral face and extending the circumferential direction on a slope. Further, in the inside peripheral wall of the orifice-defining groove 480 there is formed a communication slit 482 of helical form passing through the wall in the diametrical direction and opening onto the inside peripheral face of the first orifice-defining member 474 so that the orifice-defining groove 480 and the communication slit 482 provide an orifice-defining window. In the diametrical center section of the first orifice-defining member 474 there is formed a support hole 484 that passes through the upper base wall, and a support tube portion 486 of tubular form projects downward from the rim of the opening of the support hole 484. A guide sleeve 488 of tubular form is attached fitting into the support hole 484. This guide sleeve 488 is fabricated of self-lubricating resin or coated with grease for example, to keep the coefficient of friction on its inside face to a minimum.

The first orifice-defining member 474 is then inserted and fit to the inside peripheral side of the second mounting fitting 448 and is supported by the second mounting fitting 448. The outside peripheral face of the first orifice-defining member 474 is positioned in intimate contact against the inside peripheral face of the second mounting fitting 448 via the intervening seal rubber layer 360 so that the first orifice passage 390 is formed utilizing the circumferential groove 478 and the second orifice passage 392 is formed utilizing the orifice-defining groove 480. In the present embodiment, one end of the circumferential groove 478 and one end of the orifice-defining groove 480 each communicate with the pressure-receiving chamber 372 through a communicating hole 490, while the ends of the first orifice passage 390 and the second orifice passage 392 on the pressure-receiving chamber 372 side form a common path.

The second orifice-defining member 476 is inserted and fitted to the inside peripheral side of the first orifice-defining member 474. The second orifice-defining member 476 has an inverted, approximately bottomed round tubular shape integrally incorporating a dividing wall 492 of approximately circular disk shape, and an inner tubular portion 494 that projects downward from the outside peripheral edge of the dividing wall 492; and is made of synthetic resin such as POM or metal such as aluminum alloy. The dividing wall 492 has in its diametrical medial section a sloping portion 496 of tapered shape, with the inside peripheral section to one side of the sloping portion 496 being positioned below the outside peripheral section situated to the other side. Further, in the inner tubular portion 494 there is formed a communicating window 438 that extends in annular shape in the circumferential direction and passes in the diametrical direction through the inner tubular portion 494. Additionally, a guide projection 498 of small-diameter post shape projecting upward in the axial direction is integrally formed in the inside peripheral section of the dividing wall 492. While imposing no particular limitation on the second orifice-defining member 476, in preferred practice its surface will have a low coefficient of friction in order to achieve smooth displacement in the axial direction, discussed later.

The second orifice-defining member 476 is then inserted and fit to the inside peripheral side of the first orifice-defining member 474. Then, with the second orifice-defining member 476 having been inserted to the inside peripheral side of the first orifice-defining member 474, a cover fitting 500 of approximately annular disk shape is attached to the lower end face of the first orifice-defining member 474. In this cover fitting 500 the inside peripheral side thereof is positioned below the outside peripheral side via an intervening step provided in the diametrical medial section; and the inside diameter is smaller than the inside diameter of the first orifice-defining member 474 so that the inside peripheral side of the step juts out into the lower opening of the first orifice-defining member 474. Thus, the bottom position of the second orifice-defining member 476 will regulated by the lower end face of the inner tubular portion 494 of the second orifice-defining member 476 coming into abutment against the upper face of the inside peripheral edge of the cover fitting 500, preventing the second orifice-defining member 476 from becoming dislodged from the first orifice-defining member 474. In the present embodiment, the inside peripheral face of the first orifice-defining member 474 and the outside peripheral face of the second orifice-defining member 476 are situated in opposition in the diametrical direction across a gap sufficiently small to substantially prevent fluid flow through the gap. The zone to the inside peripheral side of the first orifice-defining member 474 is bifurcated into upper and lower parts by second orifice-defining member 476.

The guide projection 498 of the second orifice-defining member 476 fits inside the guide sleeve 488 of the first orifice-defining member 474 and is supported slidably in the axial direction. This arrangement provides axial direction guide means adapted to limit relative displacement of the second orifice-defining member 476 in the axis-perpendicular direction with respect to the first orifice-defining member 474, and to guide relative displacement of the second orifice-defining member 476 in the axial direction with respect to the first orifice-defining member 474. In the present embodiment, the inside peripheral face of the first orifice-defining member 474 and the outside peripheral face of the inner tubular portion 494 of the second orifice-defining member 476 are superposed across a very small gap, whereby the inside peripheral face of the first orifice-defining member 474 and the outside peripheral face of the second orifice-defining member 476 also afford positioning action in the axis-perpendicular direction, and guiding action in the axial direction.

The second orifice-defining member 476 is secured to the joint tube member 466 which has been anchored at the diametrical center of the diaphragm 362. Specifically, a connecting bolt 502 that projects upward from the joint tube member 466 is threaded into the guide projection 498 of the second orifice-defining member 476, thereby securing the joint tube member 466 and the second orifice-defining member 476 so that they are positioned approximately coaxially.

Meanwhile, the joint tube member 466 is linked to an actuator 504. The actuator 504 is supported by the bracket 464 that has been secured to the second mounting fitting 448, and is situated to the opposite side (lower side) of the diaphragm 362 from the fluid chamber 368. In more detail, the actuator 504 includes an electric motor 416 housed inside a housing 506; and an actuation member 508 provided as an actuator shaft constituting a follower member that undergoes displacement in the axial direction when actuated by rotation of the electric motor 416.

The electric motor 416 is a step motor comparable to that in the fourteenth embodiment described previously; its rotation is controllable through control of energization by a power supply unit 420 such as a battery, by a control circuit 422 with reference to information from the speed sensor 424 and the engine control unit 426. A male screw member 428 is secured to the rotating shaft 418 of the electric motor 416. The male screw member 428 has approximately round post shape with a thread extending along the entire length of the outside peripheral face in the axial direction.

The actuation member 508 provided as the follower member is threaded onto the male screw member 428. The actuation member 508 in its upper part has approximately rod shape extending in the axial direction, and in its lower part has an inverted, approximately bottomed round tubular shape, with a female thread corresponding to the male thread of the male screw member 428 having been cut into the inside peripheral face of the lower part. Additionally, a rotation limiting mechanism adapted to prevent the actuation member 508 from relative rotation with respect to the housing 506 is disposed between the actuation member 508 and the housing 506. In the present embodiment, the outside peripheral face of the actuation member 508 is provided with opposing flats (not shown), and an insertion hole provided in the upper base wall of the housing 506 for insertion of the actuation member 508 has a shape corresponding to the opposing flats of the actuation member 508. The actuation member 508 is thereby detained by the housing 506, preventing the actuation member 508 from rotating about the center axis. By energizing the electric motor 416 and causing the rotating shaft 418 and the male screw member 428 to rotate, the actuation member 508 will undergo up-and-down motion in the axial direction due to the screw mechanism.

The upper section of the actuation member 508 is approximately rod-shaped and extends the axial direction with the upper end forming a spherical linking portion 510 of ball form. The spherical linking portion 510 inserts into the joint tube member 466 which has been anchored to the diaphragm 362, and is supported in abutment against the curving face formed on the inside peripheral face of the joint tube member 466 so that the joint tube member 466 and the actuation member 508 are linked. With this arrangement, rotational actuating force of the actuator 504 will be converted by the screw mechanism into reciprocating actuating force in the axial direction which is exerted on the actuation member 508, and this reciprocating actuating force is then transmitted to the second orifice-defining member 476 via the joint tube member 466 which has been linked to the actuation member 508.

Additionally, because the outside peripheral face of the spherical linking portion 510 is guided by the curving face of the joint tube member 466, the actuation member 508 and the joint tube member 466 are capable of relative tilt. Thus, a bendable area is formed along the path of transmission of the actuating force of the actuator 504 to the second orifice-defining member 476. From the preceding description it will be apparent that in the present embodiment the actuation member 508 and the joint tube member 466 constitute a ball joint.

In the engine mount 444 constructed in accordance with the present embodiment, the second orifice passage 392 can be switched between the communicating and blocked states through relative displacement of the second orifice-defining member 476 in the axial direction with respect to the first orifice-defining member 474, and the passage length of the second orifice passage 392 can be changed as well.

Specifically, when the automobile is moving, by positioning the second orifice-defining member 476 at the top in the axial direction, the communication slit 482 and the communicating window 438 no longer intersect, so the second orifice passage 392 will become blocked and fluid flow will be generated through the first orifice passage 390. On the other hand, with the automobile idling, the second orifice-defining member 476 will be positioned at a prescribed location somewhere between a medial location and the bottom in the axial direction, depending on engine speed, to control the passage length of the second orifice passage 392 according to the input vibration. Thus, the tuning frequency of the second orifice passage 392 may be adjusted according to the frequency of the input vibration. Accordingly, as in the fourteenth embodiment described previously, by controlling the passage length of the second orifice passage 392 according to the frequency of input vibration, effective vibration damping can be produced against any of several types of vibration of different frequencies.

Also, the second orifice-defining member 476 and the actuation member 508 of the actuator 504 are linked via a ball joint composed of the joint tube member 466 and the spherical linking portion 510. Thus, misalignment of the second orifice-defining member 476 and the actuation member 508 in the axis-perpendicular direction due to errors during component manufacture or during assembly will be absorbed by the ball joint, preventing defective assembly of the actuator 504.

Moreover, because the actuation member 508 of the actuator 504 has been vulcanization bonded along the entire circumference of the inside peripheral face of the diaphragm 362 to the joint tube member 466 which is linked to the second orifice-defining member 476, actuated displacement of the second orifice-defining member 476 can be accomplished while maintaining the equilibrium chamber 374 in a highly hermetic condition.

Additionally, the inner tubular portion 494 of the second orifice-defining member 476 juts only towards the downward direction from the dividing wall 492, thus affording smaller size in the axial direction as compared with the fourteenth embodiment wherein it juts out to both the upper and lower sides. Moreover, the dividing wall 492 has recessed contours in its diametrical center section as compared with its outside peripheral section, and by positioning the support tube portion 486 which projects from the first orifice-defusing member 474 inside the recessed section of the dividing wall 492, it is possible to avoid increased axial dimension of the partition member 472 due to provision of the support tube portion 486.

Also, an axial direction guide means is provided by inserting the guide projection 498 which has been integrally formed on the second orifice-defining member 476 into the guide sleeve 488 which has been provided to the first orifice-defining member 474. Thus, the second orifice-defining member 476 can be made to undergo relative displacement in the axial direction smoothly and with minimal frictional resistance with respect to the first orifice-defining member 474, so that this relative displacement can be brought about with minimal actuating force while also minimizing heat emission by the electric motor 416. Particularly as compared to the case where axial direction guide means is constituted solely by the inside peripheral face of the first orifice-defining member 474 and the outside peripheral face of the second orifice-defining member 476, sticking by the communication slit 482 or communicating window 438 can be avoided so as to provide more effective guiding functionality.

Further, the zone to the inside peripheral side of the first orifice-defining member 474 is bifurcated into upper and lower parts by the second orifice-defining member 476 so as to prevent fluid flow between the zones above and below the second orifice-defining member 476 through any path other than the first and second orifice passages 390, 392. Thus, fluid flow can be produced with high accuracy as a function of passage shape of the first and second orifice passages 390, 392 on the basis of relative pressure differentials between the pressure-receiving chamber 372 and the equilibrium chamber 374, so that the intended vibration damping may be produced efficiently.

Figure 33:
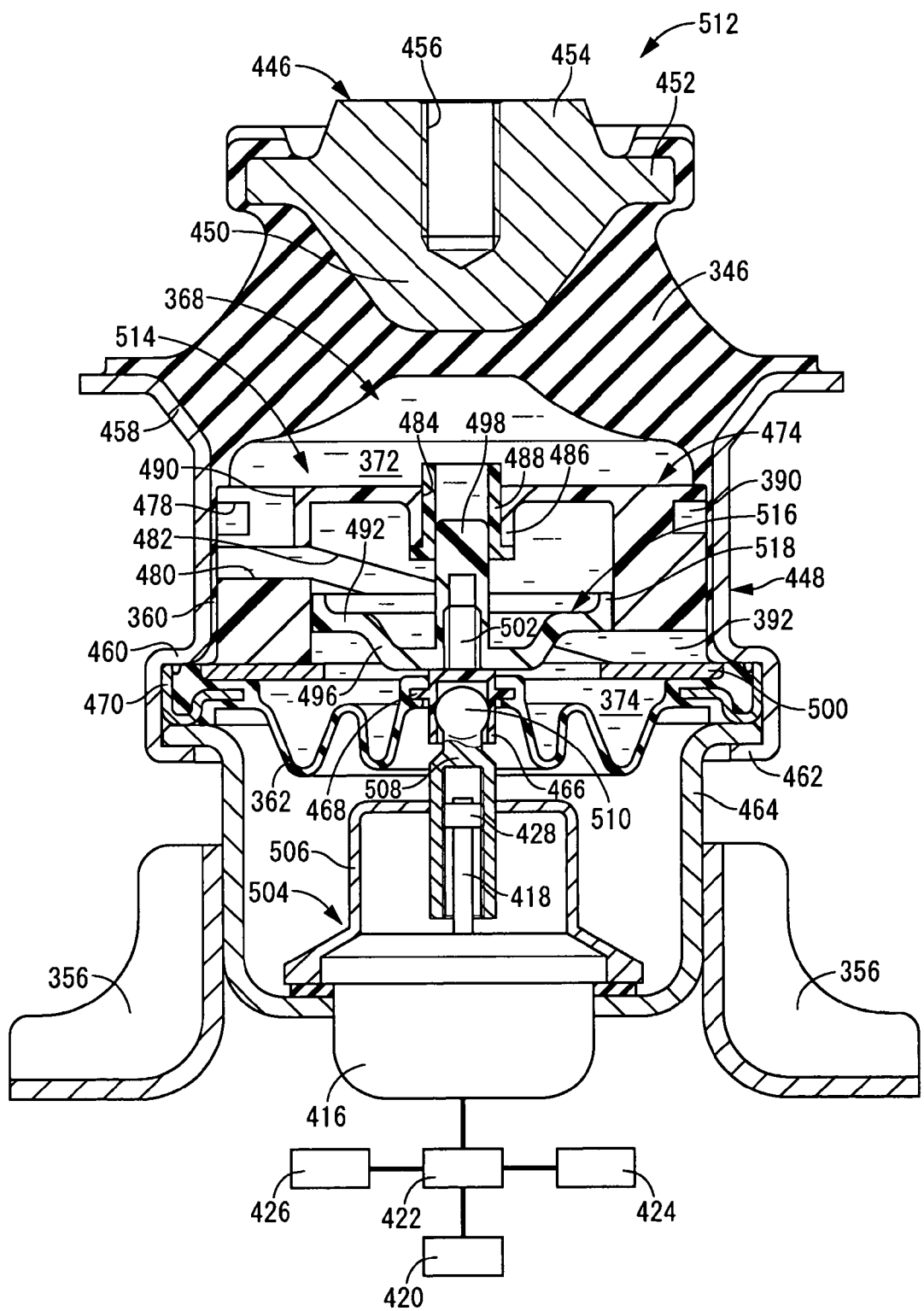
FIG. 33 is a vertical cross sectional view of an automobile engine mount according to a sixteenth embodiment of the present invention

Next, FIG. 33 depicts an automotive engine mount 512 according to a sixteenth embodiment of the present invention. Specifically, the engine mount 512 is furnished with a partition member 514. The partition member 514 has a first orifice-defining member 474, and a second orifice-defining member 516 provided as an inner orifice member.

Turning to a more detailed description, the second orifice-defining member 516 is constructed similarly to the second orifice-defining member 476 shown in the fifteenth embodiment but with the inner tubular portion 494 omitted. Specifically, the second orifice-defining member 516 as a whole is of plate shape having construction in which a center section of approximately circular disk shape extends in the axis-perpendicular direction, and an outside peripheral section of approximately annular disk shape likewise extends in the axis-perpendicular direction, these sections being linked by a tapering portion. In the present embodiment, a guide portion 518 of annular form projecting upward is integrally formed at the outside peripheral edge of the dividing wall 492 of the second orifice-defining member 516. The projecting height of this guide portion 518 may be made greater than the height of the opening of the communication slit 482 so that its outside peripheral face is able to block the communication slit 482, or made less than the height of the opening of the communication slit 482 so as to not block the communication slit 482.

The second orifice-defining member 516 fits to the inside peripheral side of the first orifice-defining member 474 and constitutes the partition member 514. The outside peripheral face of the second orifice-defining member 516 is superposed against the inside peripheral face of the first orifice-defining member 474, and part of the circumference of the communication slit 482 is covered by the outside peripheral face of the second orifice-defining member 516. With this arrangement, the opening at the pressure-receiving chamber 372 side of the second orifice passage 392 will be formed to the upper side of the second orifice-defining member 516, while the opening at the equilibrium chamber 374 side of the second orifice passage 392 will be formed to the lower side.

In the engine mount 512 having the partition member 514 constructed in this way, the second orifice passage 392 is switchable between the communicating and blocked states, and t also the passage length of the second orifice passage 392 is variable. Effective vibration damping can be produced against vibration of a wider frequency range by controlling the tuning frequency of the second orifice passage 392 according to the frequency of input vibration.

Specifically, in the present embodiment, by positioning the second orifice-defining member 516 at a location somewhere between the top and a medial location in the actuation direction, the communication slit 482 will communicate with the equilibrium chamber 374 to the axial lower side of the outside peripheral section of the dividing wall 492, so that the second orifice passage 392 assumes the communicating state. On the other hand, by positioning the second orifice-defining member 516 at the bottom in the actuation direction, the communication slit 482 is placed in non-communication with the equilibrium chamber 374, so that the second orifice passage 392 assumes the blocked state.

To describe in more detail, with the second orifice-defining member 516 positioned at a prescribed location somewhere between the top and a medial location in the axial direction, the section of the communication slit 482 situated to the axial lower side of the dividing wall 492 will form the opening at the equilibrium chamber 374 side of the second orifice passage 392 so that the second orifice passage 392 assumes the communicating state. Also, the orifice-defining groove 480 of the first orifice-defining member 474 has helical form extending the circumferential direction while sloping in the axial direction, and the bottom face of the outside peripheral edge part of the second orifice-defining member 516 is an approximately horizontal face extending the circumferential direction without sloping in the axial direction. Through this arrangement, when the second orifice-defining member 516 experiences relative displacement in the axial direction with respect to the first orifice-defining member 474, the opening at the equilibrium chamber 374 side of the second orifice passage 392 will move in the circumferential direction. As a result, fluid path length between the opening at the pressure-receiving chamber 372 side and the opening at the equilibrium chamber 374 side of the second orifice passage 392 is variable, and the tuning frequency of the second orifice passage 392 is controllable according to the frequency of the input vibration. Control of the tuning frequency with the second orifice passage 392 in the communicating state analogous to the preceding embodiments and will not be described here.

On the other hand, in the present embodiment, the axial height of the outside peripheral edge part of the second orifice-defining member 516 which incorporates the guide portion 518 is greater than the axial height of the opening at the inside peripheral side of the communication slit 482. Thus, by positioning the second orifice-defining member 516 at the bottom, the lower end opening of the communication slit 482 will be covered by the second orifice-defining member 516. Additionally, the inside peripheral edge of the cover fitting 500 will project diametrically inward beyond the inside peripheral face of the first orifice-defining member 474, and the second orifice-defining member 516 will undergo displacement to the bottom so that the lower face of the outside peripheral edge part of the second orifice-defining member 516 and the upper face of the inside peripheral edge part of the cover fitting 500 come into abutment. The second orifice-defining member 516 will thereby be positioned at the bottom, so that the opening of the communication slit 482 leading to the equilibrium chamber 374 and the center hole of the cover fitting 500 are both closed off, and the opening on the equilibrium chamber 374 side of the second orifice passage 392 is blocked.

Also, in the present embodiment, the second orifice-defining member 516 as a whole is approximately plate shaped, allowing the axial dimension to be made smaller at the outside peripheral edge part of the second orifice-defining member 516. Thus, the size of the partition member 514 in the axial direction can be smaller, and the engine mount 512 as a whole can be smaller in size and lighter in weight.

Figure 34:
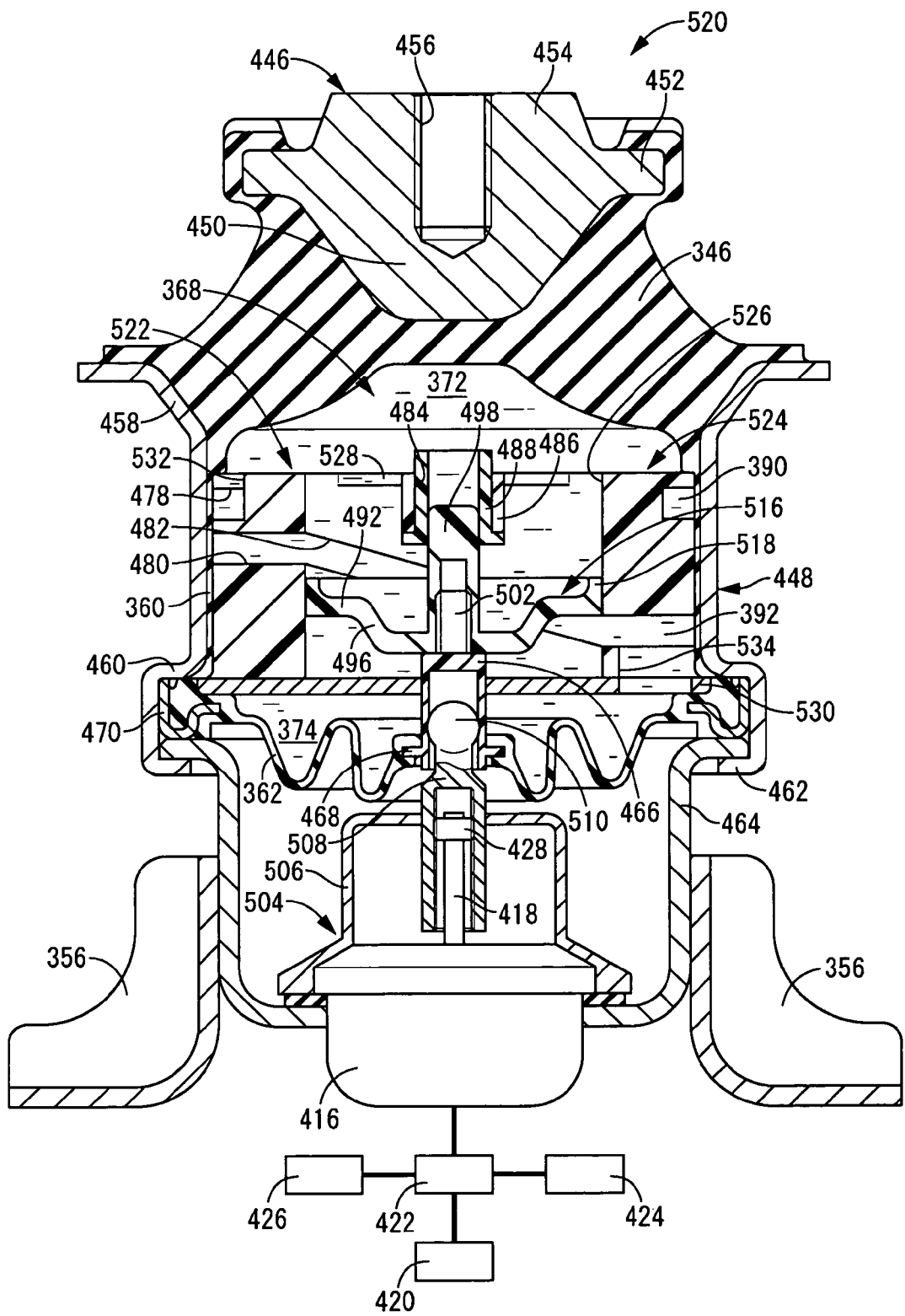
FIG. 34 is a vertical cross sectional view of an automobile engine mount according to a seventeenth embodiment of the present invention

FIG. 34 depicts an automotive engine mount 520 according to a seventeenth embodiment of the fluid-filled vibration damping device according: to the present invention. Specifically, the engine mount 520 has a partition member 522; and the partition member 522 has a first orifice-defining member 524 provided as an outer orifice member, and a second orifice-defining member 516.

The first orifice-defining member 524 as a whole has an inverted, approximately bottomed round tubular shape in whose upper base wall are formed a plurality of communicating holes 526 that pass through the axial direction. The communicating holes 526 are approximately fan-shaped viewed in the axial direction, and spokes 528 that extend in the diametrical direction are formed between neighboring communicating holes 526 in the circumferential direction. The spokes 528 are integrally formed so as to extend radially from a support tube portion 486 of small-diameter tube form provided in the diametrical center section of the first orifice-defining member 524, with the outside peripheral section (tubular portion) and the inside peripheral section (the support tube portion 486) of the first orifice-defining member 524 being linked by the spokes 528. Further, a tubular guide sleeve 488 is secured inserted into the support tube portion 486.

In the first orifice-defining member 524 there is formed an orifice-defining groove 480 that opens onto the outside peripheral face and extends in the circumferential direction. In the first orifice-defining member 524, there is also formed independently from the orifice-defining groove 480 a circumferential groove 478 that opens onto the outside peripheral face and extends in the circumferential direction. In the wall at the inside peripheral side of this orifice-defining groove 480 there is formed a communication slit 482 that opens onto the inside peripheral face of the first orifice-defining member 524. The orifice-defining groove 480 and the communication slit 482 are helical in form, extending in the circumferential direction and sloping in the axial direction.

The second orifice-defining member 516 is then fitted into the first orifice-defining member 524 to the inside peripheral side of the latter, and the guide projection 498 of the second orifice-defining member 516 is inserted into the guide sleeve 488. A cover fitting 530 is then superposed against and secured to the lower face of the first orifice-defining member 524 in order to prevent the second orifice-defining member 516 from becoming downwardly dislodged. The cover fitting 530 has approximately circular flat disk shape, and the joint tube member 466 is inserted into a small-diameter circular hole formed in the diametrical center section. The joint tube member 466 is mounted in the cover fitting 530 so as to be slidable in the axial direction. The gap between the outside peripheral face of the joint tube member 466 and the inside peripheral face of the cover fitting 530 is extremely small, so that effects of fluid flow through the gap on vibration damping characteristics can be kept to a minimum.

The partition member 522 constructed in the above manner is arranged separating the pressure-receiving chamber 372 from the equilibrium chamber 374. One end of the circumferential groove 478 communicates with the pressure-receiving chamber 372 through a communicating hole 532, while the other end communicates with the equilibrium chamber 374 through a communicating hole (not shown). Thus, the first orifice passage 390 interconnecting the pressure-receiving chamber 372 and the equilibrium chamber 374 is formed utilizing this circumferential groove 478. Meanwhile, the orifice-defining groove 480 communicates at one end with the pressure-receiving chamber 372 through the communication slit 482, while the other end communicates with the equilibrium chamber 374 through a communicating hole 534. Thus, the second orifice passage 392 interconnecting the pressure-receiving chamber 372 and the equilibrium chamber 374 is formed utilizing the orifice-defining groove 480. In the present embodiment, the first orifice passage 390 and the second orifice passage 392 are defined by mutually independent paths.

Through relative displacement of the second orifice-defining member 516 in the axial direction with respect to the first orifice-defining member 524, the section in the communication slit 482 that is covered by the outside peripheral face of the second orifice-defining member 516 will change in the circumferential direction. Thus, the second orifice passage 392 will be switched between the communicating and blocked states, and in the communicating state the passage length of the second orifice passage 392 will be resettable.

Specifically, in the present embodiment, with the second orifice-defining member 516 positioned at the top, the outside peripheral section of the dividing wall 492 of the second orifice-defining member 516 will be positioned above the upper end part of the communication slit 482, and the communication slit 482 will be in a state of non-communication with the pressure-receiving chamber 372. Thus, the second orifice passage 392 will by blocked.

On the other hand, with the second orifice-defining member 516 positioned at a location between a medial location and the bottom in the axial direction, the communication slit 482 will communicate with pressure-receiving chamber 372 through the communicating hole 526; and the pressure-receiving chamber 372 and the equilibrium chamber 374 will communicate through the second orifice passage 392. By controlling the axial position of the second orifice-defining member 516, the path length of the second orifice passage 392 can be controlled, and the tuning frequency of the second orifice passage 392 can be reset according to the frequency of input vibration.

It is accordingly possible to realize a fluid-filled vibration damping device constructed according to the present invention by using the second orifice-defining member 516 to control the location of the opening at the pressure-receiving chamber 372 side of the second orifice passage 392 and to switch the passage between the communicating and blocked states in this way.

Figure 35:
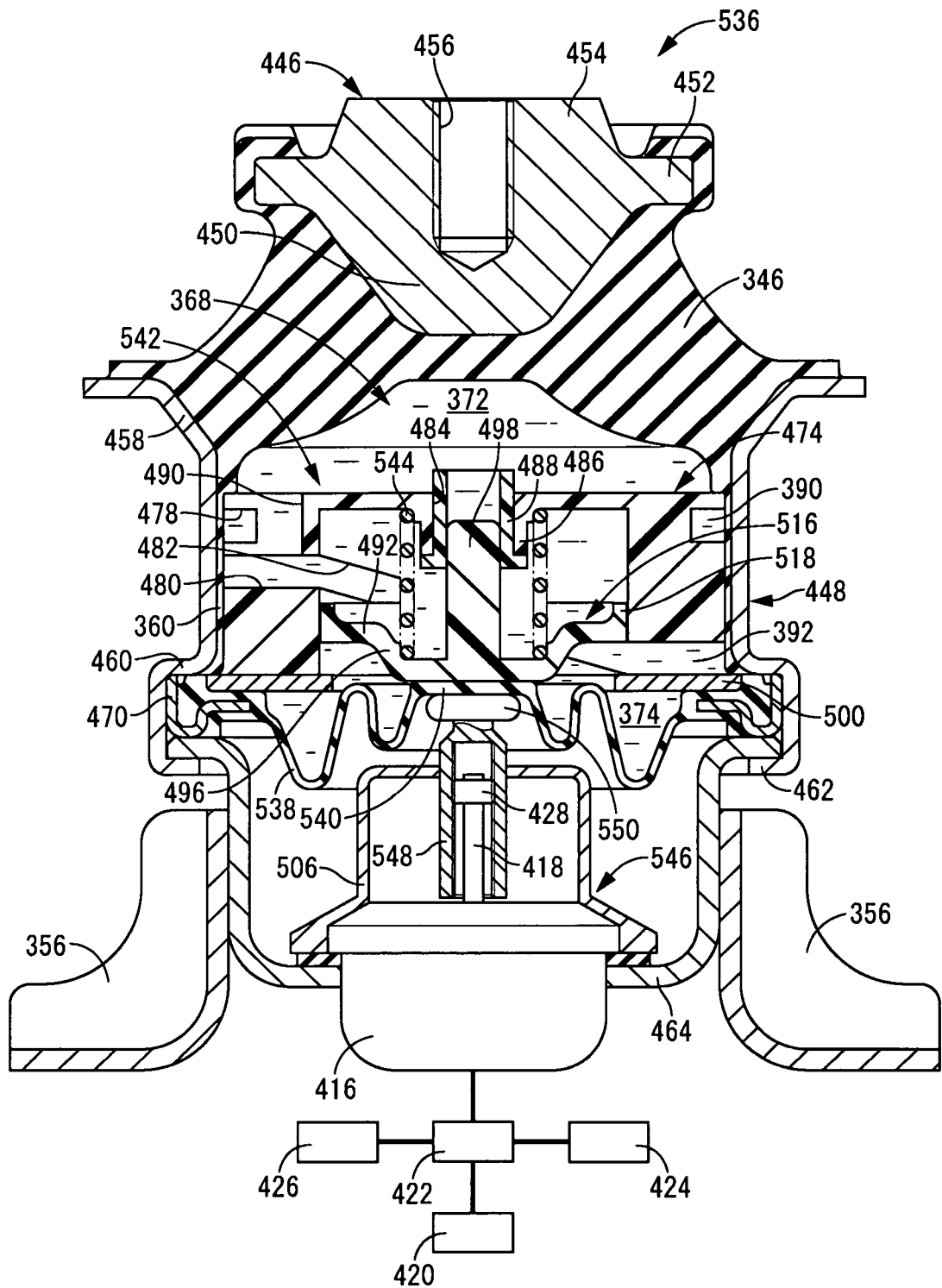
FIG. 35 is a vertical cross sectional view of an automobile engine mount according to an eighteenth embodiment of the present invention

FIG. 35 depicts an automotive engine mount 536 according to an eighteenth embodiment of the present invention. The engine mount 536 includes a diaphragm 538 provided as a flexible film. The diaphragm 538 is a thin rubber film of approximately circular disk shape having ample slack in the axial direction with a presser portion 540 of relatively thick circular disk shape integrally formed in the diametrical center section. A fastener fitting 470 that has been vulcanization bonded to the outside peripheral edge of the diaphragm 538 is secured through swaging to the lower end of the second mounting fitting 448 which makes up part of the integrally vulcanization molded component of the main rubber elastic body 346. There is formed thereby to the inside peripheral side of the second mounting fitting 448 a fluid chamber 368 situated between the axially opposed faces of the main rubber elastic body 346 and the diaphragm 538.

A partition member 542 is arranged in the fluid chamber 368. The partition member 542 as a whole has thick, approximately circular disk shape, with the pressure-receiving chamber 372 and the equilibrium chamber 374 formed to either side thereof. The partition member 542 includes a first orifice-defining member 474 and a second orifice-defining member 516.

A coil spring 544 provided as urging means is interposed between the upper base wall of the first orifice-defining member 474 and the dividing wall 492 of the second orifice-defining member 516. The coil spring 544, having been arranged beforehand in a condition of sufficiently high compressive deformation in the axial direction, is positioned axially between the first and second orifice-defining members 474, 516. Thus, the urging force of the coil spring 544 will be constantly exerted downwardly on the second orifice-defining member 516 so that the lower face of the second orifice-defining member 516 presses against the upper face of the presser portion 540 of the diaphragm 538.

An actuation member 548 provided as an actuator shaft making up part of an actuator 546 is positioned in abutment from below against the diaphragm 538. The lower part of actuation member 548 is of inverted, bottomed tube form, on the inside peripheral face of which is cut a female thread that corresponds to the male thread of the male screw member 428; while the upper part is rod-shaped with an output portion 550 of circular disk shape disposed at the upper end. The output portion 550 of the actuation member 548 is pressed in the axial direction against the lower face of the presser portion 540 of the diaphragm 538 so that the output portion 550 and the second orifice-defining member 516 are positioned in indirect abutment in an unbonded condition via the diaphragm 538. Thus, the second orifice-defining member 516 is constantly urged downward by the coil spring 544. Consequently, the actuation member 548 and the second orifice-defining member 516 are substantially linked in the axial direction, while permitting relative displacement and relative position shift in the axis-perpendicular direction, so that actuating force of the actuator 546 in the axial direction is transmitted to the second orifice-defining member 516 via the actuation member 548 and the diaphragm 538. The output portion 550 may be secured to the presser portion 540 through adhesive, mating, or other means.

Thus, in the engine mount 536 according to the present embodiment, it is possible to switch the second orifice passage 392 between the communicating and blocked states; and with the second orifice passage 392 in the communicating state, to adjust the tuning of the second orifice passage 392 according to the frequency of input vibration by controlling the path length of the second orifice passage 392.

With the construction according to the present embodiment, the actuation member 548 of the actuator 546 and the second orifice-defining member 516 are connected in the axial direction in an unbonded condition through the urging force of the coil spring 544. Thus, even if the center axis of the actuation member 548 of the actuator 546 and center axis of the second orifice-defining member 516 are somewhat misaligned in the axis-perpendicular direction due to component dimensional error, assembly error or the like, such error can be absorbed to achieve a substantially linked state in the axial direction.

Furthermore, in the present embodiment, the actuation member 548 of the actuator 546 is positioned in indirect abutment via the diaphragm 538 against the second orifice-defining member 516 so that the actuation member 548 and the second orifice-defining member 516 are capable of transmitting actuating force without having to perforate the diaphragm 538. Thus, fluidtightness of the fluid chamber 368 (equilibrium chamber 374) can be more reliably ensured to achieve an engine mount having excellent reliability and durability.

Because the second orifice-defining member 516 and the actuation member 548 are positioned in abutment without being fastened together, if a condition of marked negative pressure relative to the equilibrium chamber 374 should arise in the pressure-receiving chamber 372, the second orifice-defining member 516 will experience upward displacement in opposition to the urging force of the coil spring 544. Specifically, with the second orifice passage 392 blocked while the automobile is moving, if excessive negative pressure is exerted on the pressure-receiving chamber 372, the differential between liquid pressure of the pressure-receiving chamber 372 acting on the upper face of the second orifice-defining member 516 and the liquid pressure of the equilibrium chamber 374 acting on the lower face will give rise to upward displacement of the second orifice-defining member 516 in opposition to the urging force of the coil spring 544. Thus, the pressure-receiving chamber 372 and the equilibrium chamber 374 will be placed in communication with one another through the second orifice passage 392, which has lower flow resistance than the first orifice passage 390, so that the negative pressure in the pressure-receiving chamber 372 can be rapidly dispelled. Cavitation noise caused by negative pressure in the pressure-receiving chamber 372 can thus be prevented.

Figure 36:
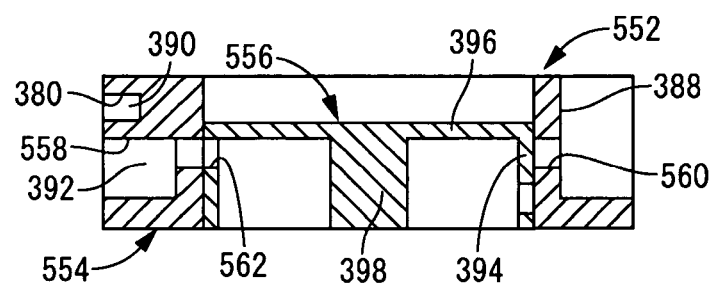
FIG. 36 is a vertical cross sectional view of a partition member of an automobile engine mount according to a nineteenth embodiment of the present invention.

FIG. 36 depicts a partition member 552 that makes up an engine mount according to a nineteenth embodiment of the fluid-filled vibration damping device according to the present invention. In FIGS. 36 to 40, parts omitted in the drawings are substantially identical to those in the fourteenth embodiment.

Figure 37:
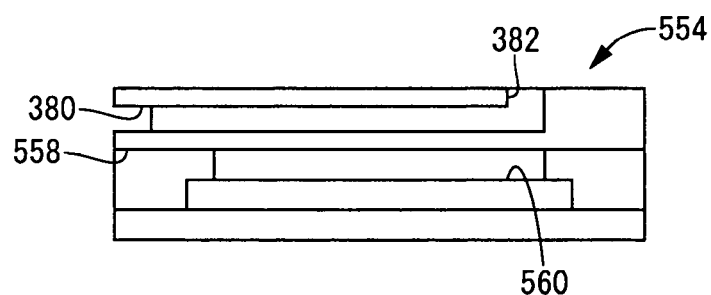
FIG. 37 is a front view of a first orifice-defining member of the partition member.
Figure 38:
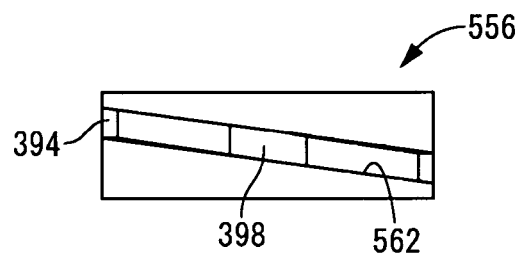
FIG. 38 is a front view of a second orifice-defining member of the partition member.

Specifically, the partition member 552 is composed of a first orifice-defining member 554 provided as an outer orifice member and a second orifice-defining member 556 provided as an inner orifice member. The first orifice-defining member 554 has thick, approximately round tubular shape; as shown in FIG. 37 as well, an orifice-defining groove 558 opens onto its outside peripheral face and extends in the circumferential direction without slope in the axial direction, for a distance approximately halfway around the circumference in the axially medial section. The opening at the outside peripheral side of this orifice-defining groove 558 is covered by the second mounting fitting 344, thereby forming a second orifice passage 392 that connects the pressure-receiving chamber 372 with the equilibrium chamber 374. Meanwhile, as shown in FIG. 38, the construction of the second orifice-defining member 556 integrally incorporates an inner tubular portion 394, a dividing wall 396, and a linking portion 398.

A communication slit 560 is formed in the first orifice-defining member 554, while a communicating window 562 provided as an orifice connection window is formed in the second orifice-defining member 556. In the present embodiment, the communication slit 560 extends in the circumferential direction without sloping in the axial direction, while the communicating window 562 has a helical pattern sloping at a prescribed angle in the axial direction while extending in the circumferential direction, whereby the communication slit 560 and the communicating window 562 are formed so as to extend in the circumferential direction at a relative slope in the axial direction. The communication slit 560 and the communicating window 562 intersect in part of the circumference, and the opening at the equilibrium chamber 374 side of the second orifice passage 392 is formed at the intersection point of the communication slit 560 and the communicating window 562. The orifice-defining groove 558 and the communication slit 560 constitute an orifice-defining window.

Because the communication slit 560 and the communicating window 562 are relatively sloped, the location of the intersection point of the communication slit 560 and the communicating window 562 will change in the lengthwise direction of the orifice-defining groove 558 in association with relative displacement of the first orifice-defining member 554 and the second orifice-defining member 556 in the axial direction, making it possible to modify the tuning of the second orifice passage 392 by changing the length of the second orifice passage 392.

Thus, in an engine mount that incorporates the partition member 552 furnished with the communication slit 560 of annular form in the circumferential direction and the helical communicating window 562, through reciprocating displacement of the second orifice-defining member 556 in the axial direction the tuning frequency of the second orifice passage 392 can be adjusted to achieve effective vibration damping of vibration of a wider range of frequencies.

Figure 39:
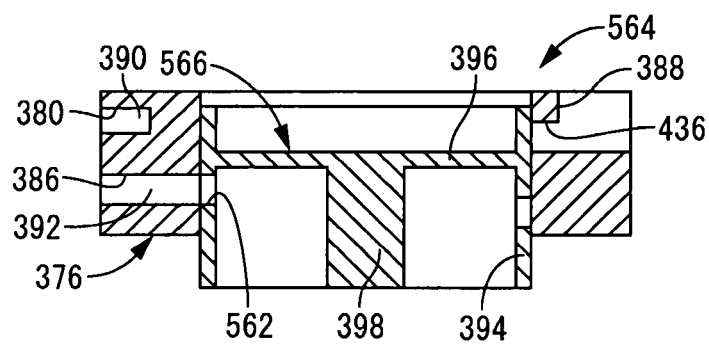
FIG. 39 is a vertical cross sectional view of a partition member of an automobile engine mount according to a twentieth embodiment of the present invention.

FIG. 39 depicts a partition member 564 that makes up an engine mount according to a twentieth embodiment of the fluid-filled vibration damping device according to the present invention. Specifically, the partition member 564 is composed of a first orifice-defining member 376, and a second orifice-defining member 566 provided as an inner orifice member. The second orifice-defining member 566 has a construction integrally incorporating an inner tubular portion 394, a dividing wall 396, and a linking portion 398. In the second orifice-defining member 566 there is formed a communicating window 562 that passes in the diametrical direction through the inner tubular portion 394 and extends for a distance about halfway around circumference, corresponding to the communication slit 436.

As shown in FIG. 39, both the communication slit 436 and the communicating window 562 have helical patterns that slope in the axial direction while extending in the circumferential direction, with the slope direction of the communication slit 436 and the slope direction of the communicating window 562 being mutually opposite. Thus, the communication slit 436 and the communicating window 562 extend in the circumferential direction while sloping relatively in the axial direction, and intersect on part of the circumference. The second orifice passage 392 connects to the equilibrium chamber 374 at the intersection point of the communication slit 436 and the communicating window 562.

Because the communication slit 436 and the communicating window 562 are relatively sloped, the location of the intersection point of the communication slit 436 and the communicating window 562 will change in the lengthwise direction of the orifice-defining groove 386 in association with relative displacement of the first orifice-defining member 376 and the second orifice-defining member 566 in the axial direction, making it possible to modify the tuning of the second orifice passage 392 by changing the length of the second orifice passage 392.

Thus, in an engine mount that incorporates the partition member 564 furnished with the helical communication slit 436 and the helical communicating window 562, it is possible for the tuning frequency of the second orifice passage 392 to be adjusted through reciprocating actuated displacement of the second orifice-defining member 566 in the axial direction, so effective vibration damping of vibration of a wider range of frequencies can be achieved.

Furthermore, because the communication slit 436 and the communicating window 562 have helical patterns of opposite slope, it is possible to establish a large angle of relative slope in the axial direction for the communication slit 436 and the communicating window 562. Thus, the extent of change in the location of the intersection point of the communication slit 436 and the communicating window 562 relative to the level of relative displacement of the first and second orifice-defining members 376, 566 in the axial direction will be smaller, so tuning of the second orifice passage 392 can be modified with a high degree of accuracy.

Figure 40:
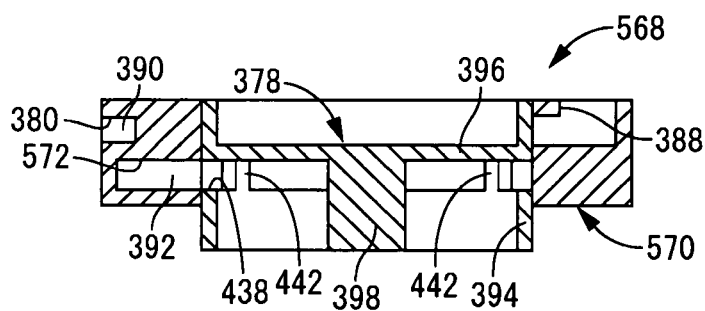
FIG. 40 is a vertical cross sectional view of a partition member of an automobile engine mount according to a twenty-first embodiment of the present invention.

FIG. 40 depicts a partition member 568 that makes up an engine mount according to a twenty-first embodiment of the fluid-filled vibration damping device according to the present invention. The partition member 568 is composed of a first orifice-defining member 570 provided as an outer orifice member, and a second orifice-defining member 378. In the first orifice-defining member 570 there is formed an orifice-defining groove 572 provided as an orifice-defining window that opens onto the inside peripheral face and extends in the circumferential direction; the inside peripheral opening of the orifice-defining groove 572 is covered by the second orifice-defining member 378 thereby forming a second orifice passage 392 that connects the pressure-receiving chamber 372 with the equilibrium chamber 374. Additionally, in the second orifice-defining member 378 there is formed a communicating window 438 that extends in the circumferential direction at a relative slope in the axial direction to the orifice-defining groove 572; and the second orifice passage 392 communicates with the equilibrium chamber 374 through the intersection point of the inside peripheral opening of the orifice-defining groove 572 with the communicating window 438. Thus, passage length of the second orifice passage 392 may be modified through axial displacement of the second orifice-defining member 378. Thus, it should be appreciated that no particular limitations are imposed on the specific construction of the orifice passages.

Figure 41:
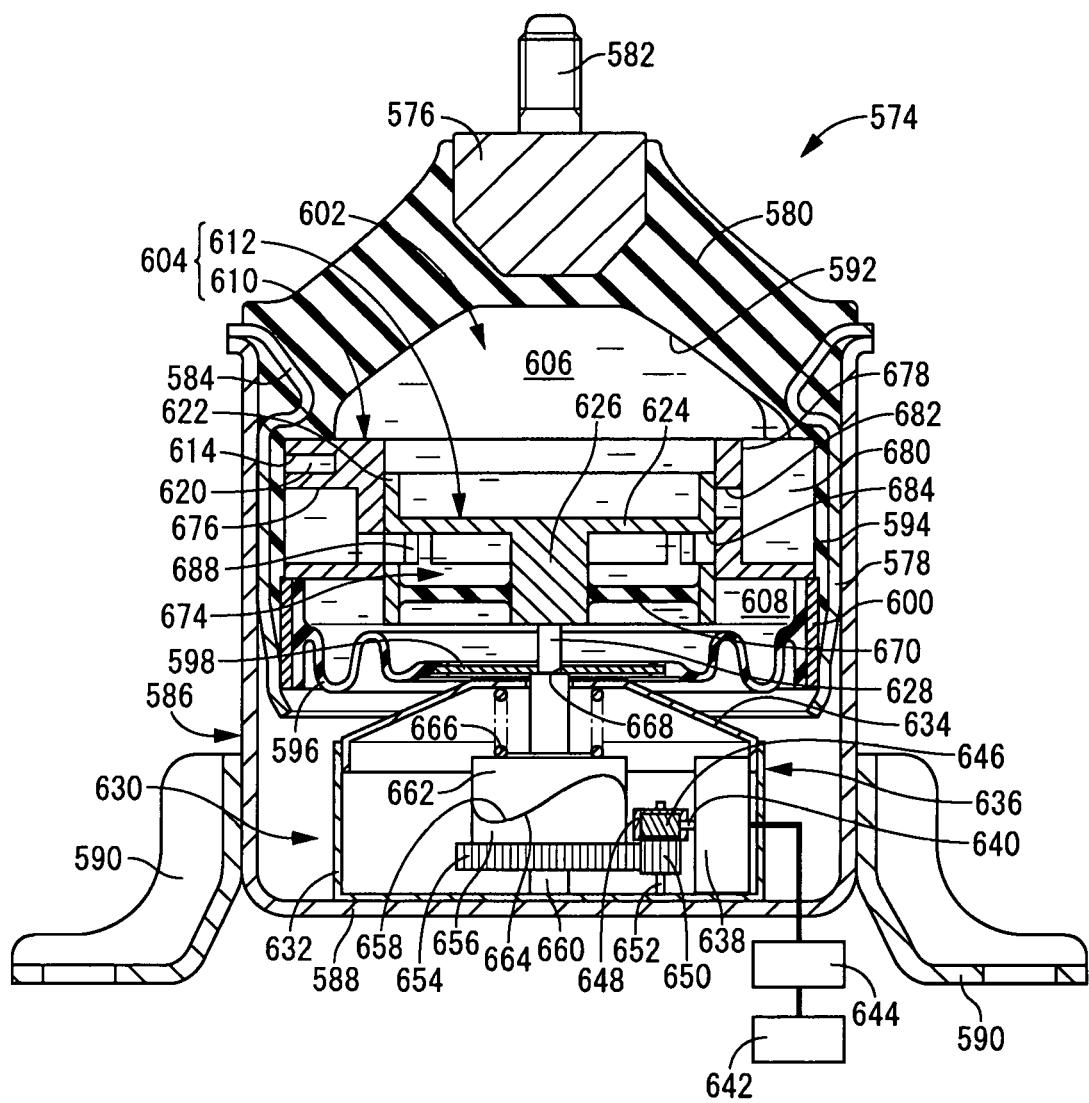
FIG. 41 is a vertical cross sectional view of an automobile engine mount according to a twenty-second embodiment of the present invention where the second orifice passage is tuned to a low frequency.
Figure 42:
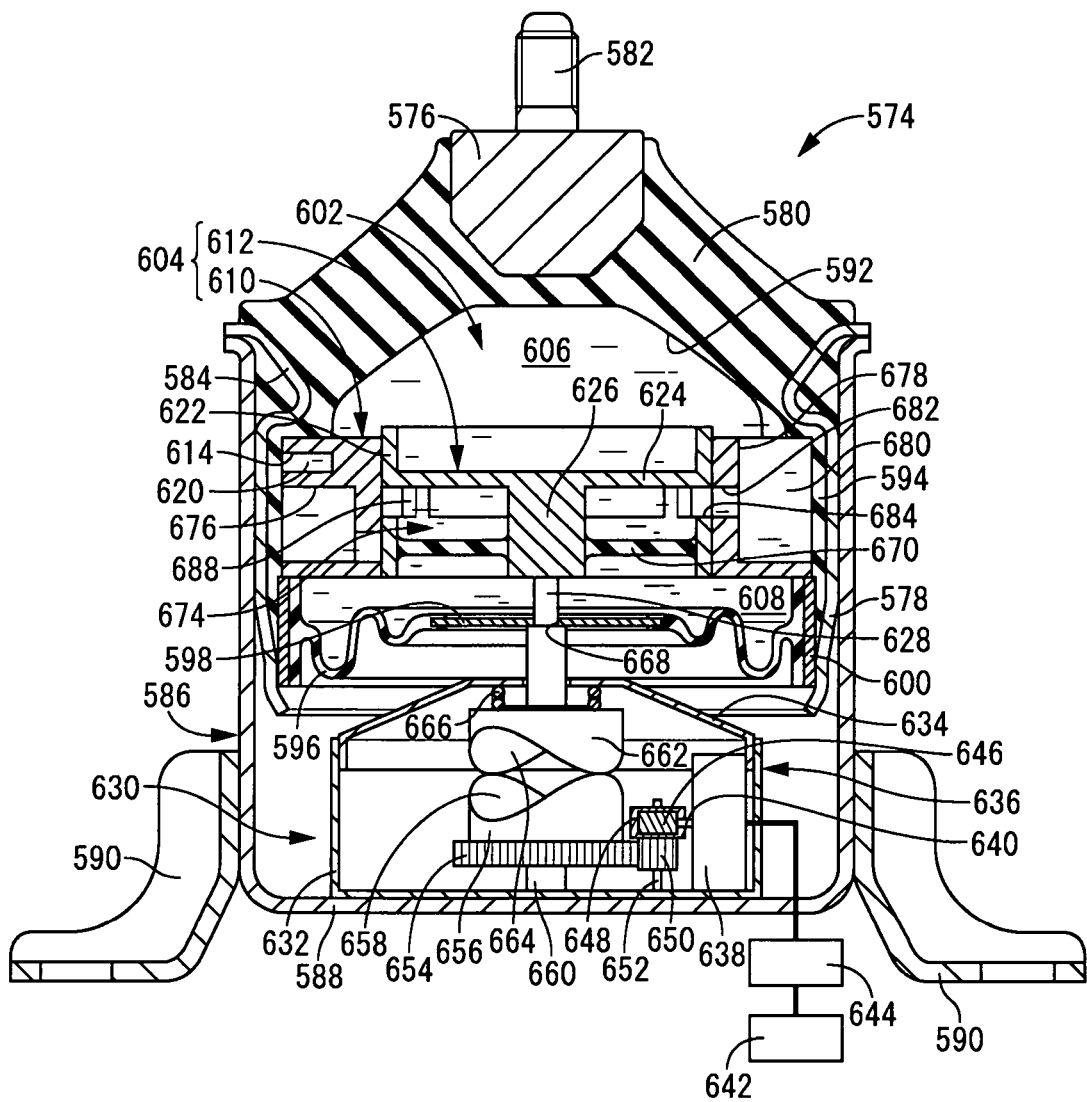
FIG. 42 is a vertical cross sectional view of the engine mount where the second orifice passage is tuned to a high frequency.

FIGS. 41 and 42 depict an automotive engine mount 574 according to a twenty-second embodiment of the fluid-filled vibration damping device according to the present invention. The engine mount 574 has a construction in which a first mounting fitting 576 provided as a first mounting member and a second mounting fitting 578 provided as a second mounting member are linked by a main rubber elastic body 580. The first mounting fitting 576 is mounted onto the power unit (not shown) side, while the second mounting fitting 578 is mounted onto the vehicle body (not shown) side to provide the power unit with vibration-damped support on the vehicle body. In the following description, unless indicated otherwise, the vertical direction refers to the vertical direction in FIG. 41, which is also the axial direction of the engine mount 574.

To describe in greater detail, the first mounting fitting 576 has approximately circular block shape with a mounting bolt 582 that projects upward anchored to the center of its upper end face. The first mounting fitting 576 is designed to be secured to the power unit by this mounting bolt 582.

Meanwhile, the second mounting fitting 578 on the whole has large-diameter, approximately round tubular shape, the upper end section of which takes the form of a gradually flaring tapered tube portion 584. A bracket 586 is secured fitting about the exterior of the second mounting fitting 578. The bracket 586 has a construction in which several mounting leg portions 590 are welded to the outside peripheral face of an approximately cup-shaped mounting portion 588. The mounting portion 588 is then pressure-fit slipped about the exterior of the second mounting fitting 578 in order to attach the bracket 586 to the second mounting fitting 578. The bracket 586, and hence the second mounting fitting 578, is secured to the vehicle body by fastening bolts (not shown) which are passed through mounting holes that have been formed in the mounting leg portions 590 of the bracket 586.

The first mounting fitting 576 and the second mounting fitting 578 are linked by the main rubber elastic body 580. The main rubber elastic body 580 has approximately truncated cone shape to which the first mounting fitting 576 has been vulcanization bonded while embedded to prescribed depth into the small-diameter end; while the tapered tube portion 584 of the second mounting fitting 578 has been vulcanization bonded to the outside peripheral face of the large-diameter end of the main rubber elastic body 580. In the large-diameter end face of the main rubber elastic body 580 there is formed a large-diameter recess 592 of inverted bowl shape. A thin seal rubber layer 594 sheathing the inside peripheral face of the second mounting fitting 578 is integrally formed with the main rubber elastic body 580 so as to extend downward from its outside peripheral edge.

The opening at the lower end of the second mounting fitting 578 is covered by a diaphragm 596 provided as a flexible film. The diaphragm 596 is a rubber film of thin, annular disk shape having slack in the axial direction, with an anchor plate 598 of approximately circular disk shape arranged in its diametrical center section, and the inside peripheral edge of the diaphragm 596 vulcanization bonded about the entire circumference to the outside peripheral edge of the anchor plate 598. Additionally, a fastener fitting 600 of annular form is vulcanization bonded to the outside peripheral edge of the diaphragm 596; and the fastener fitting 600 is then secured fitting internally into the lower end of the second mounting fitting 578 so that the lower opening of the second mounting fitting 578 is provided with fluidtight closure by the diaphragm 596. By so doing, inside the second mounting fitting 578 there is defined in the axial direction between the main rubber elastic body 580 and the diaphragm 596 a fluid chamber 602 that is sealed off from the outside and filled with a non-compressible fluid. A low-viscosity fluid such as water or an alkylene glycol is favorable for use as the sealed fluid.

A partition member 604 of thick, approximately circular disk shape is positioned inside the fluid chamber 602 so as to extend in the axis-perpendicular direction, with the partition member 604 being supported by the second mounting fitting 578. The fluid chamber 602 is bifurcated to either side of the partition member 604 in the axial direction, defining to the upper side of the partition member 604 a pressure-receiving chamber 606 whose wall is partly constituted by the main rubber elastic body 580 and that is exposed to pressure fluctuations during vibration input, while defining to the lower side of the partition member 604 an equilibrium chamber 608 whose wall is partly constituted by the diaphragm 596, and which has variable volume.

Figure 43:
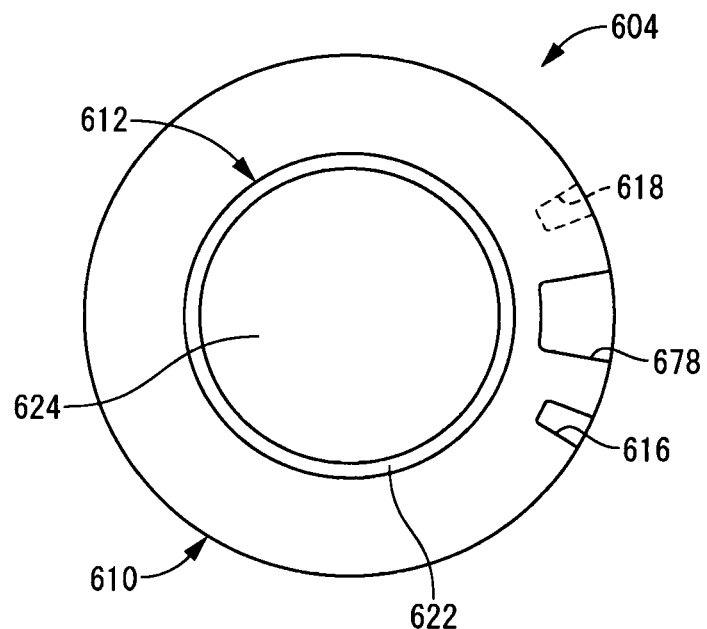
FIG. 43 is a plan view of a partition member of the engine mount.

As shown in FIGS. 41 to 43, the partition member 604 includes a first orifice-defining member 610 provided as an outer orifice member, and a second orifice-defining member 612 provided as an inner orifice member.

Figure 44:
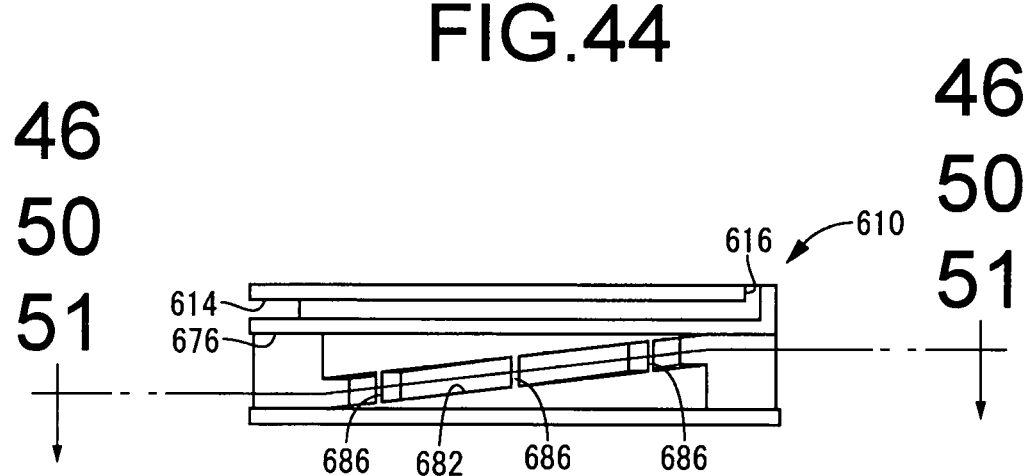
FIG. 44 is a front view of a first orifice-defining member of the partition member.
Figure 45:
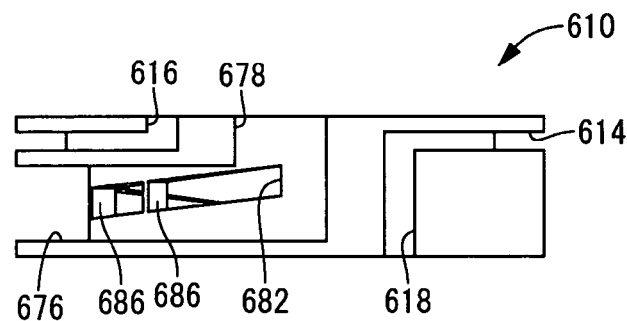
FIG. 45 is a side view of the first orifice-defining member.
Figure 46:
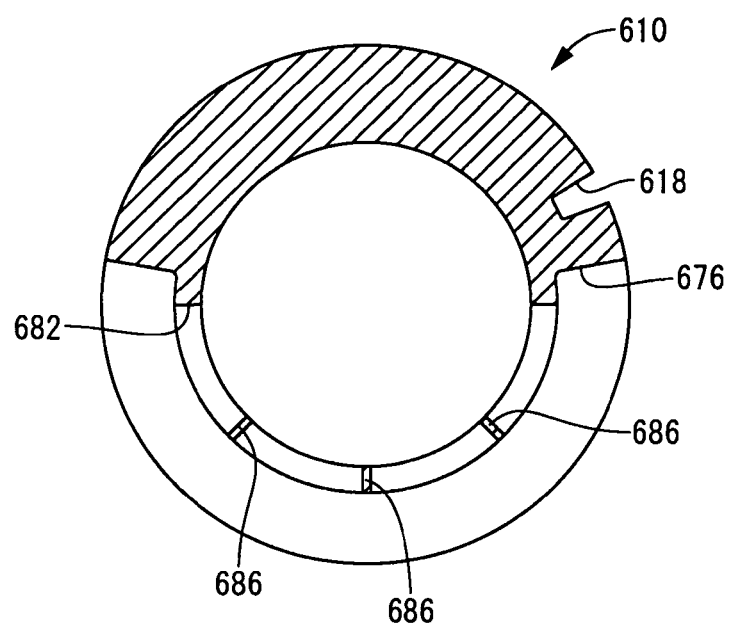
FIG. 46 is a cross sectional view taken along line 46-46 of FIG. 44.

As shown in FIGS. 44 to 46, the first orifice-defining member 610 is a hard component having thick-walled, large-diameter approximately round tubular shape, made of metal, synthetic resin or the like. In the first orifice-defining member 610 there is formed a circumferential groove 614 that opens onto the outside peripheral face and extends for a predetermined length in the circumferential direction. At one end of the circumferential groove 614 there is formed a communicating hole 616 that extends upward in the axial direction, and at the other end there is formed a communicating hole 618 that extends downward in the axial direction, with the communicating holes 616, 618 each opening onto one of the two axial end faces of the first orifice-defining member 610.

The first orifice-defining member 610 is secured supported to the inside peripheral side of the second mounting fitting 578 by subjecting the second mounting fitting 578 to a diameter reduction process. Thus, the outside peripheral face of the first orifice-defining member 610 is supported superposed against the inside peripheral face of the second mounting fitting 578 so that the opening on the outside peripheral side of the circumferential groove 614 formed in the first orifice-defining member 610 is covered fluidtightly. As a result, a first orifice passage 620 provided as a tunnel-like fluid passage that extends in the circumferential direction through the outside peripheral edge part of the first orifice-defining member 610 is formed by the circumferential groove 614, with the pressure-receiving chamber 606 and the equilibrium chamber 608 communicating with each other through the first orifice passage 620. In the present embodiment, [the tuning frequency of] the first orifice passage 620, which is established by the ratio (A/L) of passage cross sectional area (A) to passage length (L), is tuned to low frequency corresponding to engine shake.

Figure 47:
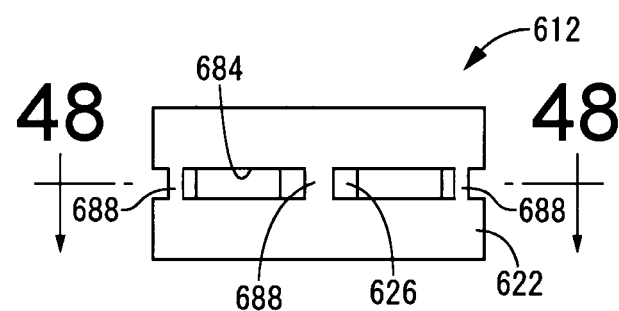
FIG. 47 is a front view of a second orifice-defining member of the engine mount.
Figure 48:
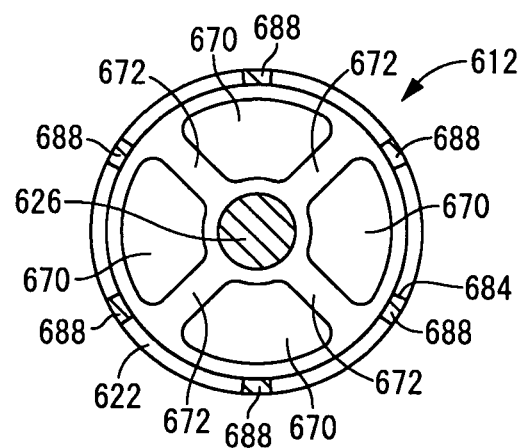
FIG. 48 is a cross sectional view taken along line 48-48 of FIG. 47.

The second orifice-defining member 612 fits inserted internally into the first orifice-defining member 610. As depicted in FIGS. 47 and 48, the second orifice-defining member 612 has a construction integrally incorporating an inner tubular portion 622 of approximately round tubular shape, a dividing wall 624 of approximately circular disk shape extending in the axis-perpendicular direction so as to close off the center hole of the inner tubular portion 622 in the axially medial section of the inner tubular portion 622, and a linking portion 626 of approximately circular post shape that projects downward from the diametrical center part of the dividing wall 624.

Figure 49:
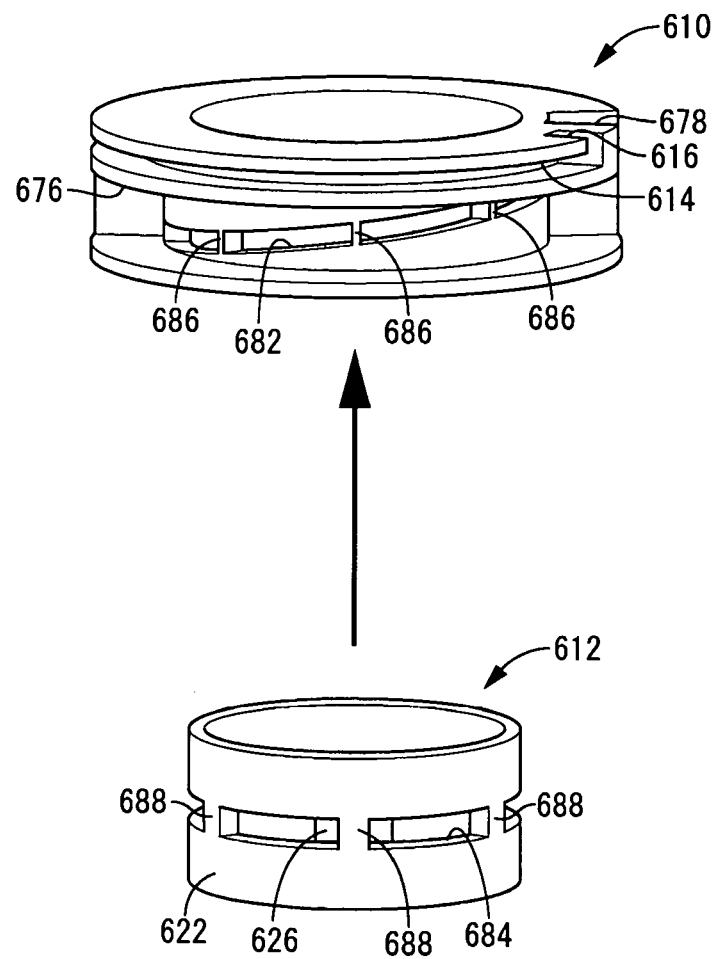
FIG. 49 is a perspective view of the first and second orifice-defining members.

As depicted in FIG. 49, the second orifice-defining member 612 is positioned inserted within the first orifice-defining member 610 so as to provide a partition member 604 that partitions a fluid chamber 602 into upper and lower parts. The second orifice-defining member 612 is inserted in a condition permitting relative displacement in the axial direction with respect to the first orifice-defining member 610. The zone to the inside peripheral side of the inner tubular portion 622 in the first orifice-defining member 610 is bifurcated into upper and lower parts to either side of the dividing wall 624, with the zone to the upper side of the dividing wall 624 constituting part of the pressure-receiving chamber 606.

As shown in FIG. 41, an output shaft 628 provided as an actuator shaft is secured to the linking portion 626 of the second orifice-defining member 612 and extends downward therefrom. The output shaft 628 is attached at the bottom end to an actuator 630. The actuator 630 is situated below the diaphragm 596, and is furnished with a housing 636 composed of a case 632 of approximately bottomed round tubular shape, and a cover plate 634 of approximately circular disk shape.

The housing 636 accommodates an electric motor 638. The electric motor 638 is of conventional known construction in which a rotating shaft 640 rotates about its center axis when actuated through energization by an externally provided power supply unit 642. In the present embodiment, a control unit 644 is provided on the circuit that connects the electric motor 638 with the power supply unit 642, and rotates the rotating shaft 640 of the electric motor 638 in prescribed rotation increments about the center axis. A worm 646 having a helical thread of screw form on its outside peripheral face is attached to the rotating shaft 640 of the electric motor 638.

A worm wheel 648 having on its outside peripheral face teeth that correspond with the worm 646 meshes with the worm 646. Below the worm wheel 648 there is integrally formed a coaxially positioned first spur gear 650 having formed on its outside peripheral face teeth that extend in the axial direction. The worm wheel 648 and the first spur gear 650 are supported by a spindle 652 attached to the case 632, so as to be rotatable about a center axis extending in the vertical direction.

A second spur gear 654 having formed on its outside peripheral face teeth that correspond with the first spur gear 650 meshes with the first spur gear 650. Above the second spur gear 654 there is integrally formed a coaxially positioned main drive cam member 656. The main drive cam member 656 is a hard member having approximately circular disk shape whose upper face constitutes a main drive cam face 658 that extends in a wave pattern in the circumferential direction. The second spur gear 654 and the main drive cam member 656 are rotatably supported about a center axis extending in the vertical direction by a rotary actuator shaft 660 attached to the case 632.

A follower cam member 662 is superposed in the axial direction against the main drive cam member 656. The follower cam member 662 is a hard member having approximately circular disk shape whose lower face constitutes a follower cam face 664 of a wave pattern corresponding to the main drive cam face 658. The output shaft 628 is anchored to the upper end face of the follower cam member 662 and projects upward along the center axis of the mount. The output shaft 628 has approximately stepped rod shape smaller in diameter at the top than at the bottom, and passes through the center section of the cover plate 634 to project out from the housing 636. While not depicted clearly in the drawings, in the present embodiment, a rotation inhibiting mechanism adapted to inhibit rotation of the output shaft 628 about the center axis while allowing actuation thereof in the axial direction is provided between the output shaft 628 and the housing 636 so as to inhibit rotation about the center axis by the follower cam member 662, which is integrally formed with the output shaft 628.

Additionally, the inside peripheral edge of the cover plate 634 of the housing 636 is positioned in opposition in the axial direction to the follower cam member 662; and a coil spring 666 is positioned between the opposed faces of the cover plate 634 and the follower cam member 662. The urging force of the coil spring 666 will be exerted between the main drive cam face 658 of the main drive cam member 656 and the follower cam face 664 of the follower cam member 662, in the direction of juxtaposition of these two cam faces 658, 664. By so doing, the main drive cam member 656 and the follower cam member 662 will be held in superposed condition while allowing relative displacement of the output shaft 628 with respect to the rotary actuator shaft 660 in the axial direction in opposition to the urging force of the coil spring 666.

The actuator 630 is situated axially between the diaphragm 596 and the bracket 586, while the housing 636 is secured to the bracket 586. The upper part (small-diameter part) of the output shaft 628 that projects out from the housing 636 is inserted through and secured in an insertion hole 668 that has been formed passing through the anchor plate 598 of the diaphragm 596 so that the output shaft 628 is positioned passing through the diaphragm 596; and the diaphragm 596 is anchored to the output shaft 628 through the agency of the anchor plate 598. A fluidtight seal is provided between the output shaft 628 and the anchor plate 598 to prevent the sealed non-compressible fluid from leaking to the outside through the insertion hole 668 of the anchor plate 598. Sealing of the insertion hole 668 of the anchor plate 598 may be accomplished, for example, by disposing an O-ring between the axially opposed faces of the step of the output shaft 628 and the inside peripheral edge of the anchor plate 598; by integrally forming the output shaft 628 and the anchor plate 598; or by securing the output shaft 628 and the anchor plate 598 through welding. In the present embodiment, the output shaft 628 and the anchor plate 598 are welded together, and the actuator shaft is composed of the output shaft 628 and the anchor plate 598.

The upper end part of the output shaft 628 projecting up beyond the anchor plate 598 is secured to the linking portion 626 of the second orifice-defining member 612 which constitutes part of the partition member 604 so that reciprocating motion exerted in the axial direction on the output shaft 628 will be transmitted to the second orifice-defining member 612.

Specifically, rotational actuating force exerted on the rotating shaft 640 by energizing the electric motor 638 is transmitted to the main drive cam member 656 by a gear train composed of the worm 646, the worm wheel 648, the first spur gear 650, and the second spur gear 654. Rotational motion about the center axis transmitted to the main drive cam member 656 is then converted to reciprocating motion in the axial direction by the action of the cam faces 658, 664, and is transmitted to the follower cam member 662. Thus, reciprocating actuating force in the axial direction will be exerted on the output shaft 628 affixed to the follower cam member 662, causing the second orifice-defining member 612 secured to the upper end of the output shaft 628 to experience reciprocating motion in the axial direction. From the above discussion it will be appreciated that the rotational actuating force of the electric motor 638 is converted between the main drive cam member 656 and the follower cam member 662 into reciprocating actuating force in the axial direction, with the main drive cam member 656 and the follower cam member 662 constituting a cam mechanism provided as a motion conversion mechanism.

Here, a first moveable rubber film 670 provided as flow regulating means is arranged in the second orifice-defining member 612. The first moveable rubber film 670 is formed by a thin rubber elastic body that extends in the approximately axis-perpendicular direction, and has been given higher rigidity than the diaphragm 596 so as to resist deformation. In the present embodiment, the first moveable rubber film 670 is segmented in the circumferential direction by spoke portions 672 that extend in the diametrical direction at multiple locations along the circumference, and is composed of several rubber films that appear fan-shaped in plan view.

The first moveable rubber film 670 is anchored at its outside peripheral face to the inner tubular portion 622 of the second orifice-defining member 612, and anchored at its inside peripheral face to the linking portion 626 of the second orifice-defining member 612. Thus, the zone situated diametrically between the inner tubular portion 622 and the linking portion 626 in the partition member 604 is bifurcated into upper and lower parts to either side of the first moveable rubber film 670, thereby defining the equilibrium chamber 608 to the lower side of the first moveable rubber film 670, while defining to the upper side a middle chamber 674 of variable volume, a portion of whose wall is constituted by the first moveable rubber film 670. The middle chamber 674 is separated from the equilibrium chamber 608 by the first moveable rubber film 670 so that the pressure of the middle chamber 674 is exerted on one face of the first moveable rubber film 670, while the pressure of the equilibrium chamber 608 is exerted on the other face. The middle chamber 674 is filled with a non-compressible fluid comparable to that in the pressure-receiving chamber 606 and the equilibrium chamber 608.

In the first orifice-defining member 610 there is formed an orifice-defining groove 676 that opens onto the outside peripheral face axially below the circumferential groove 614, and extends in the circumferential direction for a prescribed length equal to approximately halfway around the circumference. At one end of the orifice-defining groove 676 there is formed a communicating hole 678 that extends upward in the axial direction and opens onto the upper end face of the first orifice-defining member 610. The orifice-defining groove 676 has the same depth as the circumferential groove 614 but a larger axial dimension than the circumferential groove 614, so the cross sectional area of the groove is larger. As shown in FIG. 43, the communicating holes 616, 618 and the communicating hole 678 are respectively formed independently at different locations on the circumference.

The opening at the outside peripheral side of the orifice-defining groove 676 is covered by the second mounting fitting 578, thus forming a second orifice passage 680 provided as an orifice passage extending for prescribed length in the circumferential direction, with the pressure-receiving chamber 606 and the middle chamber 674 communicating with one another through the second orifice passage 680. The second orifice passage 680 is tuned to higher frequency than the first orifice passage 620; in the present embodiment, the tuning frequency of the second orifice passage 680 is set to about 20 Hz to 40 Hz corresponding to idling vibration.

The second orifice passage 680 communicates at one end thereof with the pressure-receiving chamber 606 through the communicating hole 678, and communicates at the other end with the middle chamber 674 through a communication slit 682 and a communicating window 684 provided as an orifice connection window.

The communication slit 682 is formed in the first orifice-defining member 610 so as to pass in the diametrical direction through the inside peripheral wall of the orifice-defining groove 676 and extend in the circumferential direction along approximately half the circumference. Through this communication slit 682 the orifice-defining groove 676 communicates along its entire circumferential length with the center hole of the first orifice-defining member 610, while the second orifice passage 680 communicates with the center hole of the first orifice-defining member 610 through the communication slit 682. In the present embodiment, reinforcing crosspieces 686 are provided at several locations along the circumference of the communication slit 682 so that the upper and lower sides of the first orifice-defining member 610 to either side of the communication slit 682 are linked by the reinforcing crosspieces 686. The orifice-defining groove 676 and the communication slit 682 constitute an orifice-defining window.

The communicating window 684 is formed so as to pass in the diametrical direction through the inner tubular portion 622 of the second orifice-defining member 612 and extend in the circumferential direction about the entire circumference. The communicating window 684 is formed below the dividing wall 624 in the second orifice-defining member 612 so that the communicating window 684 opens onto the outside peripheral face of the inner tubular portion 622 and communicates with the middle chamber 674, which is the zone diametrically between the inner tubular portion 622 and the linking portion 626. In the present embodiment, several linking crosspieces 688 are integrally formed in the second orifice-defining member 612 at several locations along the circumference of the communicating window 684 so that the sections of the inner tubular portion 622 to the upper and lower sides of the communicating window 684 are integrally linked by the linking crosspieces 688 which extend in the axial direction.

Moreover, in the present embodiment, the communication slit 682 has approximately helical form extending in the circumferential direction approximately halfway about the circumference while sloping in the axial direction, whereas the communicating window 684 has annular form extending in the circumferential direction about the entire circumference without sloping in the axial direction. Consequently, the communication slit 682 and the communicating window 684 extend in the circumferential direction at a relative slope in the axial direction. Also, in the present embodiment, the end at the pressure-receiving chamber 606 side of the communication slit 682 is formed situated at the axial upper end of the orifice-defining groove 676, while the end at the middle chamber 674 side is formed at the axial lower end of the orifice-defining groove 676, whereby the communication slit 682 extends in the circumferential direction while sloping in the axial direction.

The second orifice-defining member 612 fits inside the center hole of the first orifice-defining member 610 in a condition permitting relative displacement in the axial direction, whereby the communication slit 682 of the first orifice-defining member 610 and the communicating window 684 of the second orifice-defining member 612 intersect one another in part of the circumference. Thus, the end of the second orifice passage 680 will connect to the middle chamber 674 at the intersection point of the communication slit 682 and the communicating window 684, and the pressure-receiving chamber 606 and the middle chamber 674 will communicate with one another by the second orifice passage 680.

The second orifice passage 680 has variable passage length, making it possible for the tuning frequency, which is established by the ratio (A/L) of passage cross sectional area (A) to passage length (L), to be adjusted according to the frequency of input vibration. Specifically, when displacement of the second orifice-defining member 612 in the axial direction is actuated by the actuator 630, the intersection location of the helical communication slit 682 and the communicating window 684 that extends in the circumferential direction will change in the lengthwise direction of the orifice-defining groove 676, thereby modifying the passage length (L) of the second orifice passage 680. Thus, the tuning frequency of the second orifice passage 680 will be reset so that effective vibration damping can be produced respectively against vibrations of different frequencies.

In the present embodiment, the second orifice passage 680 is tuned to between 20 Hz and 40 Hz, corresponding to idling vibration, and the tuning of the second orifice passage 680 is adjustable within this frequency range through displacement of the first orifice-defining member 610 in the axial direction with respect to the second orifice-defining member 612. As examples of such tuning, FIG. 50 depicts a condition tuned to the low-frequency band on the order of 20 Hz, while FIG. 51 depicts a condition tuned to the high-frequency band on the order of 40 Hz.

Figure 50:
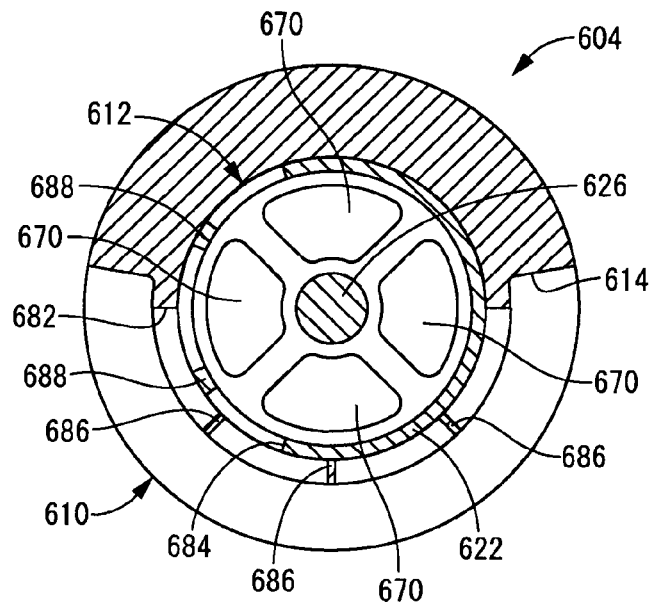
FIG. 50 is a cross sectional view of a partition member where the second orifice passage is tuned to a low frequency, taken along line 50-50 of FIG. 44.

Specifically, with the second orifice-defining member 612 positioned at the bottom as shown FIG. 41, the intersection of the communication slit 682 and the communicating window 684 will be set to a location distant in the circumferential direction from the end at the pressure-receiving chamber 606 side of the second orifice passage 680 as depicted in FIG. 50, thus forming the second orifice passage 680 to a passage length equal to about half the circumference in the circumferential direction. Accordingly the ratio of passage cross sectional area to passage length of second orifice passage 680 will assume a small value, and the second orifice passage 680 will be tuned to low frequency band.

Figure 51:
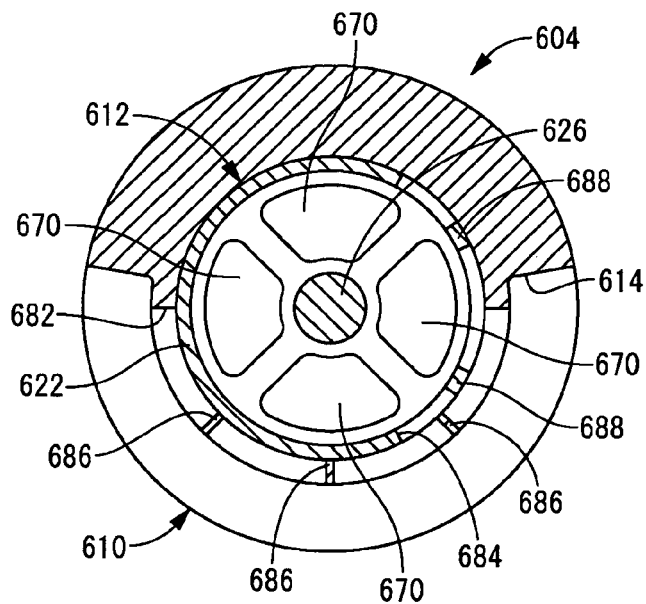
FIG. 51 is a cross sectional view of a partition member where the second orifice passage is tuned to a high frequency, taken along line 51-51 of FIG. 44.

On the other hand, with the second orifice-defining member 612 positioned at the top as shown in FIG. 42, the intersection of the communication slit 682 and the communicating window 684 will be set to a location proximal in the circumferential direction to the end at the pressure-receiving chamber 606 side of the second orifice passage 680 as depicted in FIG. 51, thus forming the second orifice passage 680 to a very short passage length. Accordingly, the ratio of passage cross sectional area to passage length of second orifice passage 680 will assume a large value, and the second orifice passage 680 will be tuned to middle frequency band.

While not depicted in the drawings, by positioning the second orifice-defining member 612 midway along the direction of reciprocating motion, it will be possible to set the tuning frequency of the second orifice passage 680 to midway between 20 Hz and 40 Hz.

Modification of the tuning of the second orifice passage 680 may be carried out through control of the electric motor 638 by the control unit 644 so as to carry out stepwise tuning to several different frequencies established beforehand, or to reset tuning in continuous fashion according to the frequency of input vibration. With stepwise control, by employing for example a simple control unit such as a contact-type self switch, or employing as the electric motor a stepping motor having an internal control unit, adjustment of the tuning of the second orifice passage 680 can be accomplished with a simple construction and few parts. With continuous control on the other hand, the tuning frequency of the second orifice passage 680 can be set with a high degree of accuracy according to the frequency of input vibration, so better vibration damping capabilities can be achieved. In the present embodiment, the tuning frequency of the second orifice passage 680 is controlled by the control unit 644 according to the speed of the engine.

With the automotive engine mount 574 constructed as above installed in a vehicle, if low-frequency vibration corresponding to engine shake is input, effective vibration damping (high attenuating action) of the input vibration will be obtained on the basis of fluid flow through the first orifice passage 620, which has been tuned to low frequency corresponding to engine shake.

Moreover, during input of such vibration corresponding to engine shake, the second orifice passage 680 will be substantially blocked. Specifically, because the first moveable rubber film 670 constituting part of the wall of the middle chamber 674 has higher rigidity than the diaphragm 596 so as to limit its deformation, when low-frequency, high-amplitude vibration corresponding to engine shake is input, the second orifice passage 680 will assume a clogged state and become substantially blocked. Thus, the pressure-receiving chamber 606 can be prevented from experiencing diminished pressure fluctuations due to fluid flow through the second orifice passage 680, making it possible to efficiently give rise to fluid flow through the first orifice passage 620.

On the other hand, if midrange frequency vibration corresponding to idling vibration has been input, the second orifice-defining member 612 will undergo displacement in the axial direction with respect to the first orifice-defining member 610 through operation of the electric motor 638, so that the communicating window 684 formed in the second orifice-defining member 612 intersects the communication slit 682 formed in the first orifice-defining member 610. Thus, the pressure-receiving chamber 606 and the middle chamber 674 will communicate with one another through the second orifice passage 680, giving rise to vibration damping (low dynamic spring action) on the basis of resonance action of fluid caused to flow through the second orifice passage 680.

Moreover, in the present embodiment, in view of the fact that the frequency of input idling vibration changes depending on the speed of the engine, which may change in association with startup of the engine, with heating, or with use of the air conditioner, the system is designed so that vibration damping by the second orifice passage 680 can be efficiently obtained by changing the tuning frequency of the second orifice passage 680 according to engine speed.

Specifically, if vibration of relatively low frequency in the idling vibration frequency range is input, the second orifice-defining member 612 will undergo displacement to the top in the operating direction, thus making the passage length of the second orifice passage 680 longer. Thus, the tuning frequency of the second orifice passage 680 will be set to the low-frequency band of about 20 Hz. On the other hand, if vibration of relatively high frequency is input, the second orifice-defining member 612 will undergo displacement to the top in the operating direction, thus making the passage length of the second orifice passage 680 shorter. Thus, the tuning frequency of the second orifice passage 680 will be set to the high-frequency band of about 40 Hz. Vibration damping by the second orifice passage 680 will thus be produced effectively against idling vibration of a wider range of frequencies.

At times of input of normal idling vibration, the first orifice passage 620, which has been tuned to low frequency, will assume a clogged state due to antiresonance action and become substantially blocked. For this reason, sufficient levels of fluid flow through the second orifice passage 680 will be efficiently assured so that the intended vibration damping can be effectively achieved. Meanwhile, input of rough idling vibration, which is vibration of lower frequency and higher amplitude than normal idling vibration, will give rise to fluid flow between the pressure-receiving chamber 606 and the equilibrium chamber 608 through the first orifice passage 620 whose two ends are each in constant communication with one of the two chambers 606, 608, so that vibration damping is produced by the first orifice passage 620. Moreover, when rough idling vibration having higher amplitude than normal idling vibration is input, deformation of the first moveable rubber film 670 that constitutes a portion of the wall of the middle chamber 674 will be limited, and the second orifice passage 680 will become substantially blocked. As a result, fluid flow will efficiently arise through the first orifice passage 620, and vibration damping by the first orifice passage 620 will be produced effectively.

In the engine mount 574 constructed in accordance with the present embodiment, vibration damping of low-frequency vibration such as engine shake or rough idling vibration can be produced by the first orifice passage 620 which is held in a constantly communicating state, and it will be possible to obtain excellent vibration damping of idling vibration by the second orifice passage 680 whose tuning frequency is modifiable.

The output shaft 628 which transmits actuating force to the second orifice-defining member 612 from the actuator 630 which is situated outside the fluid chamber 602 is designed to undergo reciprocating movement in the axial direction. For this reason, the output shaft 628, which has been disposed passing through the diaphragm 596, can be secured in a fluidtightly sealed condition to the anchor plate 598 of the diaphragm 596. Consequently, the non-compressible fluid filling the fluid chamber 602 will be prevented from leaking from the section passed through by the output shaft 628, thus affording improved reliability and durability, and affording a simple construction for sealing the output shaft 628 passage section.

Additionally, in the present embodiment, the first orifice-defining member 610 is reinforced by the several reinforcing crosspieces 686 which have been provided on the circumference of the communication slit 682, thus affording improved durability of the first orifice-defining member 610. Meanwhile, several linking crosspieces 688 are provided on the circumference of the communicating window 684 so that the sections of the second orifice-defining member 612 to either side of the communicating window 684 are linked together by the linking crosspieces 688, and the second orifice-defining member 612 is reinforced by the linking crosspieces 688 to provide improved durability.

Figure 52:
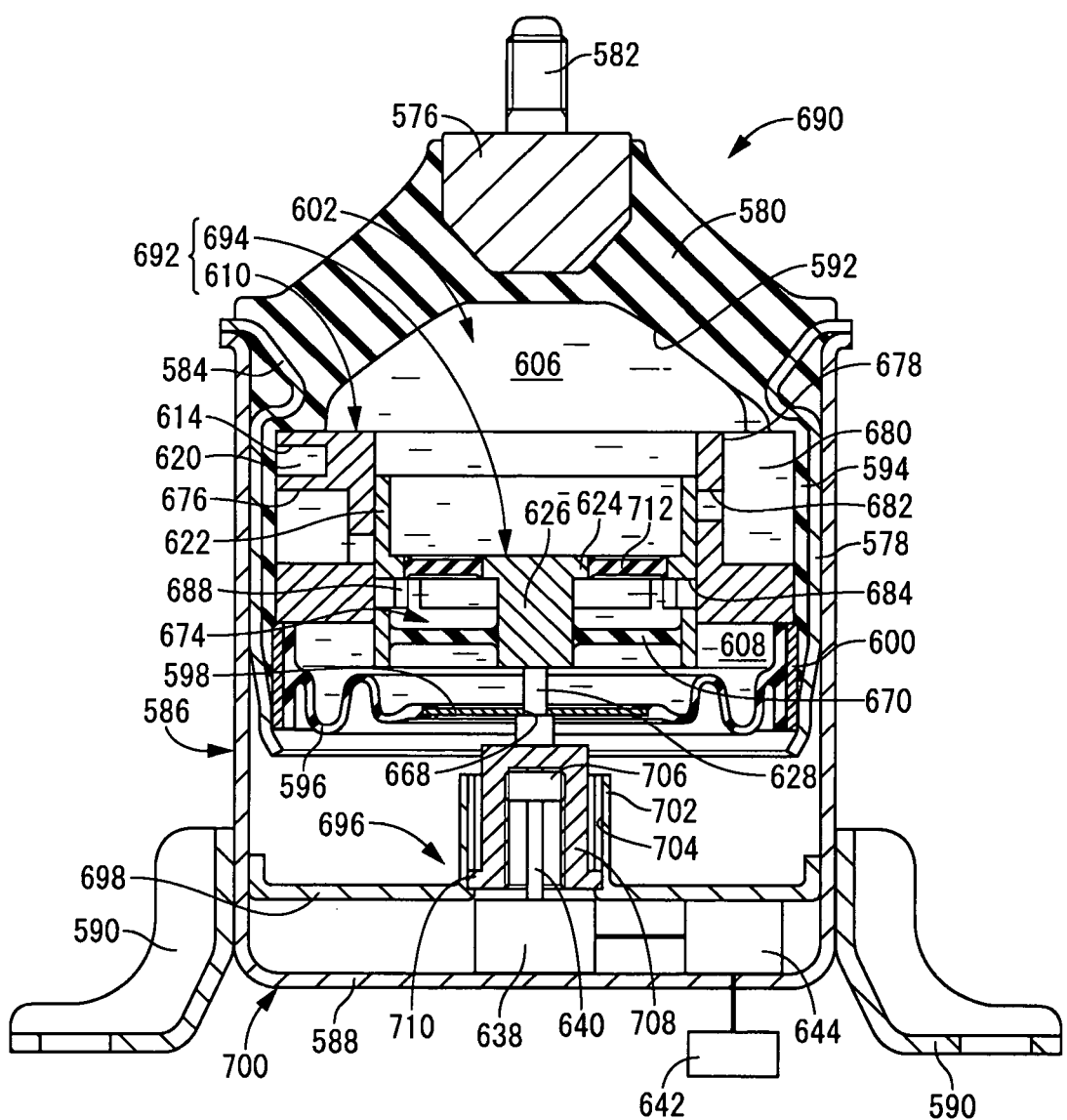
FIG. 52 is a vertical cross sectional view of an automobile engine mount according to a twenty-third embodiment of the present invention where a second orifice passage is blocked.

Next, FIG. 52 depicts an automotive engine mount 690 according to a twenty-third embodiment of the fluid-filled vibration damping device according to the present invention. In the following description, components and parts that are substantially identical to those in the twenty-second embodiment have been assigned like symbols in the drawings, omitting description.

Figure 53:
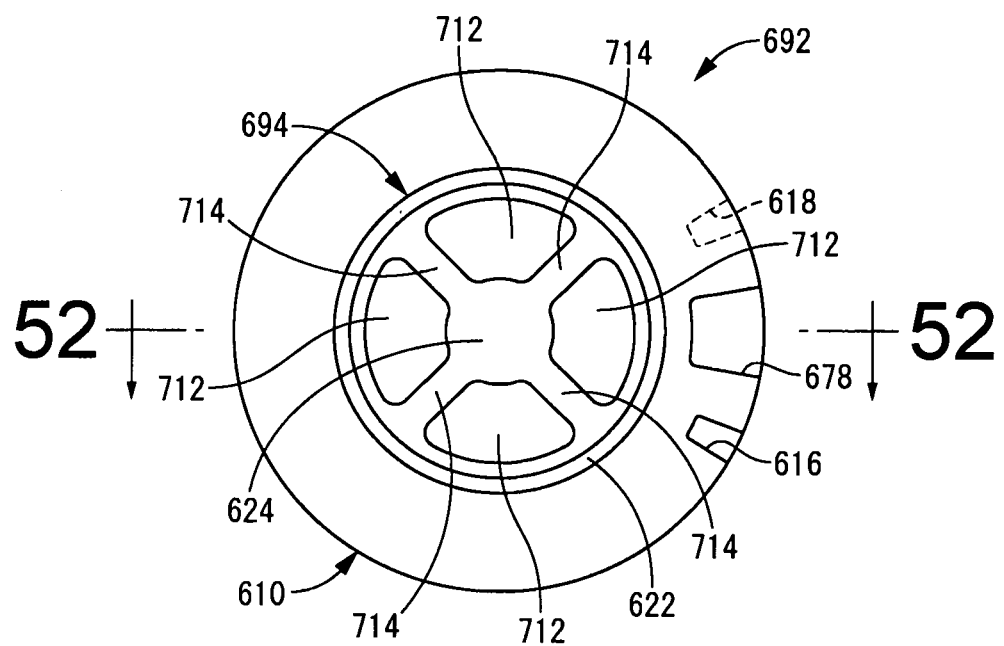
FIG. 53 is a plan view of a partition member of the engine mount.

Specifically, the engine mount 690 incorporates a partition member 692. The partition member 692 is arranged bifurcating the fluid chamber 602 into upper and lower parts, defining a pressure-receiving chamber 606 and an equilibrium chamber 608 to either side of the partition member 692. As shown in FIGS. 52 and 53, the partition member 692 includes a first orifice-defining member 610, and a second orifice-defining member 694 provided as an inner orifice member.

The second orifice-defining member 694 integrally incorporates an inner tubular portion 622, a dividing wall 624, and a linking portion 626. The second orifice-defining member 694, fitting inside a condition permitting relative displacement in the axial direction, is inserted into the first orifice-defining member 610 which is supported by the second mounting fitting 578, to constitute the partition member 692.

As shown in FIG. 52, an output shaft 628 that extends downward is anchored to the linking portion 626 of the second orifice-defining member 694. The lower end of the output shaft 628 is attached to an actuator 696.

The actuator 696 has a housing 700 composed of a bracket 586, and a cover plate 698 of approximately annular disk shape attached to as to cover the opening of the bracket 586 in the axially medial section. At the inside peripheral edge of the cover plate 698 there is integrally formed a guide tube portion 702 of approximately round tubular shape projecting upward in the axial direction. In sections of the guide tube portion 702 situated in opposition along a diametrical axis there are formed a pair of mating grooves 704, 704 that open onto the inside peripheral face and extend in the axial direction; these open onto the inside peripheral face and upper end face of the guide tube portion 702.

The housing 700 accommodates an electric motor 638. The electric motor 638 is situated in the diametrical center section of the housing 700, and the rotating shaft 640 projects upward through the center hole of the cover plate 698. A male screw member 706 is secured externally fitted onto the rotating shaft 640 so as to be coaxially positioned therewith, so that the male screw member 706 undergoes rotating movement in unison with the rotating shaft 640. A thread is formed on the outside peripheral face of this male screw member 706.

An actuation member 708 is attached to the male screw member 706. The actuation member 708 as a whole has an inverted, approximately bottomed round tubular shape, and on the inside peripheral face of its peripheral wall there is formed a thread that corresponds to the male screw member 706. The output shaft 628, which projects upward along the center axis, is anchored to the upper face of the actuation member 708 to constitute an actuator shaft, and passes through the anchor plate 598 to be secured to the second orifice-defining member 694 of the partition member 692. In other words, the second orifice-defining member 694 is linked to the actuation member 708 of the actuator 696 by the output shaft 628. The actuation member 708 is then attached to the rotating shaft 640 to which the male screw member 706 has been attached, with the male screw member 706 and the actuation member 708 screwed together.

At the lower end of the actuation member 708 there are formed a pair of mating projections 710, 710 that project outwardly along an axis in the diametrical direction, with each mating projection 710 adapted to insert into a mating groove 704 of the guide tube portion 702. Through abutment of the mating grooves 704 and the mating projections 710 in the circumferential direction, the actuation member 708 is prevented from rotating about the center axis while permitting actuated displacement of the actuation member 708 in the axial direction through displacement of the mating projections 710 along the mating grooves 704, so that the mating grooves 704 and the mating projections 710 constitute a rotation inhibiting mechanism.

Reciprocating movement of the actuation member 708 in the axial direction is then actuated by energizing the electric motor 638 from the external power supply unit 642 to actuate rotation of the rotating shaft 640. Specifically, owing to the male screw member 706 and the actuation member 708 being screwed together, and to the rotation inhibiting mechanism provided by the mating grooves 704 and the mating projections 710, when the male screw member 706 which has been secured to the rotating shaft 640 undergoes actuated rotation, the actuation member 708 will experience relative displacement in the axial direction with respect to the male screw member 706, depending on the direction of rotation of the rotating shaft 640. Thus, in the present embodiment, a screw mechanism composed of the male screw member 706 and the actuation member 708 provides the motion conversion mechanism for converting rotational actuating force of the electric motor 638 to reciprocating actuating force in the axial direction.

Furthermore, actuating force exerted in the axial direction on the actuation member 708 will be transmitted to the second orifice-defining member 694 via the output shaft 628, thus producing actuated reciprocation of the second orifice-defining member 694 in the axial direction. Thus, due to actuated displacement of the second orifice-defining member 694, the location of the intersection point of the communication slit 682 with the communicating window 684 will change in the circumferential direction so that the passage length of the second orifice passage 680 changes, making it possible to adjust the tuning of the second orifice passage 680.

In the present embodiment, with the second orifice-defining member 694 displaced to the bottom in the operating direction as shown in FIG. 52, the communicating window 684 will be positioned below the lower end of the communication slit 682 so that the communication slit 682 and the communicating window 684 no longer intersect. Thus, the second orifice passage 680 is selectively switchable between the communicating and blocked states. As a result, during input of vibration having the frequency to which the first orifice passage 620 is tuned, fluid flow through the second orifice passage 680 will be prevented, so that vibration damping by the first orifice passage 620 can be produced efficiently.

Thus, in the present embodiment, a second moveable rubber film 712 provided as liquid pressure absorbing means is arranged on the dividing wall 624 of the second orifice-defining member 694. As shown in FIGS. 52 and 53, the second moveable rubber film 712 is formed by a rubber elastic body extending in approximately the axis-perpendicular direction; in the present embodiment, it is composed of several rubber films segmented by spoke portions 714 that extend in the diametrical direction at multiple locations along the circumference, and having approximately fan-shaped appearance in plan view. The second moveable rubber film 712 has higher rigidity than the first moveable rubber film 670 and is more resistant to deformation. In the present embodiment, during input of high-frequency, low-amplitude vibration corresponding to driving rumble of a automobile, the second moveable rubber film 712 will actively give rise to tiny deformations in the resonance state.

With the engine mount 690 of the above construction installed in a vehicle, if high-frequency vibration corresponding to driving rumble is input, the second moveable rubber film 712 provided to the dividing wall 624 of the second orifice-defining member 694 will experience slight deformation and will give rise to vibration damping (low dynamic spring action) on the basis of the liquid pressure absorbing action of the second moveable rubber film 712. As a result, with the engine mount 690 according to the present embodiment, the first orifice passage 620 which has been tuned to low frequency, the second orifice passage 680 which produces vibration damping over a wide range of midrange frequencies, and the second moveable rubber film 712 which has been tuned to high frequency will together afford effective vibration damping action of input vibration of a wider range of frequencies.

Figure 54:
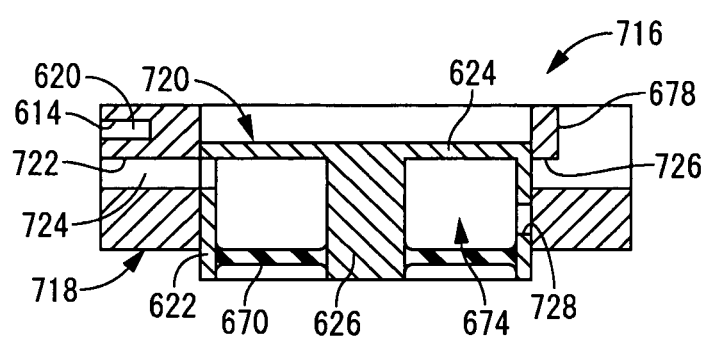
FIG. 54 is a vertical cross sectional view of a partition member of an automobile engine mount according to a twenty-fourth embodiment of the present invention.

FIG. 54 depicts a partition member 716 that makes up an engine mount according to a twenty-fourth embodiment of the fluid-filled vibration damping device according to the present invention. In FIGS. 54 to 60, parts omitted in the drawings are basically identical to those in the twenty-second embodiment.

Figure 55:
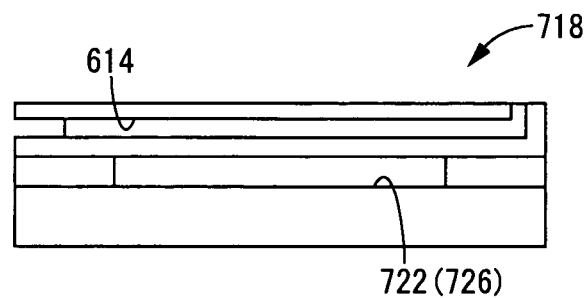
FIG. 55 is a front view of a first orifice-defining member of the partition member.

Specifically, the partition member 716 is composed of a first orifice-defining member 718 provided as an outer orifice member and a second orifice-defining member 720 provided as an inner orifice member. As shown in FIG. 55, a circumferential groove 614 and an orifice-defining groove 722 that open onto the outside peripheral face and extend in the circumferential direction without slope in the axial direction are formed in the first orifice-defining member 718 along approximately half the circumference in the axially medial section. The openings to the outside peripheral side of the circumferential groove 614 and the orifice-defining groove 722 are covered by the second mounting fitting 578, thereby forming a first orifice passage 620 and a second orifice passage 724 provided as an orifice passage, which respectively extend for prescribed lengths in the circumferential direction. Meanwhile, the second orifice-defining member 720 has a construction integrally incorporating an inner tubular portion 622, a dividing wall 624, and a linking portion 626. In the present embodiment, the dividing wall 624 is disposed on the top of the inner tubular portion 622.

Figure 56:
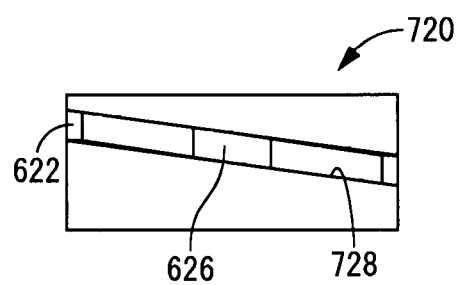
FIG. 56 is a front view of a second orifice-defining member of the partition member.

A communication slit 726 is formed in the first orifice-defining member 718, and a communicating window 728 provided as an orifice connection window is formed in the second orifice-defining member 720. As shown in FIG. 55, the communication slit 726 extends in the circumferential direction without sloping in the axial direction; while as shown in FIG. 56 the communicating window 728 follows a helical pattern sloping at a prescribed angle in the axial direction while extending in the circumferential direction, so that the communication slit 726 and the communicating window 728 extend in the circumferential direction at a relative slope in the axial direction. The height of the communication slit 726 in the axial direction is approximately the same as that of the orifice-defining groove 722. The orifice-defining groove 722, together with the communication slit 726 formed at its inside peripheral side, constitute an orifice-defining window.

Because the communication slit 726 and the communicating window 728 slope relative to one another as they extend in the circumferential direction, the communication slit 726 and the communicating window 728 will intersect on part of the circumference, with the point of intersection of the communication slit 726 and the communicating window 728 forming the opening at the middle chamber 674 side of the second orifice passage 724. Additionally, the passage length of the second orifice passage 724 is variable through relative displacement of the second orifice-defining member 720 in the axial direction with respect to the first orifice-defining member 718. It is therefore possible to reset the tuning frequency of the second orifice passage 724.

Thus, in an engine mount incorporating the partition member 716 furnished with the communication slit 726 that is annular in the circumferential direction and the helical communicating window 728, it is possible to adjust the tuning frequency of the second orifice passage 724 through reciprocating displacement of the second orifice-defining member 720 in the axial direction, so that effective vibration damping of vibration of a wider range of frequencies can be achieved.

Figure 57:
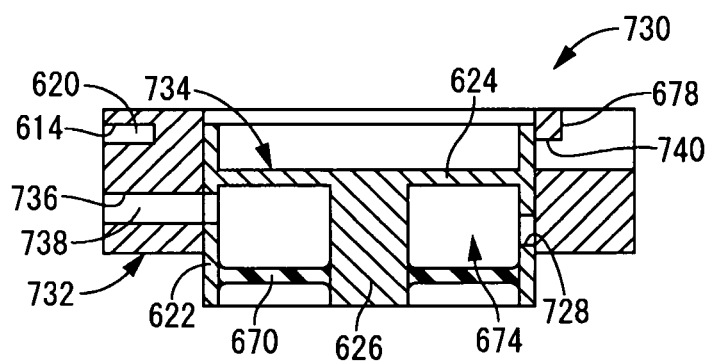
FIG. 57 is a vertical cross sectional view of a partition member of an automobile engine mount according to a twenty-fifth embodiment of the present invention.
Figure 58:
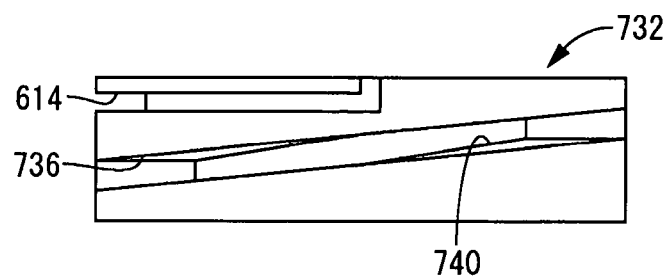
FIG. 58 is a front view of a first orifice-defining member of the partition member.
Figure 59:
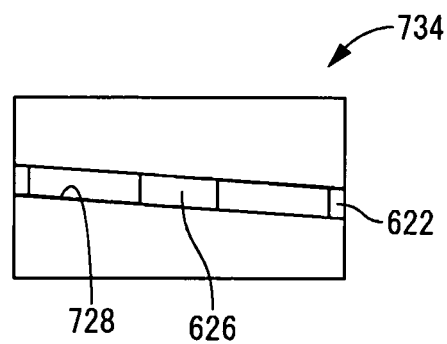
FIG. 59 is a front view of a second orifice-defining member of the partition member.

FIG. 57 depicts a partition member 730 that makes up an engine mount according to a twenty-fifth embodiment of the fluid-filled vibration damping device according to the present invention. Specifically, the partition member 730 is composed of a first orifice-defining member 732 provided as an outer orifice member, and a second orifice-defining member 734 provided as an inner orifice member. As shown in FIG. 58, in the first orifice-defining member 732 there are formed a circumferential groove 614 that extends in the circumferential direction without sloping in the axial direction, and an orifice-defining groove 736 of helical form sloping at a prescribed angle in the axial direction while extending in the circumferential direction, the grooves extending approximately halfway around the circumference and opening onto the outside peripheral face. The outside peripheral openings of the circumferential groove 614 and the orifice-defining groove 736 are covered by the second mounting fitting 578, thereby forming a first orifice passage 620 and a second orifice passage 738 provided as an orifice passage, that respectively extend for prescribed length in the circumferential direction. Meanwhile, as shown in FIG. 59, the construction of the second orifice-defining member 734 integrally incorporates an inner tubular portion 622, a dividing wall 624, and a linking portion 626.

A communication slit 740 is formed in the first orifice-defining member 732, with the orifice-defining groove 736 and the communication slit 740 cooperatively constituting an orifice-defining window; and a communicating window 728 is formed in the second orifice-defining member 734. As shown in FIGS. 57 to 59, both the communication slit 740 and the communicating window 728 have helical patterns that slope in the axial direction while extending in the circumferential direction, with the slope direction of the communication slit 740 and the slope direction of the communicating window 728 being mutually opposite. Thus, the communication slit 740 and the communicating window 728 extend in the circumferential direction with relative slope in the axial direction so as to intersect on part of the circumference, and the second orifice passage 738 communicates with the middle chamber 674 at the intersection point of the communication slit 740 with the communicating window 728.

The location of the intersection point of the communication slit 740 with the communicating window 728 changes in the circumferential direction through relative displacement of the first orifice-defining member 732 and the second orifice-defining member 734 in the axial direction, so the passage length of the second orifice passage 738 is variable. Thus, the tuning frequency of the second orifice passage 738 can be modified.

Thus, in an engine mount that incorporates the partition member 730 furnished with the helical communication slit 740 and the helical communicating window 728, it is possible for the tuning frequency of the second orifice passage 738 to be adjusted through reciprocating actuated displacement of the second orifice-defining member 734 in the axial direction, so effective vibration damping of vibration of a wider range of frequencies can be achieved.

Furthermore, because the communication slit 740 and the communicating window 728 have helical patterns of opposite slope, it is possible to establish a large angle of relative slope in the axial direction for the communication slit 740 and the communicating window 728 without increasing the size of the partition member 730 in the axial direction. As a result, change in location of the intersection point of the communication slit 740 with the communicating window 728 will be smaller relative to the level of relative displacement of the first and second orifice-defining members 732, 734 in the axial direction so that tuning of the second orifice passage 738 may be modified with a high degree of accuracy.

Figure 60:
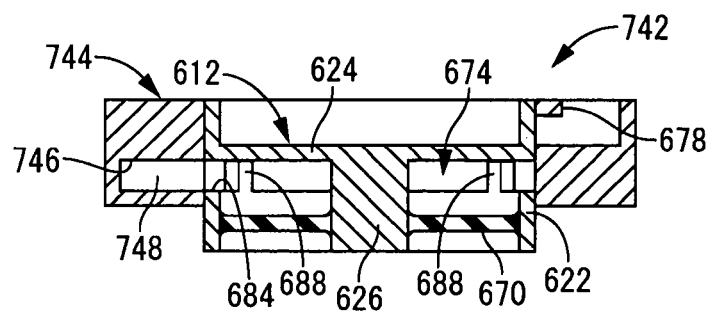
FIG. 60 is a vertical cross sectional view of a partition member of an automobile engine mount according to a twenty-sixth embodiment of the present invention.

FIG. 60 depicts a partition member 742 that makes up an engine mount according to a twenty-sixth embodiment of the fluid-filled vibration damping device according to the present invention. The partition member 742 is composed of a first orifice-defining member 744 provided as an outer orifice member, and a second orifice-defining member 612 provided as an inner orifice member. In the first orifice-defining member 744 there is formed an orifice-defining groove 746 provided as an orifice-defining window that opens onto the inside peripheral face and extends in the circumferential direction; and the inside peripheral opening of the orifice-defining groove 746 is covered by the second orifice-defining member 612 thereby forming a tunnel-like passage. This tunnel-like passage at one end thereof communicates with the pressure-receiving chamber 606 through a communicating hole 678, and at the other end communicates with the middle chamber 674 through a communicating window 684 so as to form a second orifice passage 748 provided as an orifice passage connecting the pressure-receiving chamber 606 with the middle chamber 674. Additionally, in the second orifice-defining member 612 there is formed a communicating window 684 that extends in the circumferential direction at a relative slope in the axial direction to the orifice-defining groove 746; and the second orifice passage 748 communicates with the middle chamber 674 through the intersection point of the inside peripheral opening of the orifice-defining groove 746 with the communicating window 684. Thus, the passage length of the second orifice passage 748 may be modified through displacement of the second orifice-defining member 612 in the axial direction. Thus it should be appreciated that no particular limitations are imposed on the specific construction of the second orifice passage.

While the present invention has been described in terms of certain preferred embodiments, these are merely exemplary and it is to be understood that the invention is by no means limited to the details of the embodiments set forth herein.

For example, while reasons such as a large degree of freedom in tuning make it preferable that the orifice passage have helical structure, the structure of the orifice passage is not necessarily limited to such helical structure. As a specific example, the orifice-defining window may be provided as a slot extending in a straight line in the axial direction, to form an orifice passage extending in a straight line in the axial direction.

The path that connects the pressure-receiving chamber to the equilibrium chamber need not necessarily be composed exclusively by a fluid passage and an orifice passage, it being possible for example for two or more paths inclusive of an orifice passage to be formed in either the inner orifice member or the outer orifice member. As a specific example, in the inner orifice member it would be possible to form independently of the orifice-defining window a second orifice-defining window that opens onto the outside peripheral face, and to cover this second orifice-defining window by the outer orifice member to form an additional path. In particular, in one possible arrangement, the axial location of the end at the equilibrium chamber side of this path is offset with respect to the axial location of the end at the equilibrium chamber side of the orifice passage so as to enable switching between a condition in which only one or the other of the path and the orifice passage is in the communicating state, and a condition in which both are the communicating state, through relative displacement of the inner orifice member in the axial direction with respect to the outer orifice member, to produce large changes in vibration damping characteristics.

As a further example, two or more paths inclusive of a fluid passage may be formed in the outer orifice member. In this case, it will be preferable to form the paths so as to extend in the circumferential direction, and to provide a switching mechanism such as a valve for switching the paths between the communicating state and the blocked state.

With regard to the actuator, while a structure that utilizes the actuating force of a pulse motor (stepping motor) was shown herein, no particular limitation is imposed thereby on actuator structure, it being possible to employ for example an electromagnetic actuator that utilizes magnetic force produced by energizing a coil as actuating force, a pneumatic actuator that utilizes negative pressure (or positive pressure) as actuating force, or an actuator that utilizes rotational actuating force of an electric motor capable of feedback control by a control unit.

As flow regulating means, there could be employed for example a moveable plate structure as an alternative to the exemplary moveable film structure shown herein. In an example of such a moveable plate structure, a moveable plate consisting of a moveable rubber plate made of a rubber elastic body or a hard plate made of hard synthetic resin or the like is arranged accommodated in a floating condition in a housing zone formed inside a housing, so that moveable plate experiences slight displacement on the basis of a differential in liquid pressure exerted on its two faces. By providing such a moveable plate structure on the fluid path leading through an orifice passage, the orifice passage can be switched to the communicating state through slight displacement of the moveable plate, and the orifice passage may be switched to the blocked state with the moveable plate being constrained through abutment against the housing.

As liquid pressure absorbing means, there could be employed for example a moveable plate structure as an alternative to a moveable film structure that relies on a moveable rubber film. By so doing, vibration damping of high-frequency vibration can be obtained on the basis of liquid pressure absorbing action produced through slight displacement of the moveable plate.

With regard to the orifice-defining window and the orifice connection window, for example, both of these may have helical form sloping in the axial direction and extending in the circumferential direction with the same direction of slope, but with their angles of slope relatively different so that the orifice-defining window and the orifice connection window intersect one another on part of the circumference.

While the passage length of an orifice passage may be modified by changing in the circumferential direction the location of communication of the orifice passage with the equilibrium chamber, in another possible arrangement for example, the opening at the pressure-receiving chamber side of the orifice passage may be constituted by an orifice-defining window and an orifice connection window, so that by moving the intersection point of the orifice-defining window and the orifice connection window through relative displacement of the inner and outer orifice members in the axial direction, the location of communication the orifice passage with the pressure-receiving chamber changes in the circumferential direction, causing the passage length of the orifice passage to change.

Moreover, the orifice passage (orifice-defining window) and fluid passage may for example be formed in the inner orifice member, or formed cooperatively by the inner and outer orifice members. Further, the orifice passage tuning frequencies shown herein are merely exemplary, and may be established appropriately according to the frequency of the vibration being damped.

No particular limitation is imposed on the structure of the actuator, and it is possible to employ for example an electromagnetic actuator having a stator that includes a coil, and a moveable element that undergoes relative displacement in the axial direction with respect to the stator when the coil is energized; or a pneumatic actuator in which actuating force is produced on the basis of air pressure exerted on a working air chamber. Further, even where an actuator of cam or screw design is employed, no particular limitation is imposed on the specific structure thereof, and arrangements such as the gear train may be modified appropriately.

Moreover it is not essential that fluid passage be held in a state of constant communication, and may instead be designed so that fluid passage is switched between the communicating and blocked states through relative displacement of the inner orifice member with respect to the outer orifice member. By doing so, fluid flow through the fluid passage may be more reliably prevented at times of input of midrange- to high-frequency vibration corresponding to the tuning frequency of an orifice passage, so that vibration damping by the orifice passage is produced more advantageously.

The scope of the present invention is not limited to engine mounts, and may be implemented in body mounts, member mounts, diff mounts, suspension bushings, and the like. Nor is the present invention limited in scope to fluid-filled vibration damping devices for automotive applications, and has potential application in fluid-filled vibration damping devices used in various applications such as rolling stock, motorized two-wheel vehicles, and bicycles, as well as non-vehicular applications.

KEY TO SYMBOLS 10, 96, 100, 112, 132, 134, 140, 242, 302, 340, 444, 512, 520, 536, 574, 690: engine mount; 12, 142, 244, 342, 446, 576: first mounting fitting; 14, 144, 246, 344, 448,

578: second mounting fitting; 16, 146, 346, 580: main rubber elastic body; 40, 162, 362, 538, 596: diaphragm; 48, 98, 102, 114, 170, 270, 304, 310, 324, 328, 370, 472, 514, 522, 542, 552, 564, 568, 604, 692, 716, 730, 742: partition member; 50, 104, 116, 136, 176, 272, 312, 330, 376, 474, 524, 554, 570, 610, 718, 732, 744: first orifice-defining member; 52, 106, 118, 178, 274, 306, 314, 326, 336, 378, 476, 516, 556, 566, 612, 694, 720, 734: second orifice-defining member; 56, 280, 488: guide sleeve; 62, 110, 670: first moveable rubber film; 64, 288, 498: guide projection; 66, 180, 316, 332, 386, 480, 558, 572, 676, 722, 736, 746: orifice-defining groove; 68, 172, 372, 606: pressure-receiving chamber; 70, 174, 374, 608: equilibrium chamber; 76, 390, 620: first orifice passage; 80, 392, 680, 724, 738, 748: second orifice passage; 82, 298, 430, 508, 548, 708: actuation member; 90, 194, 294, 406, 504, 546, 630, 696: actuator; 94, 192, 404, 628: output shaft; 126, 712: second moveable rubber film; 138: barrier wall; 184, 318, 334: orifice passage; 186, 284, 394, 494, 622: inner tubular portion; 202, 416, 638: electric motor; 238, 322, 438, 562, 684, 728: communicating window; 240, 442, 688: linking crosspieces; 234, 320, 436, 482, 560, 682, 726, 740: communication slit; 400: moveable rubber film; 674: middle chamber.

The invention claimed is:

1. A fluid-filled vibration damping device comprising:

a first mounting member and a second mounting member linked by a main rubber elastic body;

a partition member supported by the second mounting member and defining to one side of the partition member a pressure-receiving chamber whose wall is partially constituted by the main rubber elastic body, while defining to an other side of the partition member an equilibrium chamber whose wall is partially constituted by a flexible film, the pressure-receiving chamber and the equilibrium chamber being filled with a non-compressible fluid;

and an orifice passage through which the pressure-receiving chamber and the equilibrium chamber communicate with one another, wherein the partition member comprises an outer orifice member having a tubular portion and an inner orifice member fitting inside the outer orifice member with the members relatively displaceable in an axial direction;

an orifice-defining window is provided on either one of two mating faces of an inside peripheral face of the tubular portion of the outer orifice member and an outside peripheral face of the inner orifice member;

the orifice passage is defined utilizing a covered zone of the orifice-defining window, the zone being produced through partial covering of the orifice-defining window by an other of the outer orifice member and the inner orifice member;

the covered zone of the orifice-defining window changes through relative displacement of the inner orifice member in the axial direction with respect to the outer orifice member;

a fluid path length along the orifice passage between an opening thereof at the pressure-receiving chamber end and an opening thereof at the equilibrium chamber end changes in association with change of the covered zone of the orifice-defining window; and an actuator shaft attached at one end thereof to the inner orifice member passes through the flexible film and extends to an outside of the equilibrium chamber, while an other end of the actuator shaft is attached to an actuator that is situated outside the equilibrium chamber; and an actuating force of the actuator is exerted on the inner orifice member through an agency of the actuator shaft to bring about relative displacement of the inner orifice member in the axial direction with respect to the outer orifice member.

2. The fluid-filled vibration damping device according to claim 1, wherein a fluid passage that connects the pressure-receiving chamber with the equilibrium chamber is formed in the partition member; and a tuning frequency of the fluid passage is set to a lower frequency than the orifice passage.

3. The fluid-filled vibration damping device according to claim 2, wherein the orifice passage is blocked by bringing the inner orifice member to a specific position in the axial direction with respect to the outer orifice member.

4. The fluid-filled vibration damping device according to claim 3, wherein a cover part is provided to the other of the outer orifice member and the inner orifice member; and in the orifice passage the opening that leads either to the pressure-receiving chamber end or to the equilibrium chamber end is covered by the cover part through relative displacement of the outer orifice member and the inner orifice member in the axial direction.

5. The fluid-filled vibration damping device according to claim 2, wherein the fluid passage assumes a continuous communicating state.

6. The fluid-filled vibration damping device according to claim 2, wherein the fluid passage is formed in the outer orifice member.

7. The fluid-filled vibration damping device according to claim 2, wherein flow regulating means for restricting fluid flow through the orifice passage is situated on a fluid path through the orifice passage.

8. The fluid-filled vibration damping device according to claim 1, wherein an orifice connection window extending in a circumferential direction is formed on either one of two mating faces of the inside peripheral face of the tubular portion of the outer orifice member and the outside peripheral face of the inner orifice member; the orifice connection window is sloped relative to the orifice-defining window; and the orifice passage communicates with either the pressure-receiving chamber or the equilibrium chamber through an intersection point of the orifice connection window and the orifice-defining window.

9. The fluid-filled vibration damping device according to claim 8, wherein either the orifice-defining window or the orifice connection window is helical in form extending in the circumferential direction while sloping in an axial direction; while an other of the orifice-defining window or the orifice connection window is annular in form extending in the circumferential direction without sloping.

10. The fluid-filled vibration damping device according to claim 8, wherein both the orifice-defining window and the orifice connection window are helical in form extending in the circumferential direction while sloping in an axial direction, with the orifice-defining window and the orifice connection window being sloped in mutually opposite directions.

11. The fluid-filled vibration damping device according to claim 8, wherein the inner orifice member includes an inner tubular portion adapted to fit inside the tubular portion of the outer orifice member; and the orifice connection window is formed passing through a peripheral wall of the inner tubular portion.

12. The fluid-filled vibration damping device according to claim 8, wherein linking crosspieces that for reinforcement purposes link together edges at the axial direction sides of the orifice connection window are provided at prescribed intervals in the circumferential direction of the orifice connection window.

13. The fluid-filled vibration damping device according to claim 1, wherein the orifice-defining window is formed so as to open onto the inside peripheral face of the outer orifice member.

14. The fluid-filled vibration damping device according to claim 13, wherein the outer orifice member is designed with bottomed tubular shape opening either towards a pressure-receiving chamber end or towards an equilibrium chamber end, with the orifice-defining window opening onto the inside peripheral face thereof; and the inner orifice member fits inside the outer orifice member and is positioned so as to partition a peripheral interior of the outer orifice member into a basal end and an open end.

15. The fluid-filled vibration damping device according to claim 14, wherein the orifice-defining window is sloped in an axial direction and extends in a circumferential direction; and the inner orifice member is of flat plate shape, with the outside peripheral face of the inner orifice member being superposed against the inside peripheral face of the outer orifice member.

16. The fluid-filled vibration damping device according to claim 1, wherein axial direction guiding means is provided between the outer orifice member and the inner orifice member, for controlling relative displacement thereof in an axis-perpendicular direction and for guiding relative displacement in the axial direction.

17. The fluid-filled vibration damping device according to claim 16, wherein the actuator for bringing about relative displacement of the inner orifice member with respect to the outer orifice member is situated at a first axial end of the inner orifice member, and the axial direction guiding means is provided at an other axial end thereof.

18. The fluid-filled vibration damping device according to claim 1, wherein relative displacement of the outer orifice member and the inner orifice member in the axial direction is brought about by an actuator furnished with a pulse motor and a motion conversion mechanism adapted to convert rotational actuating force of a rotating shaft of the pulse motor to reciprocating actuating force in an axial direction.

19. The fluid-filled vibration damping device according to claim 18, wherein the device is implemented in an engine mount; and a required step number: $\Delta y_i$ of the actuator shaft of the pulse motor corresponding to a particular engine speed is calculated using an equation below, with the actuator being controlled on a basis of a calculation result:

$$\Delta y_i = y_{i+1} - y_i$$

$$y_i = a \times (x_i/60) \times n + b$$

$x_i$ denotes engine rpm
$y_i$ denotes actuator shaft step number depending on an engine speed: $x_i$
n is a multiplying factor determined according to engine model
a and b are constants determined according to vehicle characteristics.

20. The fluid-filled vibration damping device according to claim 1, wherein the orifice-defining window is helical in form extending in a circumferential direction while sloping in an axial direction.

21. The fluid-filled vibration damping device according to claim 1, wherein the orifice-defining window is formed so as to open onto the outside peripheral face of the inner orifice member.

22. The fluid-filled vibration damping device according to claim 1, wherein liquid pressure absorbing means is disposed in the partition member in the wall thereof that partitions the pressure-receiving chamber from the equilibrium chamber.

23. A control method of vibration damping characteristics of an automotive engine mount provided by a fluid-filled vibration damping device comprising: a first mounting member and a second mounting member linked by a main rubber elastic body; a partition member supported by the second mounting member and defining to one side of the partition member a pressure-receiving chamber whose wall is partially constituted by the main rubber elastic body, while defining to an other side of the partition member an equilibrium chamber whose wall is partially constituted by a flexible film, the pressure-receiving chamber and the equilibrium chamber being filled with a non-compressible fluid; and an orifice passage through which the pressure-receiving chamber and the equilibrium chamber communicate with one another, wherein the partition member comprises an outer orifice member having a tubular portion and an inner orifice member fitting inside the outer orifice member with the members relatively displaceable in an axial direction; an orifice-defining window is provided on either one of two mating faces of an inside peripheral face of the tubular portion of the outer orifice member and an outside peripheral face of the inner orifice member; the orifice passage is defined utilizing a covered zone of the orifice-defining window, the zone being produced through partial covering of the orifice-defining window by an other of the outer orifice member and the inner orifice member; the covered zone of the orifice-defining window changes through relative displacement of the inner orifice member in the axial direction with respect to the outer orifice member; a fluid path length along the orifice passage between an opening thereof at the pressure-receiving chamber end and an opening thereof at the equilibrium chamber end changes in association with change of the covered zone of the orifice-defining window; an actuator shaft attached at one end thereof to the inner orifice member passes through the flexible film and extends to an outside of the equilibrium chamber, while an other end of the actuator shaft is attached to an actuator that is situated outside the equilibrium chamber; an actuating force of the actuator is exerted on the inner orifice member through an agency of the actuator shaft to bring about relative displacement of the inner orifice member in the axial direction with respect to the outer orifice member; a fluid passage that connects the pressure-receiving chamber with the equilibrium chamber is formed in the partition member; and the tuning frequency of the fluid passage is set to a lower frequency than the orifice passage; and the orifice passage is blocked by bringing the inner orifice member to a specific position in the axial direction with respect to the outer orifice member, the control method being executed through actuation control of the actuator adapted to bring about relative displacement of the inner orifice member in the axial direction with respect to the outer orifice member, and comprising the steps of:

determining by driving/idling determining means if an automobile is moving or idling while measuring by speed measuring means engine speed of the automobile;
blocking the orifice passage to allow fluid flow through the fluid passage in an event of a decision by the driving/idling determining means that the automobile is moving;
opening the orifice passage whereas in an event of a decision by the driving/idling determining means that the automobile is idling; and
undergoing controlled modification of a relative position of the inner orifice member with respect to the outer orifice member in the axial direction depending on the engine speed that is measured by the speed measuring means, so as to shorten a passage length of the orifice passage in response to higher engine speed.

24. The control method of the automotive engine mount according to claim 23, wherein a pulse motor is employed as a power source of the actuator, and the relative position of the inner orifice member with respect to the outer orifice member in the axial direction is controlled through control of the pulse motor.

* * * * *